United States Patent
Ito et al.

(10) Patent No.: US 10,649,310 B2
(45) Date of Patent: May 12, 2020

(54) BLADE DRIVING DEVICE AND IMAGING APPARATUS

(71) Applicant: CANON DENSHI KABUSHIKI KAISHA, Chichibu-shi (JP)

(72) Inventors: Hisatoshi Ito, Saitama (JP); Yuki Saito, Yokohama (JP); Naoki Kawakubo, Yokohama (JP); Kentaro Kato, Tokyo (JP); Takahiro Arai, Kawasaki (JP)

(73) Assignee: Canon Denshi Kabushiki Kaisha, Chichibu-shi (JP)

(*) Notice: Subject to any disclaimer, the term of this patent is extended or adjusted under 35 U.S.C. 154(b) by 0 days.

(21) Appl. No.: 16/243,130

(22) Filed: Jan. 9, 2019

(65) Prior Publication Data

US 2019/0146307 A1   May 16, 2019

Related U.S. Application Data

(63) Continuation of application No. PCT/JP2017/026016, filed on Jul. 19, 2017.

(30) Foreign Application Priority Data

Jul. 19, 2016  (JP) ................................. 2016-141913
Jun. 30, 2017  (JP) ................................. 2017/129510

(51) Int. Cl.
   *G03B 9/36*   (2006.01)
   *G03B 9/42*   (2006.01)

(52) U.S. Cl.
   CPC ................. *G03B 9/36* (2013.01); *G03B 9/42* (2013.01)

(58) Field of Classification Search
   None
   See application file for complete search history.

(56) References Cited

U.S. PATENT DOCUMENTS

| 4,643,553 A | 2/1987 | Fujino |
| 4,805,991 A | 2/1989 | Arai et al. |
| 4,826,424 A | 5/1989 | Arai et al. |
| 4,840,553 A | 6/1989 | Arai |
| 4,897,681 A | 1/1990 | Yamamoto et al. |

(Continued)

FOREIGN PATENT DOCUMENTS

| JP | S61-002140 A | 1/1986 |
| JP | H05-333401 A | 12/1993 |

(Continued)

OTHER PUBLICATIONS

Oct. 17, 2017 International Search Report and Written Opinion in International Patent Appln. No. PCT/2017/026016.

*Primary Examiner* — William B Perkey
(74) *Attorney, Agent, or Firm* — Venable LLP

(57) ABSTRACT

A blade driving device including, a base plate including an opening through which light passes, a blade configured to runs on a surface of the base plate to open and close the opening, a drive mechanism including a drive spring and actuates the blade; and a charge mechanism configured to perform a charge operation on the drive mechanism against the drive spring. The charge mechanism includes a slide member configured to linearly reciprocate in a direction parallel to the base plate along a motor between the motor and the drive mechanism, the motor generating a driving force for the charge mechanism.

12 Claims, 39 Drawing Sheets

(56) References Cited

U.S. PATENT DOCUMENTS

| | | | |
|---|---|---|---|
| 4,922,274 A | 5/1990 | Yamamoto et al. | |
| 5,392,085 A | 2/1995 | Tanabe | |
| 8,491,204 B2 * | 7/2013 | Inukai | G03B 9/36 |
| | | | 396/357 |
| 8,537,270 B2 | 9/2013 | Nakai | |
| 8,783,977 B2 | 7/2014 | Kozu et al. | |
| 9,632,394 B2 | 4/2017 | Nemoto et al. | |
| 2009/0041447 A1 * | 2/2009 | Kim | G03B 9/40 |
| | | | 396/246 |
| 2011/0176799 A1 * | 7/2011 | Shintani | G03B 9/14 |
| | | | 396/484 |
| 2012/0249849 A1 | 10/2012 | Nakano et al. | |
| 2012/0249860 A1 | 10/2012 | Nakai | |
| 2015/0309387 A1 | 10/2015 | Nemoto et al. | |

FOREIGN PATENT DOCUMENTS

| | | |
|---|---|---|
| JP | H08-088986 A | 4/1996 |
| JP | 2001-281730 A | 10/2001 |
| JP | 2003-107559 A | 4/2003 |
| JP | 4841089 B2 | 12/2011 |
| JP | 2012-208280 A | 10/2012 |
| JP | 2012-215795 A | 11/2012 |
| JP | 2014-071404 A | 4/2014 |
| JP | 2014-149382 A | 8/2014 |

* cited by examiner

FIG. 39

| FRONT LEVER | REAR LEVER | SETTING MEMBER | SHUTTER | CORRESPONDING DRAWING |
|---|---|---|---|---|
| H | H | L | STAND-BY PHASE | FIG.35 |
| H | H | H | RELEASE SETTING | |
| H | L | H | END OF RUNNING | FIG.37 |
| H | L | L | DURING CHARGE 1 | |
| L | L | L | DURING CHARGE 2 | |
| L | L | H | DURING CHARGE 3 | |
| L | H | H | END OF CHARGE | FIG.38 |
| L | H | L | START RELEASING FRONT | |

BLADE DRIVING DEVICE AND IMAGING APPARATUS

This application is a continuation of International Patent Application No. PCT/JP2017/026016 filed on Jul. 19, 2017, and claims priority to Japanese Patent Applications No. 2016-141913 filed on Jul. 19, 2016 and No. 2017-129510 filed on Jun. 30, 2017, the entire content of both of which are incorporated herein by reference.

BACKGROUND OF THE INVENTION

Field of the Invention

The present invention relates to a blade driving device and an imaging apparatus.

Description of the Related Art

A motor-driven shutter is known as a shutter used in an imaging apparatus, such as a digital single-lens reflex camera or a mirrorless camera. Japanese Patent No. 4,841,089 discloses a shutter that uses a driving force of a motor to perform a charge operation.

There is a demand for higher performance cameras capable of continuous shooting, for example, and motors used in shutters are required to have higher outputs. In general, the size of a motor increases in proportion to output. On the other hand, with smaller cameras, the shutter also needs to be smaller. With mirrorless cameras, space saving is particularly required. In the shutter disclosed in Japanese Patent No. 4,841,089, the direction of the rotating shaft of the motor is in parallel with the direction of running of the group of blades. This is advantageous for reducing the size of the shutter in the direction of the optical axis. However, the mechanism disclosed in Japanese Patent No. 4,841,089 is not suitable for size reduction of the shutter in the direction perpendicular to the optical axis, because space for installing the setting member and space for the setting member to rotate has to be allocated between the drive spring for the front curtain and the drive spring for the rear curtain.

SUMMARY OF INVENTION

The present invention is to provide a blade driving device suitable for size reduction.

According to an aspect of the present invention, there is provided a blade driving device, comprising: a base plate including an opening through which light passes; a blade configured to runs on a surface of the base plate to open and close the opening; a drive mechanism including a drive spring and actuates the blade; and a charge mechanism configured to perform a charge operation on the drive mechanism against the drive spring, wherein the charge mechanism includes a slide member configured to linearly reciprocate in a direction parallel to the base plate along a motor between the motor and the drive mechanism, the motor generating a driving force for the charge mechanism.

Further features of the present invention will become apparent from the following description of exemplary embodiments (with reference to the attached drawings).

BRIEF DESCRIPTION OF DRAWINGS

FIG. 39 is a table showing classification of the shutter state.

DESCRIPTION OF EMBODIMENTS

First Embodiment

<Imaging Apparatus>

Figure 1:
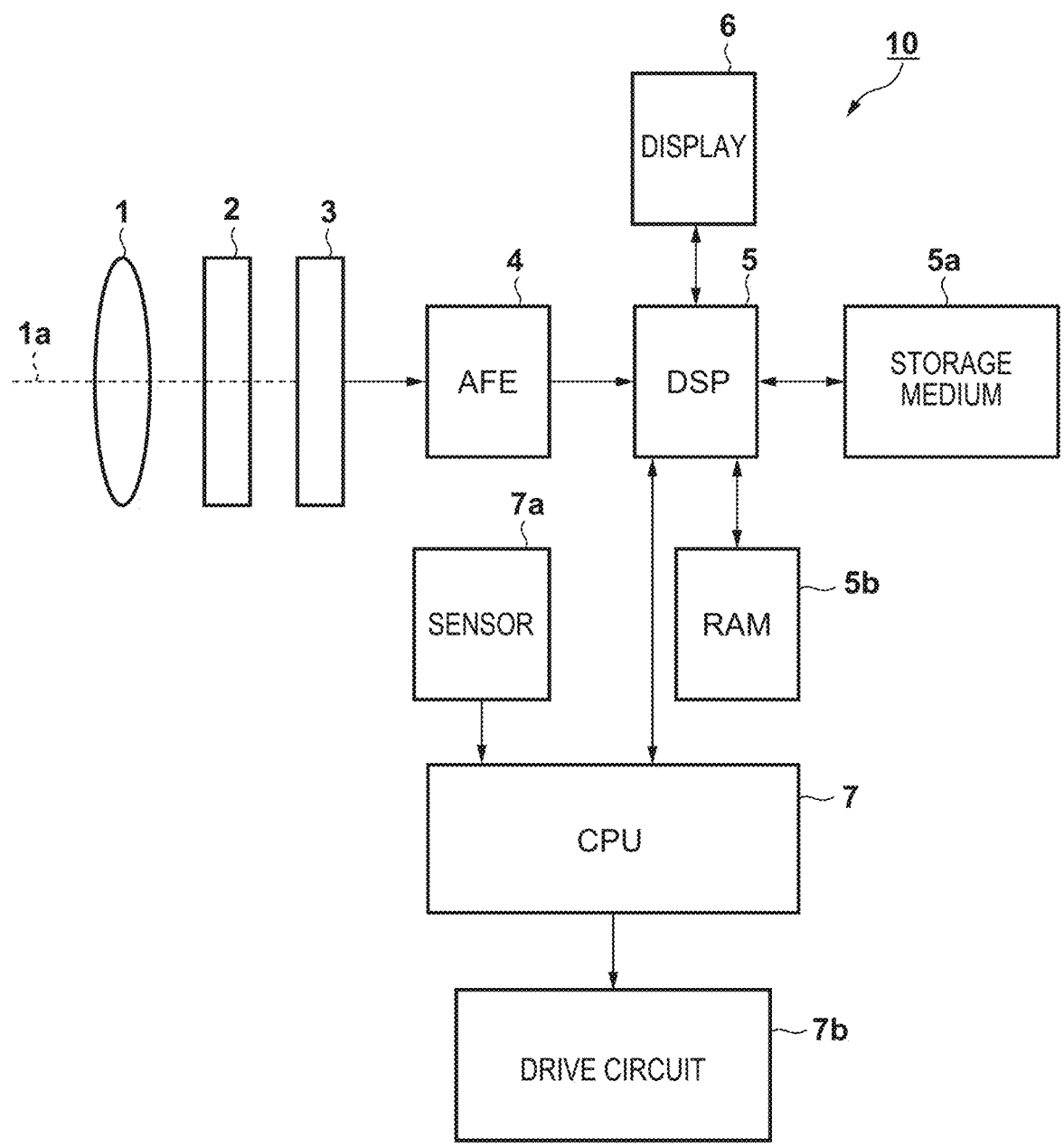
FIG. 1 is a diagram showing an overall configuration of an imaging apparatus according to an embodiment of the present invention.

FIG. 1 is a diagram showing an overall configuration of an imaging apparatus 10 according to an embodiment of the present invention. The imaging apparatus 10 is a mirrorless camera, for example. The imaging apparatus 10 includes a lens unit 1, a shutter 2, and an imaging device 3. The lens unit 1 includes a group of lenses that focuses light from a subject to form an image, and a drive mechanism therefor. The imaging device 3 is a device that performs photoelectric conversion of the subject image formed by the lens unit 1, such as a CMOS image sensor. The shutter 2 is disposed between the lens unit 1 and the imaging device 3 on an imaging optical axis 1a, and adjusts the exposure time of the imaging device 3, for example, by opening and closing a group of blades.

An analog image signal output from the imaging device 3 is converted into a digital image signal by an analog front end (AFE) 4. A digital signal processor (DSP) 5 performs various image processing and compression and decompression processing on the digital image signal output from the AFE 4. A storage medium 5a and a RAM 5b are connected to the DSP 5. The RAM 5b is used to temporarily store image data, for example. The storage medium 5a is a memory card, for example, and is used to save taken images. A display 6 is an electronic image display device, such as a liquid crystal display (LCD) and displays taken images or various menu screens, for example.

A CPU 7 controls the whole of the imaging apparatus 10. The CPU 7 controls various drive circuits 7b based on detection results from various sensors 7a. The sensors 7a include a sensor that detects the power supply voltage of the imaging apparatus 10, a sensor that detects temperature, and various sensors provided in the lens unit 1 and the shutter 2, for example. The drive circuits 7b include a timing generator that supplies a drive signal to the imaging device 3, and drive circuits for actuators of the lens unit 1 and the shutter 2, for example.

<Shutter (Blade Driving Device)>

The shutter 2 according to this embodiment is a focal plane shutter. The shutter 2 will be described with reference to FIGS. 2 to 29. In the drawings, the arrows X, Y and Z indicate directions perpendicular to each other. The Z direction is a direction parallel to the optical axis 1a, and the Y direction is a direction parallel to the direction of running of the blades. Note that, in some drawings, some components of the shutter 2 may be shown as transparent or omitted.

<1. Overall Configuration and Layout>

Figure 2:
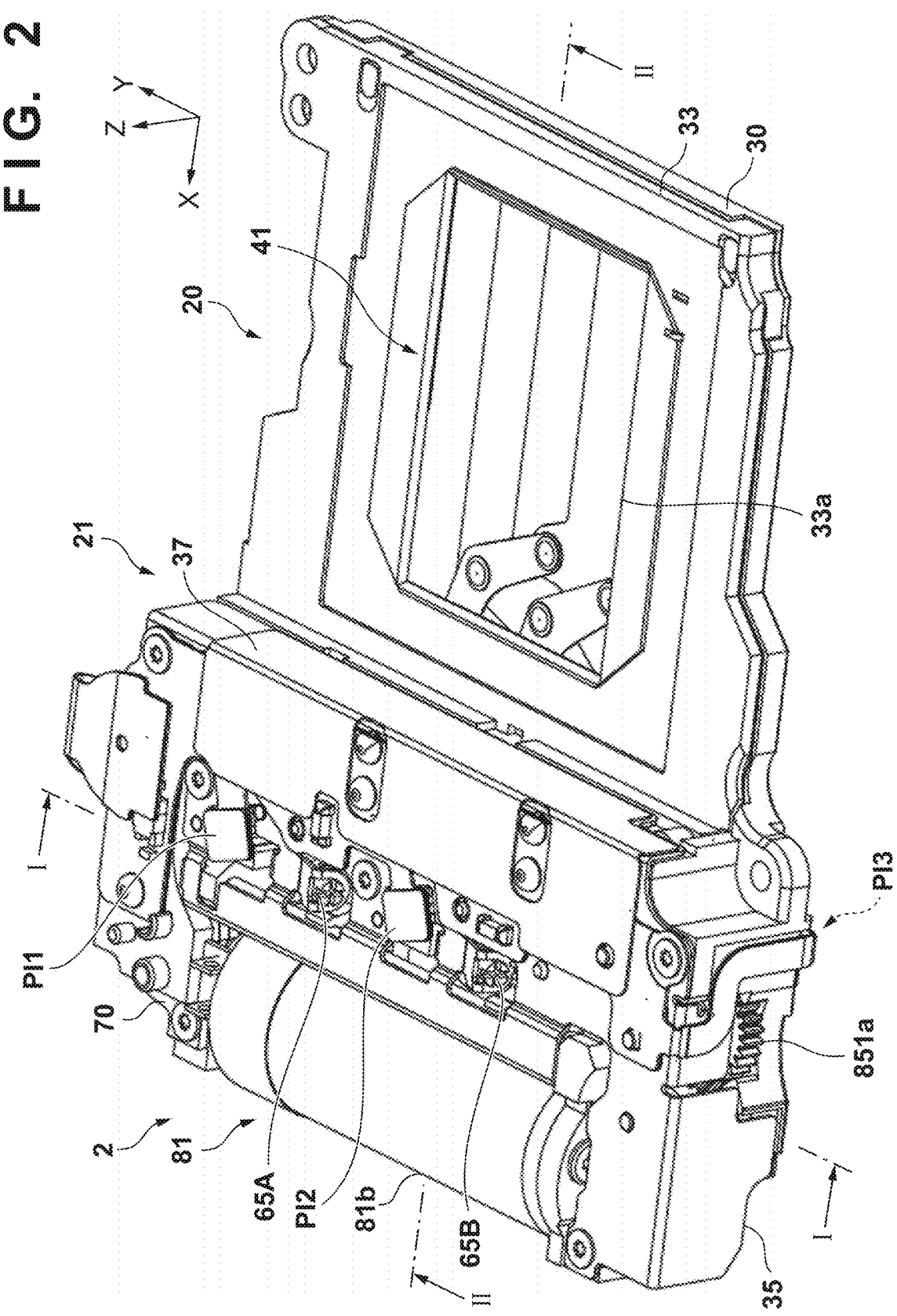
FIG. 2 is a perspective view of a shutter according to the embodiment of the present invention.
Figure 3:
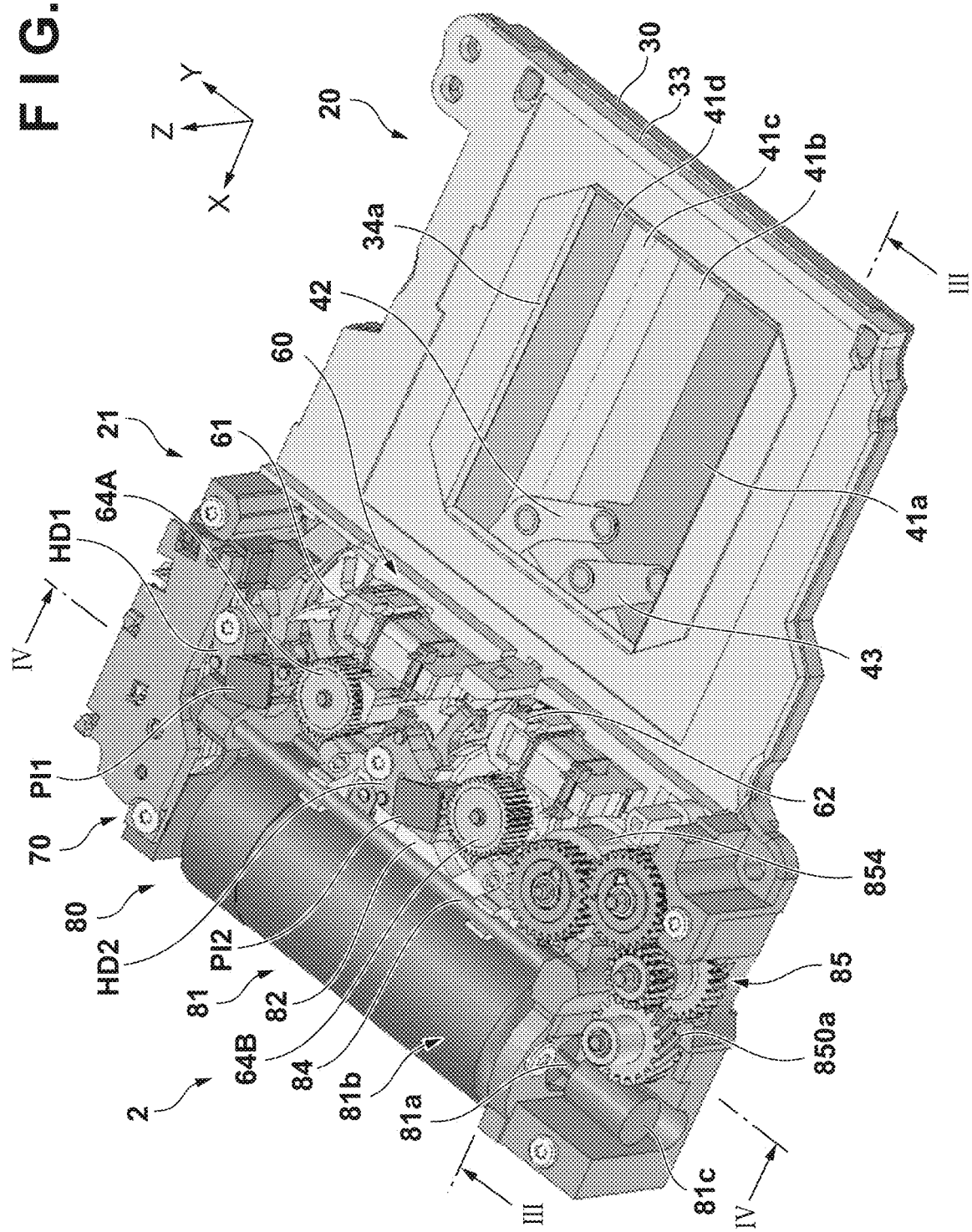
FIG. 3 is a perspective view showing internal machinery of the shutter shown in FIG. 2.
Figure 4:
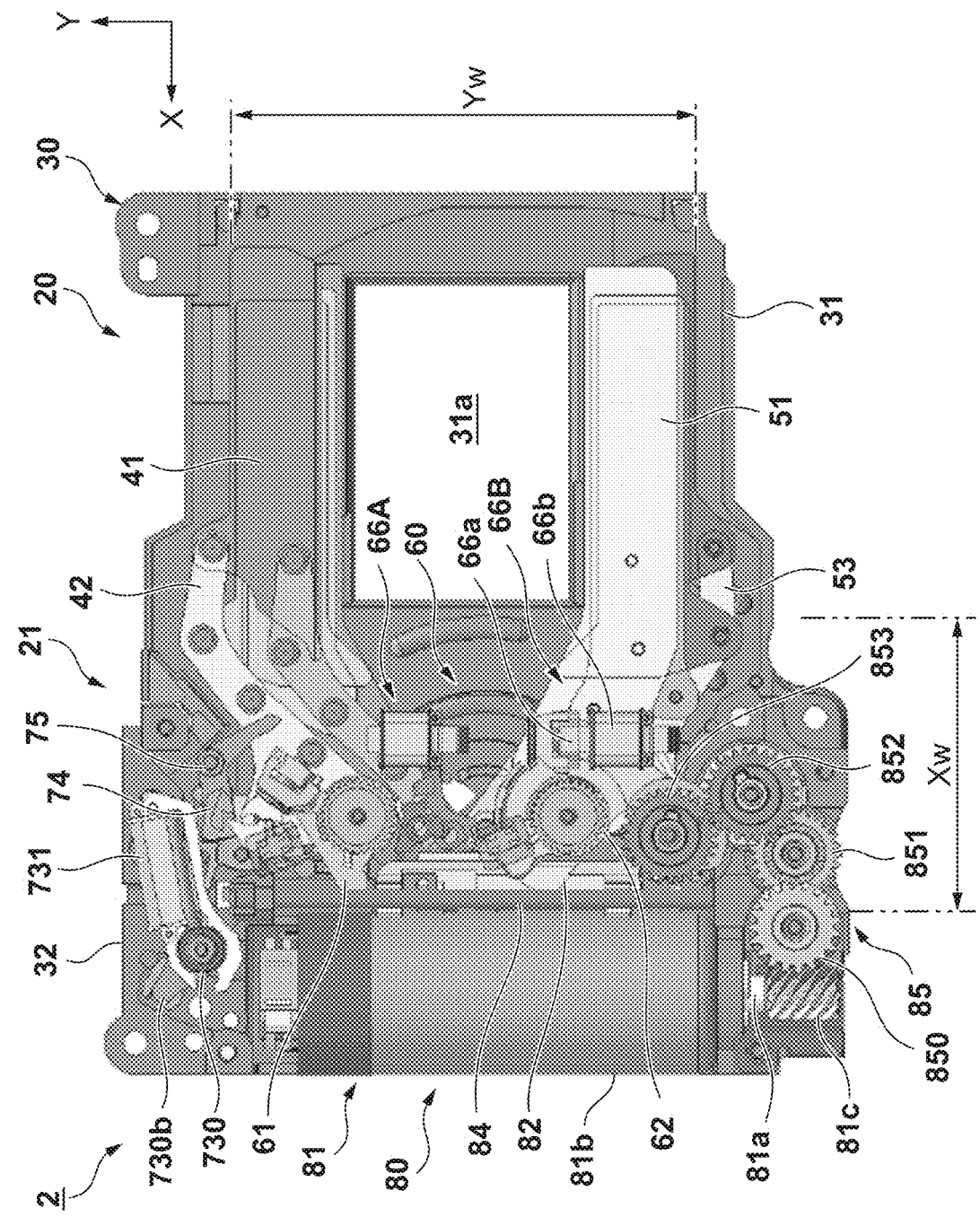
FIG. 4 is a plan view showing the internal machinery of the shutter shown in FIG. 2.
Figure 5:
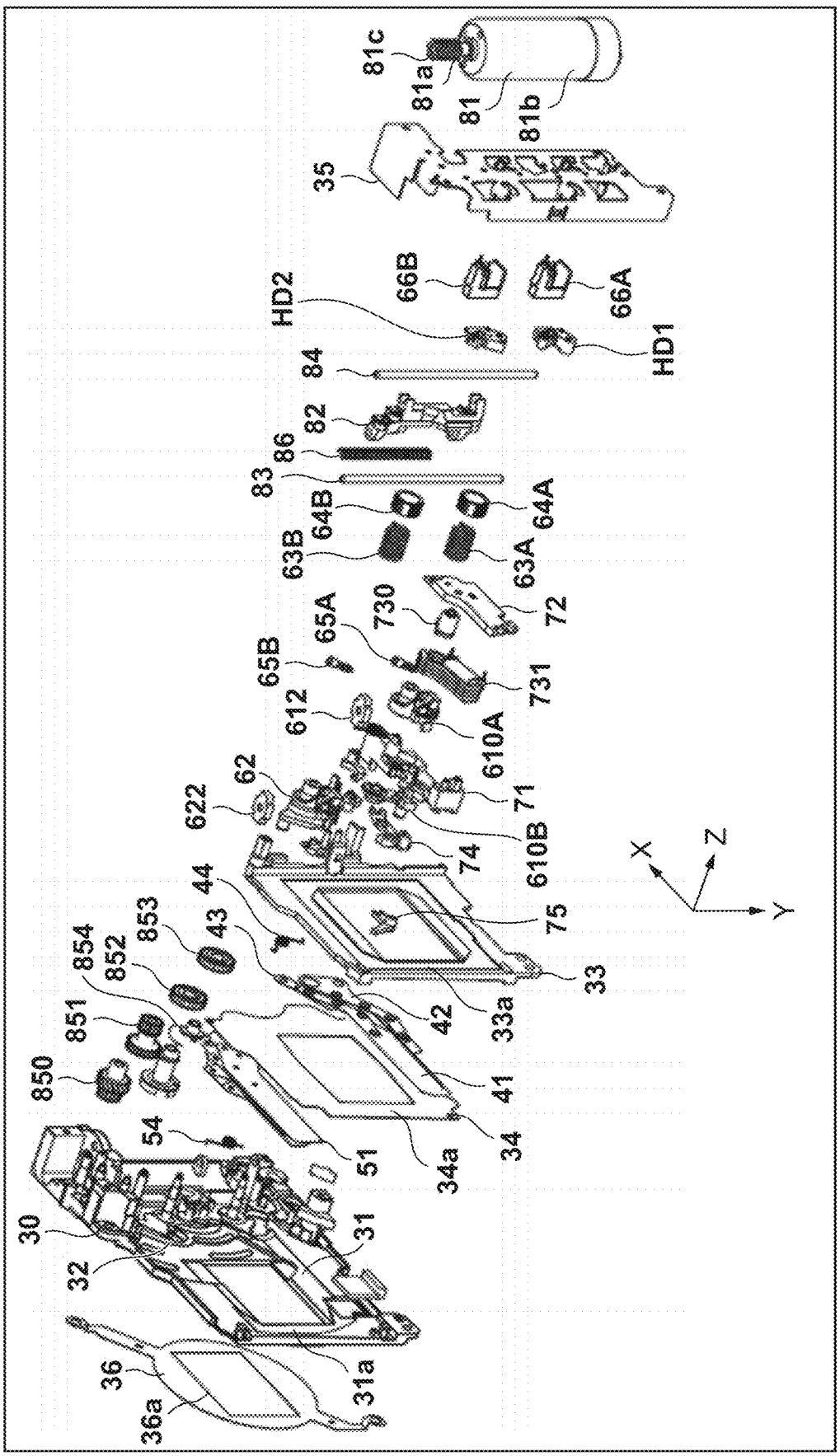
FIG. 5 is an exploded perspective view of the shutter shown in FIG. 2.
Figure 6:
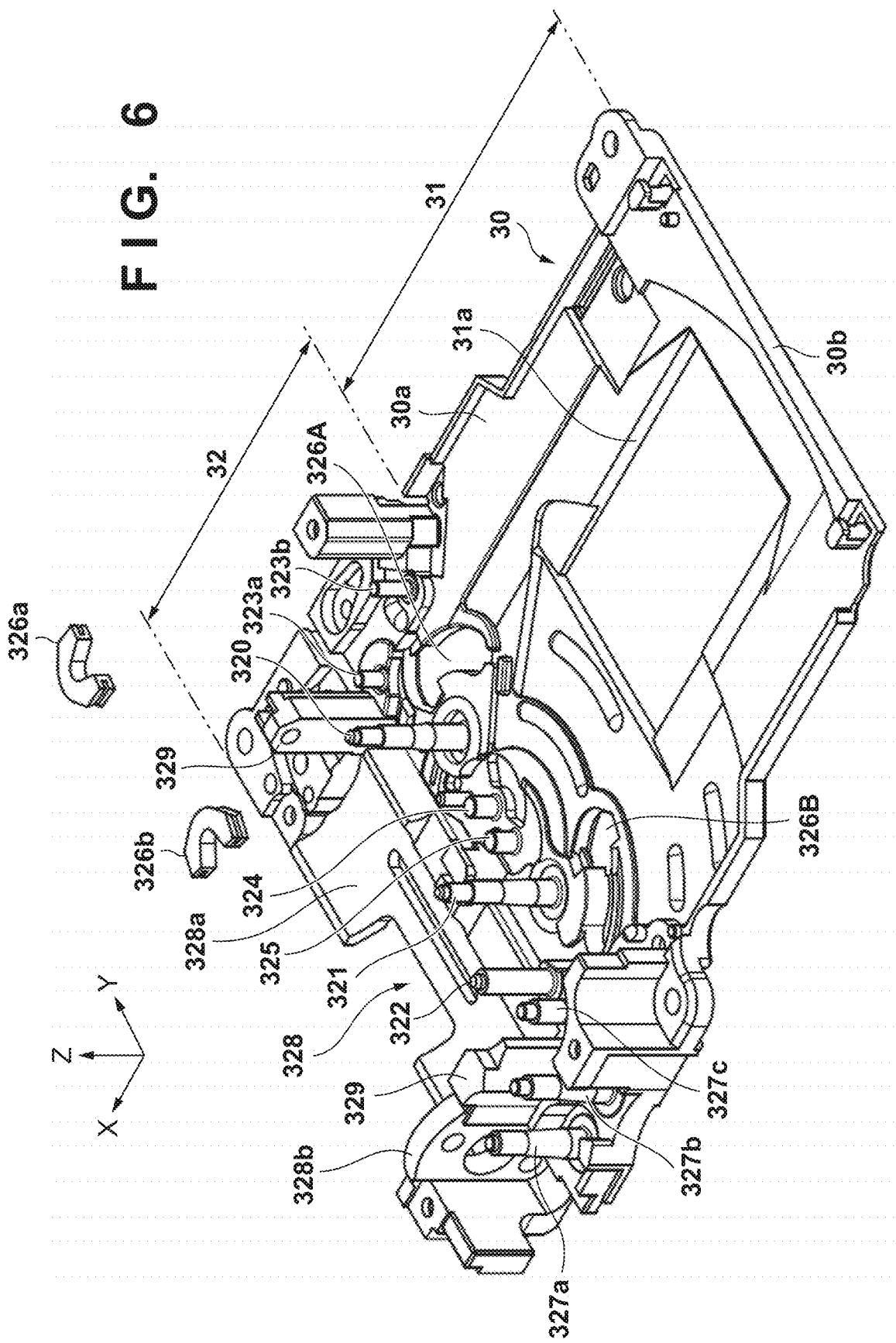
FIG. 6 is a diagram for illustrating a base plate.

With reference to FIGS. 2 to 6, an overall configuration of the shutter 2 and a layout of mechanisms of the shutter 2 will be described. FIG. 2 is a perspective view of the shutter 2, FIGS. 3 and 4 are diagrams showing an internal mechanism of the shutter 2, FIG. 5 is an exploded perspective view of the shutter 2, and FIG. 6 is a perspective view of a base plate 30.

The shutter 2 is generally divided into a blade section 20 that allows the imaging device 3 to be exposed to subject light and blocks the subject light from reaching the imaging device 3, and a machinery section 21 that actuates the blades. The blade section 20 has a rectangular shape and is thinner than the machinery section 21, and the shutter 2 has an L-shape as a whole in side view (or when viewed in the Y direction). The machinery section 21 has the shape of a rectangular parallelepiped that has a thickness comparable to the diameter of a motor 81. In other words, the thickness of the shutter 2 in the Z direction is, at most, on the order of the diameter of the motor 81. The thickness of the blade section 20 is reduced to reduce the space occupied by the shutter 2 and the imaging device 3 in the direction of the optical axis, and the machinery section 21 is disposed at the side of the blade section 20, so that the interior space of the imaging apparatus 10 can be efficiently used. The shutter 2 has a rectangular shape as a whole and a compact size, and therefore is suitable for an imaging apparatus, such as a mirrorless camera, that has a small interior space.

The shutter 2 has the base plate 30 as a basic support body, on which other components of the shutter 2 are mounted. The base plate 30 has an opening formation section 31 that is a part of the blade section 20 and a machinery supporting section 32 that is a part of the machinery section 21, which are integrally formed. The base plate 30 is made of a synthetic resin, for example.

The opening formation section 31 has an opening 31a through which the subject light passes. One surface of the opening formation section 31 is covered with a cover plate 33, and a partition plate 34 is disposed between the opening formation section 31 and the cover plate 33. The cover plate 33 and the partition plate 34 have openings 33a and 34a, respectively, which are aligned with the opening 31a. Another surface (on the side of the subject) of the opening formation section 31 is covered with a cover plate 36. The cover plate 36 has an opening 36a, which is also aligned with the opening 31a. The openings 31a, 33a, 34a and 36a have a rectangular shape. The normal direction to the openings is the Z direction, and the planar directions of the openings are the X direction and the Y direction. The subject light passes through the opening 36a, the opening 31a, the opening 34a and then the opening 33a in this order before exposing the imaging device 3.

The partition plate 34 divides a blade chamber between the opening formation section 31 and the cover plate 33 into a space for a front curtain and a space for a rear curtain in the Z direction. The shutter 2 is provided with a blade mechanism 40 for the front curtain and a blade mechanism 50 for the rear curtain, and the blade chamber houses a group of blades 41 that forms the front curtain and a group of blades 51 that forms the rear curtain. FIG. 4 shows the shutter 2 from which the cover plate 33 and the partition plate 34 have been removed.

The machinery section 21 includes a drive mechanism 60 that drives the blade mechanisms 40 and 50, a locking mechanism 70 capable of maintaining the group of blades 41 in an open state, and a charge mechanism 80 that performs a charge operation on the drive mechanism 60. The machinery section 21 further includes an MG base plate 35 that serves also as a cover member that covers these mechanisms, and a cover member 37 that covers the MG base plate 35. FIG. 3 shows the shutter 2 from which the MG base plate 35 and the cover member 37 have been removed. The MG base plate 35 and the cover member 37 prevent entry of foreign matter into the drive mechanism 60, the locking mechanism 70 and the charge mechanism 80.

The charge mechanism 80 includes a motor 81 that is a driving source thereof, a charge slider 82 that performs a charge operation on the drive mechanism 60 under a driving force of the motor 81, and a gear train 85 that transmits the driving force of the motor 81 to the charge slider 82. Although the charge mechanism 80 includes the motor 81 in this embodiment, the charge mechanism 80 may use a motor provided in the imaging apparatus 10 instead of the motor 81. That is, the charge mechanism 80 may include a dedicated motor or may not include a dedicated motor but receive a driving force from an external motor.

The motor 81 is disposed at the side of the opening 31a along the X direction with a rotating shaft 81a thereof being aligned with the Y direction. In other words, the motor 81 is disposed along one side of the rectangular perimeter of the opening 31a. To increase the speed of operation of the shutter 2, the motor 81 is required to have a comparatively higher output, and the size of the motor generally increases in proportion to the output. The arrangement of the motor 81 in this embodiment allows a body part 81b of the motor 81 to be accommodated in a running and storage range Yw of the groups of blades 41 and 51 (see FIG. 4) when viewed in the Y direction, so that a high-power motor can be arranged in a relatively compact space.

The motor 81 can be arranged in other ways. For example, the motor 81 can be arranged with the rotating shaft 81a thereof being aligned with the Z direction. However, if the motor 81 has an elongated shape as in this embodiment, the shutter 2 is elongated in the Z direction. Furthermore, the motor 81 can be arranged with the rotating shaft 81a thereof being aligned with the X direction. In such a case, however, the shutter 2 is elongated in the X direction if the motor 81 is arranged at the side of the opening 31a along the X direction as in this embodiment. Nevertheless, if the motor 81 is arranged at the side of the opening 31a along the Y direction, the motor 81 may be hardly incorporated in the imaging apparatus 10 because the digital camera typically has a larger housing space to the left or right of the shutter than above or below the shutter. Although such other arrangements are possible, the arrangement of the motor 81 in this embodiment is advantageous from the viewpoint of improvement in performance and reduction in size of the shutter 2.

In this embodiment, the charge mechanism 80 performs a charge operation on the drive mechanism 60 by making the charge slider 82 move in the Y direction under the driving force of the motor 81. The charge operation is achieved by linear movement of the charge slider 82 in the Y direction, and the size of the shutter 2 can be reduced in the X direction compared with an arrangement in which the charge operation is achieved by rotation of a charging member. In addition, the charge slider 82 reciprocates within the running and storage range Yw of the groups of blades 41 and 51 (see FIG. 4) and therefore does not lead to an increase in size of the shutter 2 in the Y direction.

The drive mechanism 60 drives the blade mechanisms 40 and 50 and is subject to the charge operation by the charge mechanism 80. Therefore, from the viewpoint of mechanics and size reduction, it is advantageous to arrange the blade mechanisms 40 and 50 and the charge mechanism 80 adjacent to the drive mechanism 60. In this embodiment, the drive mechanism 60 is arranged in a region Xw between the motor 81 and the opening 31a, and the charge slider 82 is arranged between the motor 81 and the drive mechanism 60. Thus, the drive mechanism 60 is arranged adjacent to the blade mechanisms 40 and 50 and the charge mechanism 80, and this is advantageous from the viewpoint of mechanics.

In addition, since the direction of the rotating shaft of the motor 81 and the direction of movement of the charge slider 82 are both the Y direction, the mechanisms can be concentrated in a small region in the X direction, so that the shutter 2 can be reduced in size.

In this embodiment, the gear train 85 is arranged at one end of the motor 81 in the Y direction (on the side of the rotating shaft 81a), and the locking mechanism 70 is arranged on the other end. Since the locking mechanism 70 and the gear train 85 are symmetrically arranged in spaces on the opposite sides of the body part 81b of the motor 81 in the Y direction, the shutter 2 can be reduced in size in the Y direction. The rotating shaft 81a of the motor 81 is provided with a worm gear 81c, which is engaged with a worm wheel 850a of a gear 850 of the gear train 85. This part changes the direction of the axis of rotation from the Y direction (on the part of the motor 81) to the Z direction (on the part of the gear train 85). Since the direction of the axis of rotation of each gear of the gear train 85 is the Z direction, the machinery section 21 of the shutter 2 can be reduced in thickness in the Z direction.

<2. Blade Mechanism>

Figure 7:
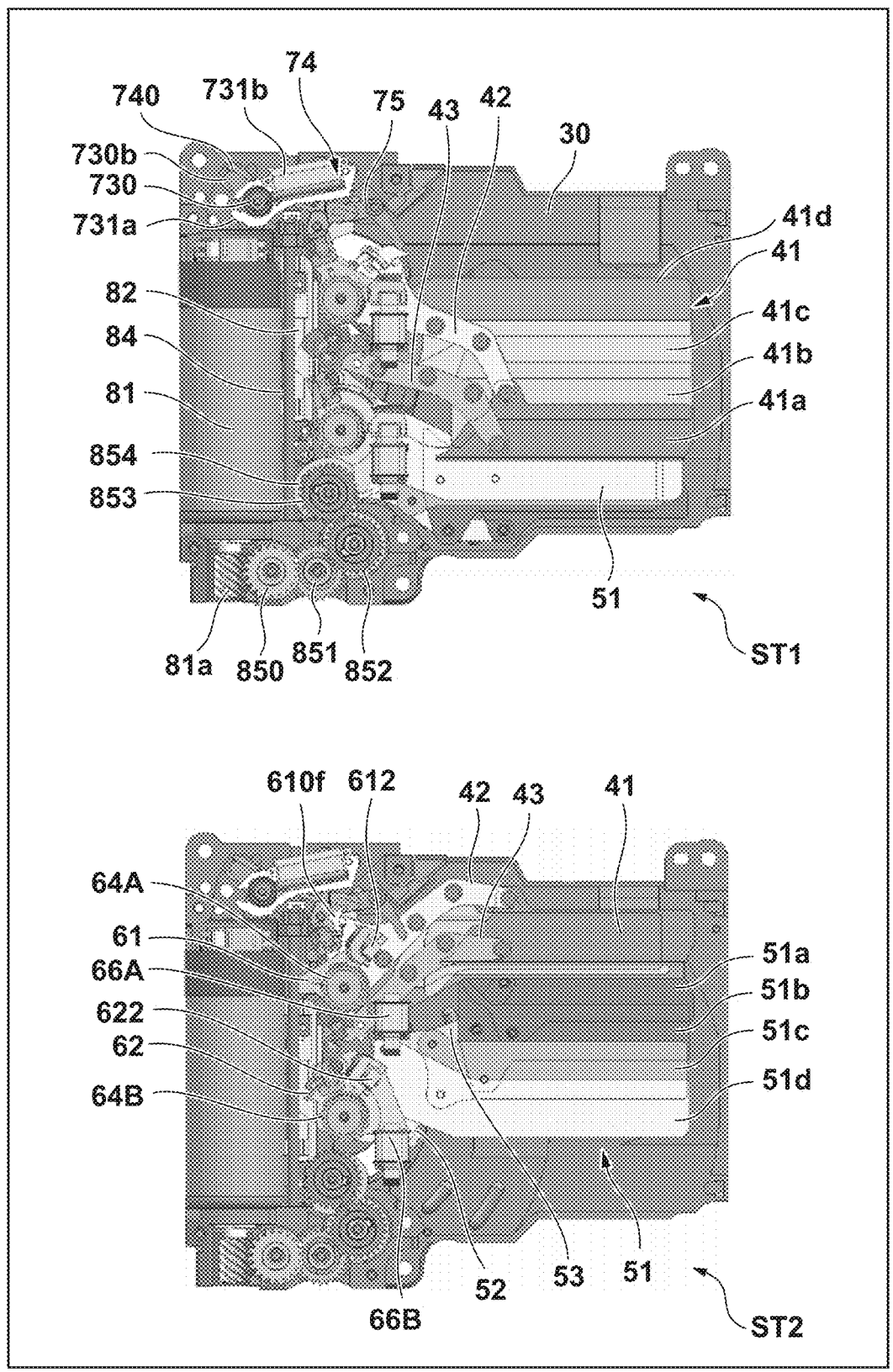
FIG. 7 is a diagram for illustrating a blade mechanism.
Figure 8:
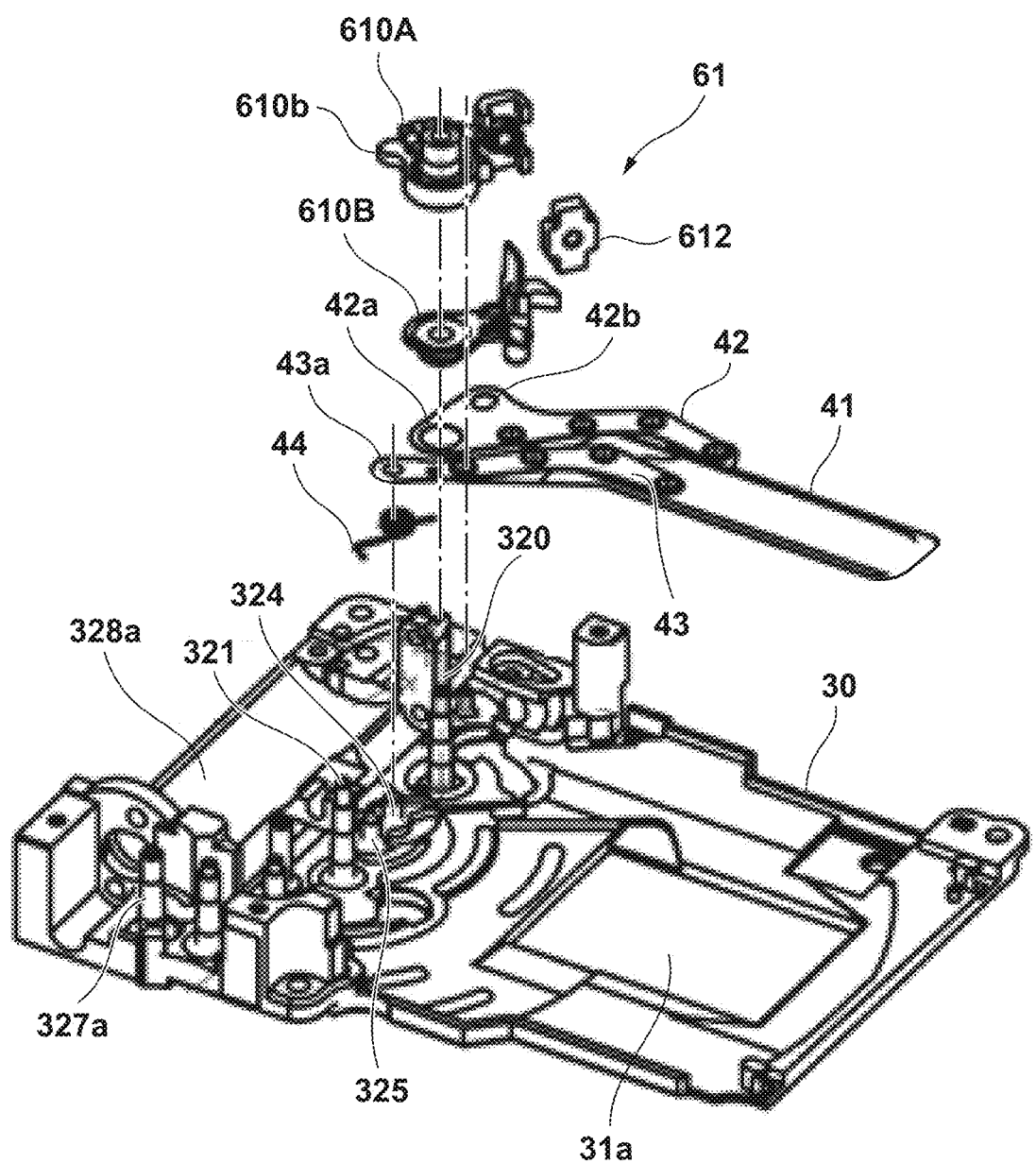
FIG. 8 is a diagram for illustrating the blade mechanism.
Figure 9:
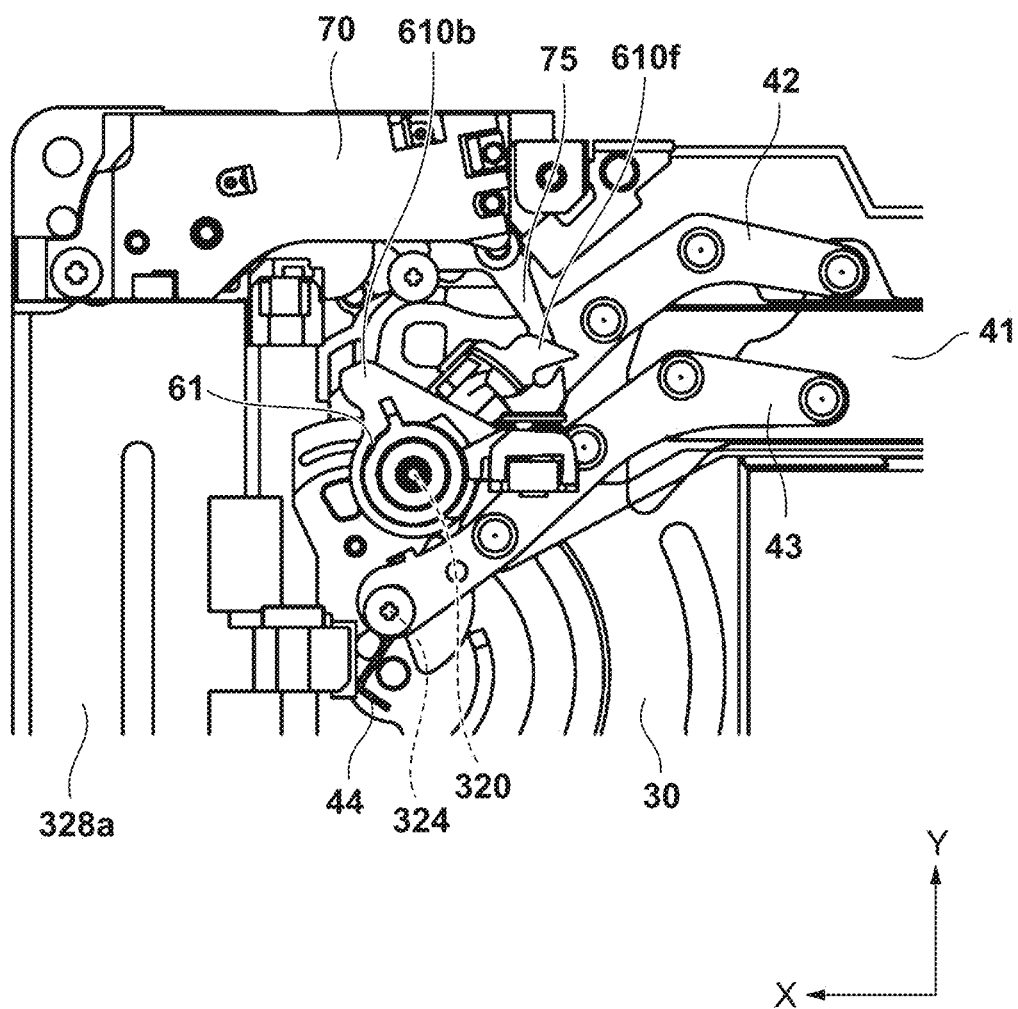
FIG. 9 is a diagram for illustrating the blade mechanism.

With reference to FIGS. 5, 6 and 7 to 9, configurations of the blade mechanisms 40 and 50 will be described. FIG. 7 is a diagram for illustrating the blade mechanisms 40 and 50, and FIGS. 8 and 9 are diagrams for illustrating the blade mechanism 40. In FIG. 7, a state ST1 is a state where the group of blades 41 is in a closed state and the group of blades 51 is in an open state, and a state ST2 is a state where the group of blades 41 is in an open state and the group of blades 51 is in a closed state. The "open state" refers to a state where the group of blades does not cover the opening 31a, and the "closed state" refers to a state where the group of blades covers the opening 31a. In FIG. 7 and other drawings, to make the blades and overlaps thereof easier to see, the contours of the blades behind another blade are shown by solid lines.

The blade mechanism 40 includes the group of blades 41, a primary arm 42, a secondary arm 43, and a spring 44 and forms the front curtain. The blade mechanism 50 includes the group of blades 51, a primary arm 52, a secondary arm 53, and a spring 54 and forms the rear curtain. In this embodiment, the group of blades 41 is formed by blades 41a to 41d, and the group of blades 51 is formed by blades 51a to 51d. However, the number of blades is not limited to four. Each blade is made from a resin sheet coated with a black paint (or a material or composite material having a light shielding property, such as a metal plate), for example. The blades 41a to 41d are coupled to the primary arm 42 and the secondary arm 43 and form a parallel linkage in which the blades 41a to 41d run in the Y direction. The blades 51a to 51d are coupled to the primary arm 52 and the secondary arm 53 and form a parallel linkage in which the blades 51a to 51d run in the Y direction.

The primary arm 42 has a shaft hole 42a and an engagement hole 42b. The shaft hole 42a and the engagement hole 42b are used to attach the primary arm 42 to a drive member 61 described later. A shaft 320 of the base plate 30 is inserted into the shaft hole 42a with the drive member 61 interposed therebetween, and the primary arm 42 can rotate with the drive member 61 about the shaft 320.

The secondary arm 43 has a shaft hole 43a. A shaft 324 of the base plate 30 is inserted into the shaft hole 43a, and the secondary arm 43 can rotate about the shaft 324. In this embodiment, the spring 44 is a helical torsion spring through which the shaft 324 passes, and is fastened to the base plate 30 at one end and to the secondary arm 43 at the other end.

The spring 44 biases the secondary arm 43 toward bringing the group of blades 41 into the closed state. In this way, the group of blades 41 can be prevented from rattling.

The blade mechanism 50 has the same configuration as the blade mechanism 40. The base plate 30 has shafts 321 and 325, the primary arm 52 has a shaft hole and an engagement hole (both not shown) that are similar to the shaft hole 42a and the engagement hole 42b of the primary arm 42, respectively, and the secondary arm 53 has a shaft hole (not shown) that is similar to the shaft hole 43a of the secondary arm 43. A spring 54 is attached to the base plate 30 in the same manner as the spring 44. The spring 54 biases the secondary arm 53 toward bringing the group of blades 51 into the open state.

<3. Drive Mechanism>

Figure 10:
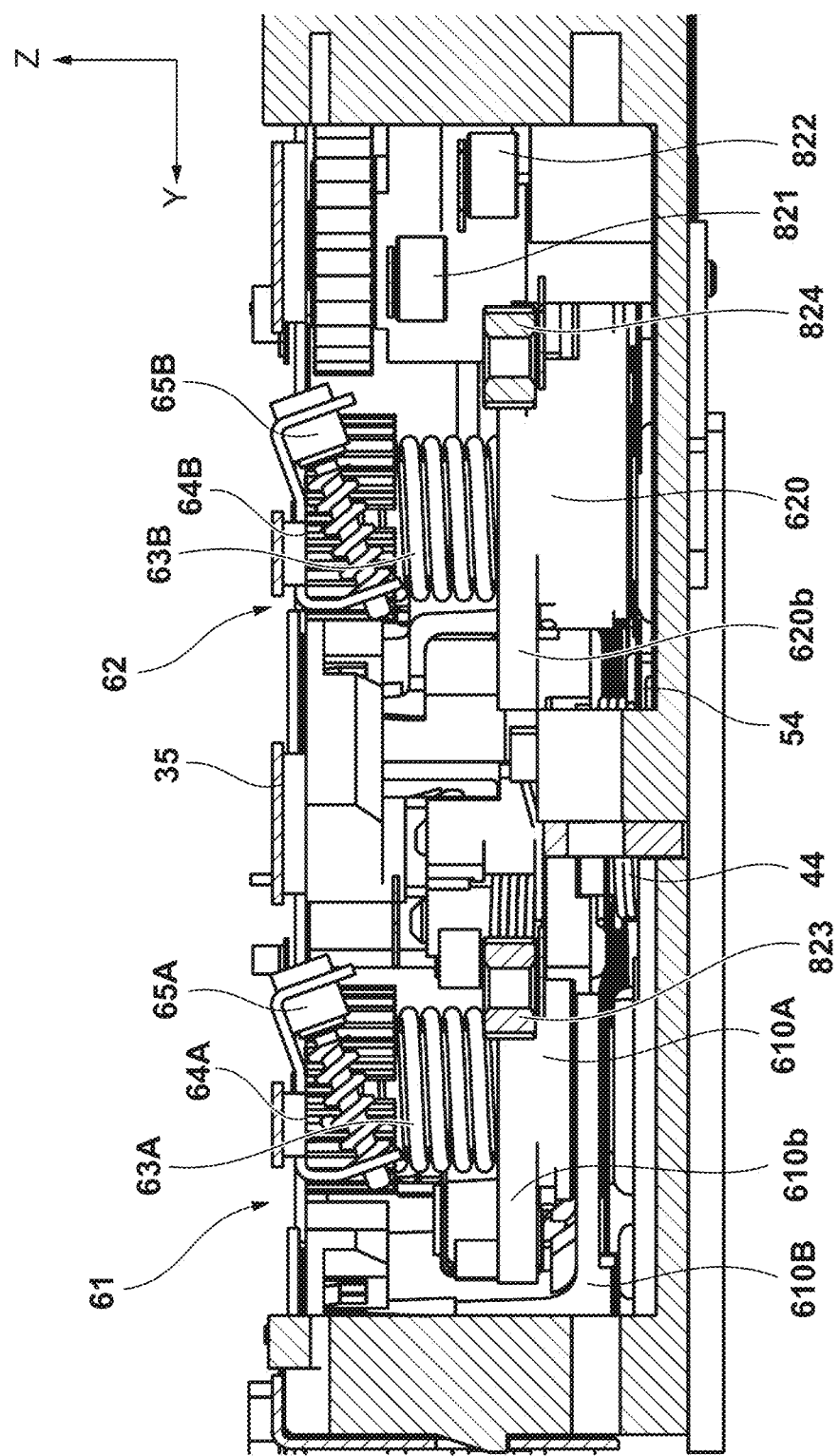
FIG. 10 is a diagram for illustrating a drive mechanism.
Figure 11:
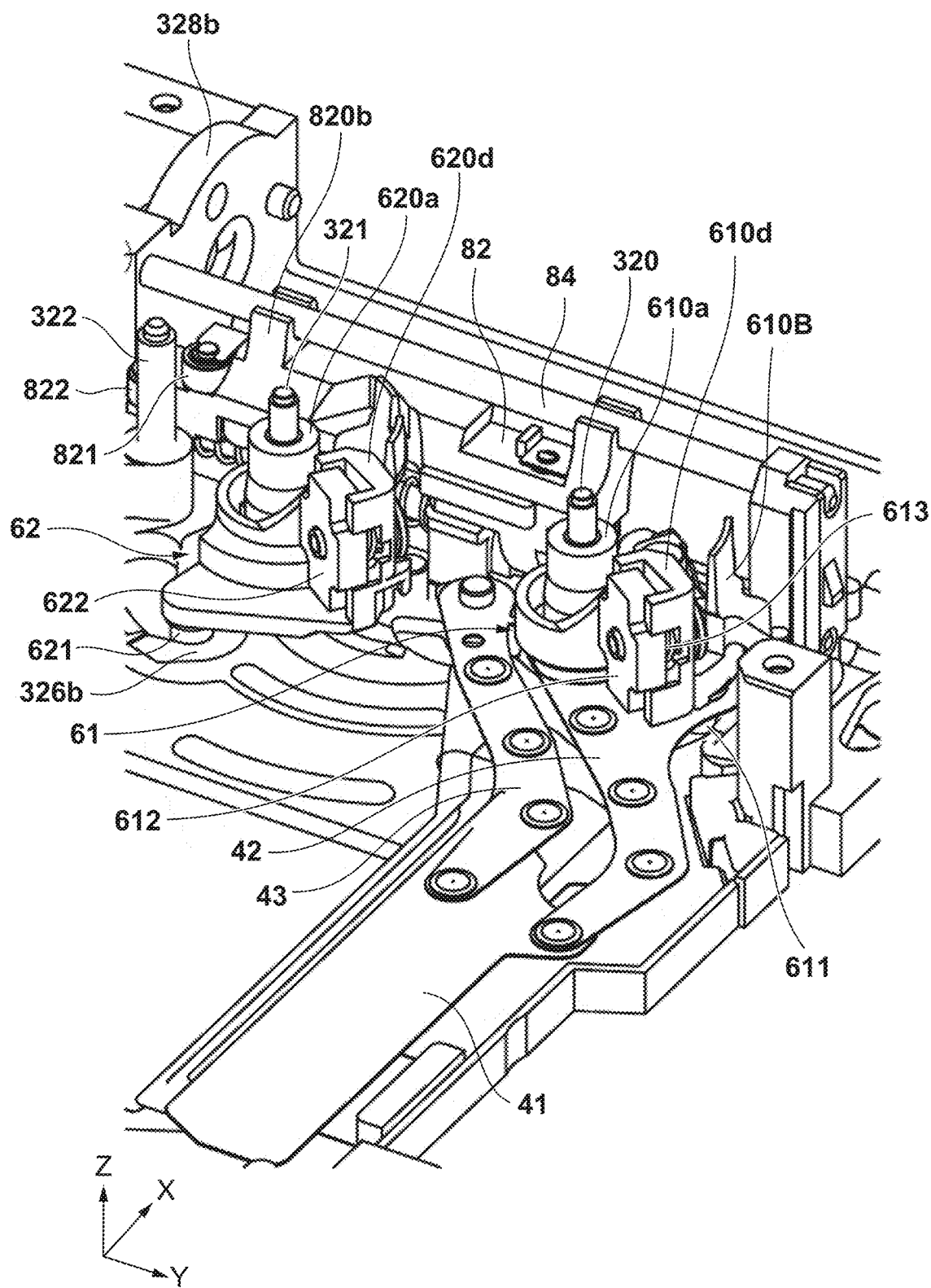
FIG. 11 is a diagram for illustrating the drive mechanism.
Figure 12:
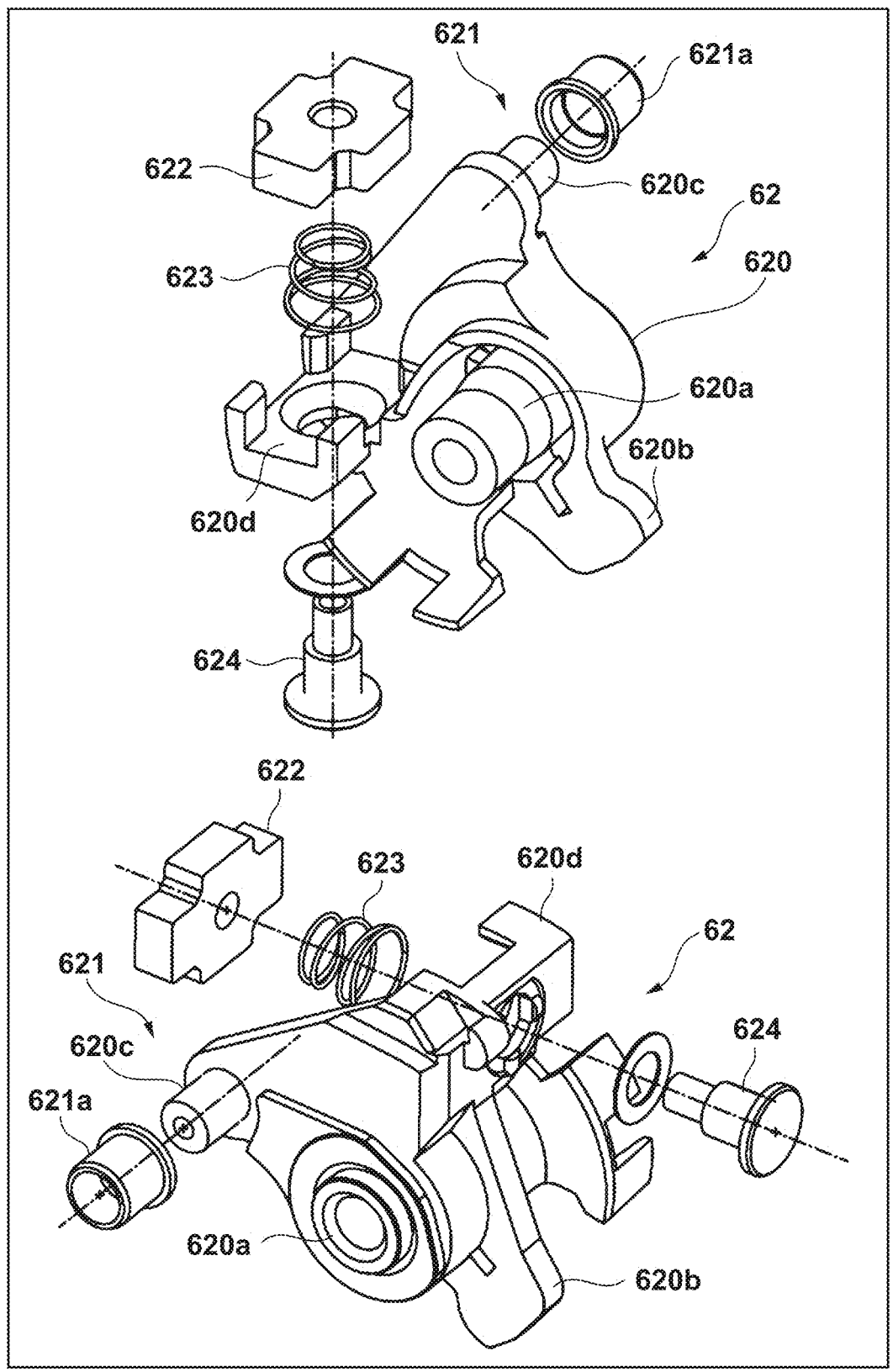
FIG. 12 is a diagram for illustrating a drive member for a rear curtain.
Figure 13:
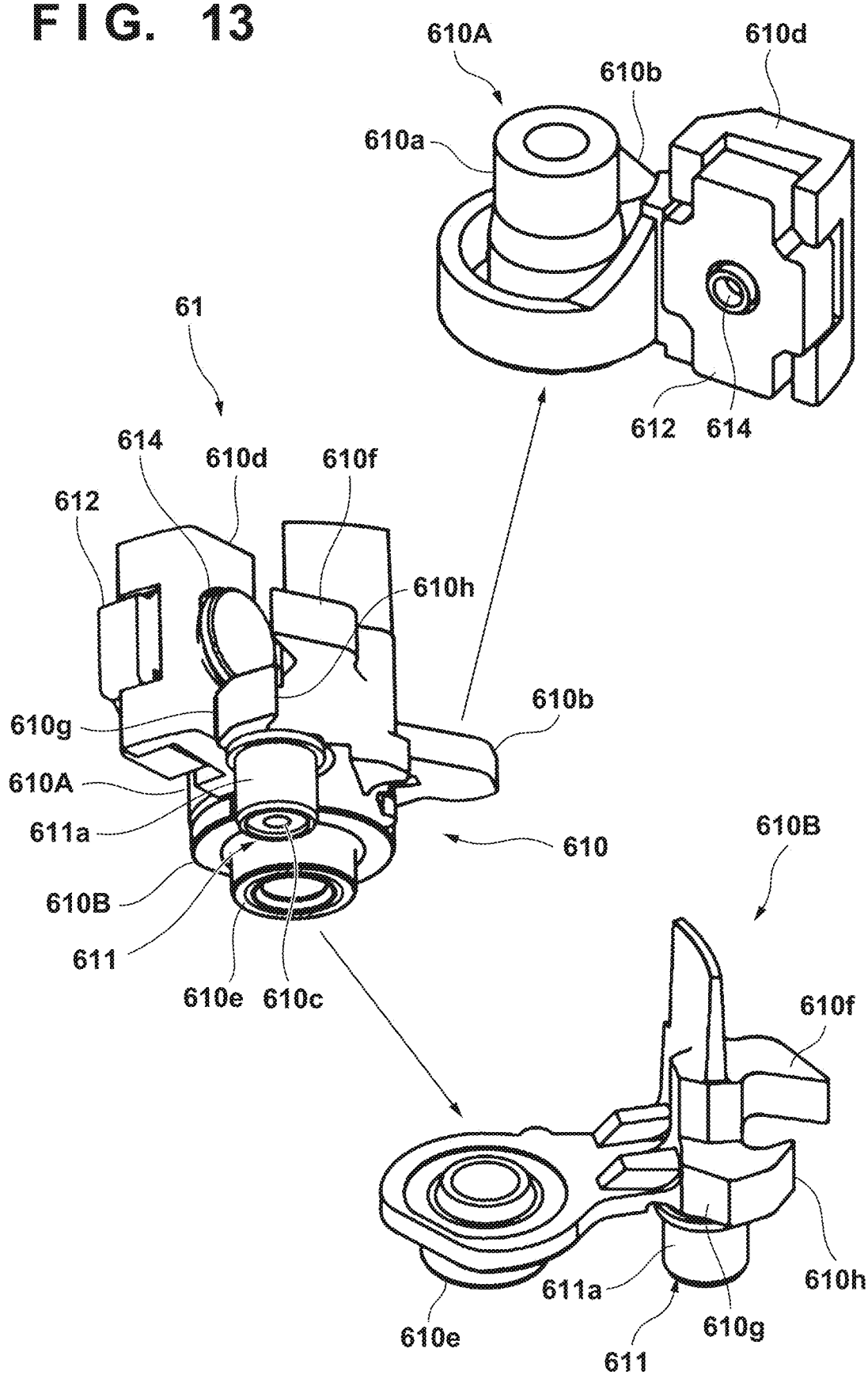
FIG. 13 includes a perspective view of a drive member for a front curtain and an exploded perspective view of the same.

The drive mechanism 60 will be described primarily with reference to FIGS. 4 and 10 to 13. FIG. 10 is a cross-sectional view of the drive mechanism 60 taken along the line I-I in FIG. 2. FIG. 11 is a partially exploded perspective view of the drive mechanism 60. FIG. 12 includes exploded perspective views of a drive member 62 for the rear curtain viewed in two directions. FIG. 13 includes a perspective view and an exploded perspective view of the drive member 61 for the front curtain.

The drive mechanism 60 is a mechanism that drives the blade mechanism 50 and includes the drive member 62, a drive spring 63B, a worm wheel 64B, a worm 65B, and a retention mechanism 66B.

The drive member 62 includes a main body member 620, an armature 622, a spring 623, and an armature shaft 624. The main body member 620 is made of a synthetic resin, for example. The main body member 620 includes a tubular part 620a that extends in the Z direction. The shaft 321 of the base plate 30 is inserted into the tubular part 620a, and the drive member 62 can rotate about the shaft 321. The rotational position of the drive member 62 (the main body member 620) is detected by an optical sensor PI2 (see FIGS. 2 and 3). The optical sensor PI2 is supported in a holder HD2 (see FIGS. 3 and 5) on the base plate 30.

An end part of the tubular part 620a on the side of the base plate 30 passes through the shaft hole (which is not shown but is similar to the shaft hole 42a of the primary arm 42 of the blade mechanism 40) of the primary arm 52 of the blade mechanism 50, and an end part of the tubular part 620a on the opposite side passes through the drive spring 63B and the worm wheel 64B. The worm wheel 64B is rotatably supported on the tubular part 620a.

The main body member 620 includes a pin base part 620c that protrudes in the Z direction. A pin cover 621a that is made of metal and has a cylindrical shape is attached to the pin base part 620c in order to improve durability, and the pin base part 620c and the pin cover 621a form a drive pin 621 for blades. The drive pin 621 passes through the engagement hole (which is not shown but is similar to the engagement hole 42b of the primary arm 42 of the blade mechanism 40) of the primary arm 52 of the blade mechanism 50, and moves in a guide groove 326B (see FIG. 6) formed in the base plate 30. The guide groove 326B is provided with a shock-absorbing member 326b made of rubber or the like at an end thereof that stops the drive pin 621 moving in the guide groove 326B, and the shock-absorbing member 326b buffers the impact when the drive pin 621 abuts against the peripheral wall of the guide groove 326B.

The main body member 620 includes an engagement part 620b that radially protrudes beyond the tubular part 620a. The engagement part 620b receives an operational force from the charge slider 82 during the charge operation of the charge mechanism 80. The operational force makes the drive member 62 rotate clockwise about the shaft 321. The main body member 620 further includes an armature supporting part 620d. The armature 622 is attached to the armature supporting part 620d by the armature shaft 624 with the spring 623 interposed therebetween. The armature 622 is releasably held by the retention mechanism 66B under a magnetic force of the retention mechanism 66B.

In this embodiment, the drive spring 63B is a helical torsion spring. The drive spring 63B is provided between the drive member 62 and the worm wheel 64B, and is fastened to the drive member 62 at one end thereof and to the worm wheel 64B at the other end thereof. The worm 65B is rotatably supported on the MG base plate 35. The worm 65B is supported on the MG base plate 35 with the axis thereof being inclined from the Z direction, so that the dimension of the shutter 2 in the Z direction can be reduced compared with a configuration in which the axis of the worm 65B extends in the Z direction.

The worm 65B is engaged with the worm wheel 64B, and therefore the position of the worm wheel 64B is fixed in the rotational direction. Even when the drive member 62 rotates about the shaft 321 from an initial position to a charged position during the charge operation, the worm wheel 64B is fixed because the worm wheel 64B is engaged with the worm 65B. As a result, elastic energy for driving the blades is accumulated in the drive spring 63B. The charged drive spring 63B exerts a biasing force that brings the group of blades 51 into the closed state. Although the drive spring 63B and the spring 54 exert biasing forces to the group of blades 51 in the opposite directions, the biasing force of the drive spring 63B is sufficiently higher than that of the spring 54.

When a driver or the like makes the worm 65B rotate, the phase of the worm wheel 64B with respect to the shaft 321 in the rotational direction changes. That is, the amount of elastic deformation of the drive spring 63B during charging is adjusted, and the running speed of the group of blades 51 (curtain speed) can be adjusted.

The retention mechanism 66B retains the drive member 62 at the charged position under a magnetic force. FIG. 4 shows the drive member 62 retained in the charged state. The retention mechanism 66B is an electromagnet that includes a yoke 66a and a coil 66b wound around the yoke 66a. The yoke 66a is supported on the MG base plate 35. The retention mechanism 66B attracts the armature 622 when the coil 66b is energized, and the retention mechanism 66B releases the armature 622 when the coil 66b is stopped being energized. In this way, the drive member 62 can be switchably retained in the charged position and released from the charged position. When the drive member 62 is released, the drive member 62 rotates counterclockwise into the state ST2 shown in FIG. 7 under the biasing force of the drive spring 63B, and the group of blades 51 runs into the closed state.

A mechanism that drives the blade mechanism 40 will be described. The drive mechanism 60 is a mechanism that drives the blade mechanism 40 and includes the drive member 61, a drive spring 63A, a worm wheel 64A, a worm 65A, and a retention mechanism 66A. The mechanism that drives the blade mechanism 40 is basically the same as the mechanism that drives the blade mechanism 50 but differs from the mechanism in structure of the drive member 61.

The drive member 61 includes a main body member 610, an armature 612, a spring 613, and an armature shaft 614. The main body member 610 is formed by two parts, a main body part 610A and an arm part 610B, which are both made of a synthetic resin, for example. The main body part 610A includes a tubular part 610a that extends in the Z direction, and the arm part 610B includes a tubular part 610e that is coaxial with the tubular part 610a. The shaft 320 of the base plate 30 is inserted into the tubular parts 610a and 610e, and the main body part 610A and the arm part 610B can independently rotate about the shaft 320.

The rotational position of the drive member 61 (the main body part 610A) is detected by an optical sensor PI1 (see FIGS. 2 and 3). The optical sensor PI1 is supported in a holder HD1 (see FIGS. 3 and 5) on the base plate 30.

The tubular part 610e passes through the shaft hole 42a of the primary arm 42 of the blade mechanism 40, and the tubular part 610a passes through the drive spring 63A and the worm wheel 64A. The worm wheel 64A is rotatably supported on the tubular part 610a.

The arm part 610B includes a pin base part 610c that protrudes in the Z direction. A pin cover 611a that is made of metal and has a cylindrical shape is attached to the pin base part 610c in order to improve durability, and the pin base part 610c and the pin cover 611a form a drive pin 611 for blades. The drive pin 611 passes through the engagement hole 42b of the primary arm 42 of the blade mechanism 40, and moves in a guide groove 326A (see FIG. 6) formed in the base plate 30. The guide groove 326A is provided with a shock-absorbing member 326a made of rubber or the like at an end thereof that stops the drive pin 611 moving in the guide groove 326A, and the shock-absorbing member 326a buffers the impact when the drive pin 611 abuts against the peripheral wall of the guide groove 326A.

The main body part 610A includes an engagement part 610b that radially protrudes beyond the tubular part 610a. The engagement part 610b receives an operational force from the charge slider 82 during the charge operation of the charge mechanism 80. The operational force makes the main body part 610A rotate clockwise about the shaft 320. The main body part 610A further includes an armature supporting part 610d. The armature 612 is attached to the armature supporting part 610d by the armature shaft 614 with the spring 613 interposed therebetween. The armature 612 is releasably held by the retention mechanism 66A under a magnetic force of the retention mechanism 66A.

In this embodiment, the drive spring 63A is a helical torsion spring. The drive spring 63A is provided between the main body part 610A and the worm wheel 64A, and is fastened to the main body part 610A at one end thereof and to the worm wheel 64A at the other end thereof. The worm 65A is rotatably supported on the MG base plate 35. The worm 65A is supported on the MG base plate 35 with the axis thereof being inclined from the Z direction, so that the dimension of the shutter 2 in the Z direction can be reduced compared with a configuration in which the axis of the worm 65A extends in the Z direction.

The worm 65A is engaged with the worm wheel 64A, and therefore the position of the worm wheel 64A is fixed in the rotational direction. Even when the drive member 61 (the main body part 610A) rotates about the shaft 320 from an initial position to a charged position during the charge operation, the worm wheel 64A is fixed because the worm wheel 64A is engaged with the worm 65A. As a result, elastic energy for driving the blades is accumulated in the drive spring 63A. The charged drive spring 63A exerts a biasing force that brings the group of blades 41 into the open state. Although the drive spring 63A and the spring 44 exert biasing forces to the group of blades 41 in the opposite directions, the biasing force of the drive spring 63A is sufficiently higher than that of the spring 44.

The main body part 610A and the arm part 610B can independently rotate about the shaft 320, and the spring 44 biases the arm part 610B clockwise via the secondary arm 43. The arm part 610B includes an engagement part 610g that abuts against the armature supporting part 610d. Since the engagement part 610g is pressed against the armature supporting part 610d under the biasing force of the spring 44, when the main body part 610A rotates counterclockwise under the biasing force of the charged drive spring 63A, the arm part 610B rotates integrally with the main body part 610A, and the group of blades 41 runs into the open state. In this embodiment, the engagement part 610g is formed in a root part of the pin base part 610c. Since the pin base part 610c is placed under high load, the root part of the pin base part 610c preferably has an increased thickness. The engagement part 610g serves to add to the thickness of the pin base part 610c and therefore can improve the rigidity of the pin base part 610c in a compact manner.

When a driver or the like makes the worm 65A rotate, the phase of the worm wheel 64A with respect to the shaft 320 in the rotational direction changes. That is, the amount of elastic deformation of the drive spring 63B during charging is adjusted, and the running speed of the group of blades 41 (curtain speed) can be adjusted.

The retention mechanism 66A retains the drive member 61 (the main body part 610A) at the charged position under a magnetic force. The state ST1 in FIG. 7 is a state where the drive member 61 is retained in the charged state. The retention mechanism 66A is an electromagnet that includes a yoke 66a and a coil 66b wound around the yoke 66a. The yoke 66a is supported on the MG base plate 35. The retention mechanism 66A attracts the armature 612 when the coil 66b is energized, and the retention mechanism 66A releases the armature 612 when the coil 66b is stopped being energized. In this way, the drive member 61 can be switchably retained in the charged position and released from the charged position. When the drive member 61 is released, the drive member 61 rotates counterclockwise into the state ST2 shown in FIG. 7 under the biasing force of the drive spring 63A, and the group of blades 41 runs into the open state.

<4. Locking Mechanism and Bounce Suppression Mechanism>

Figure 14:
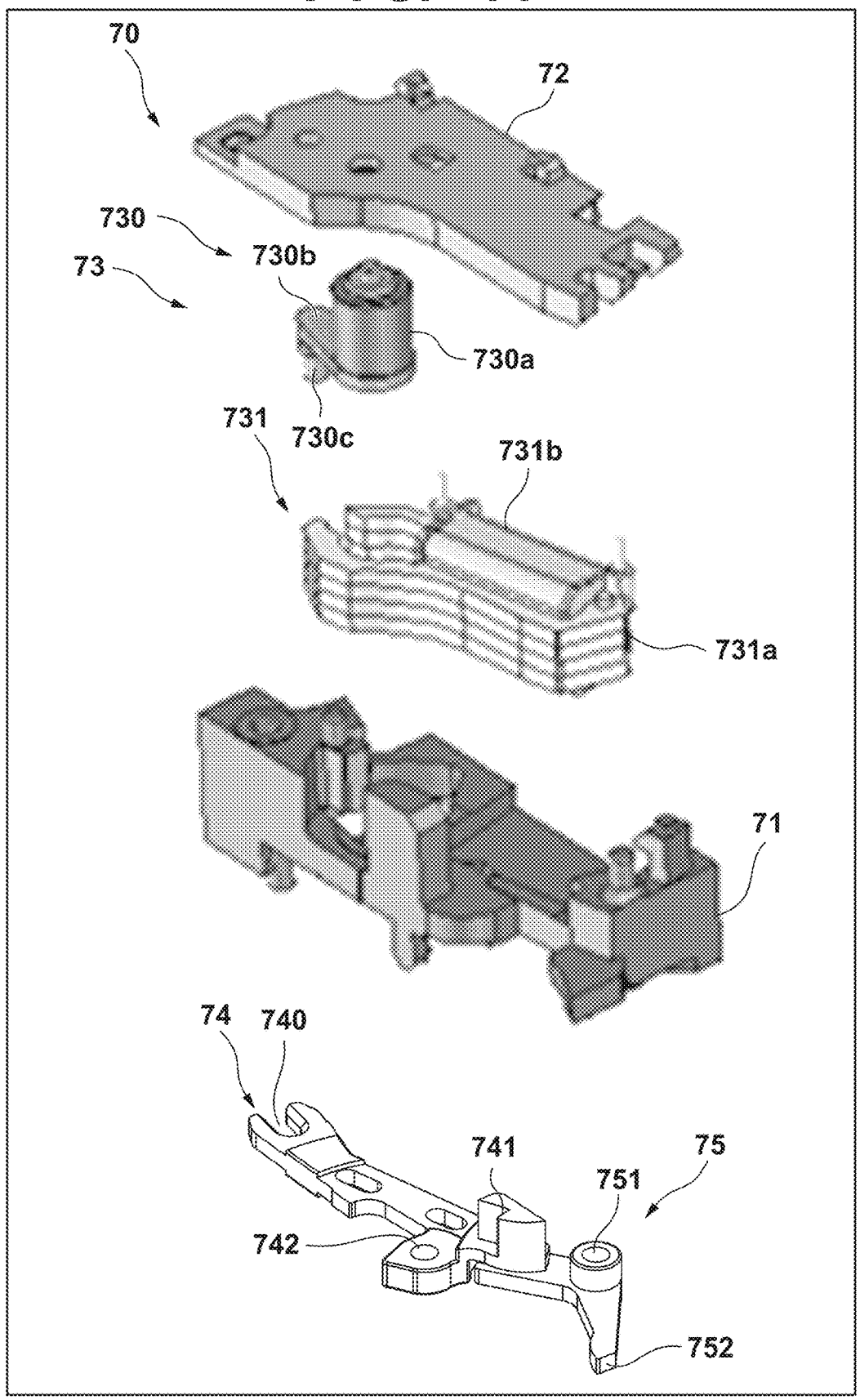
FIG. 14 is an exploded perspective view of a locking mechanism.
Figure 15:
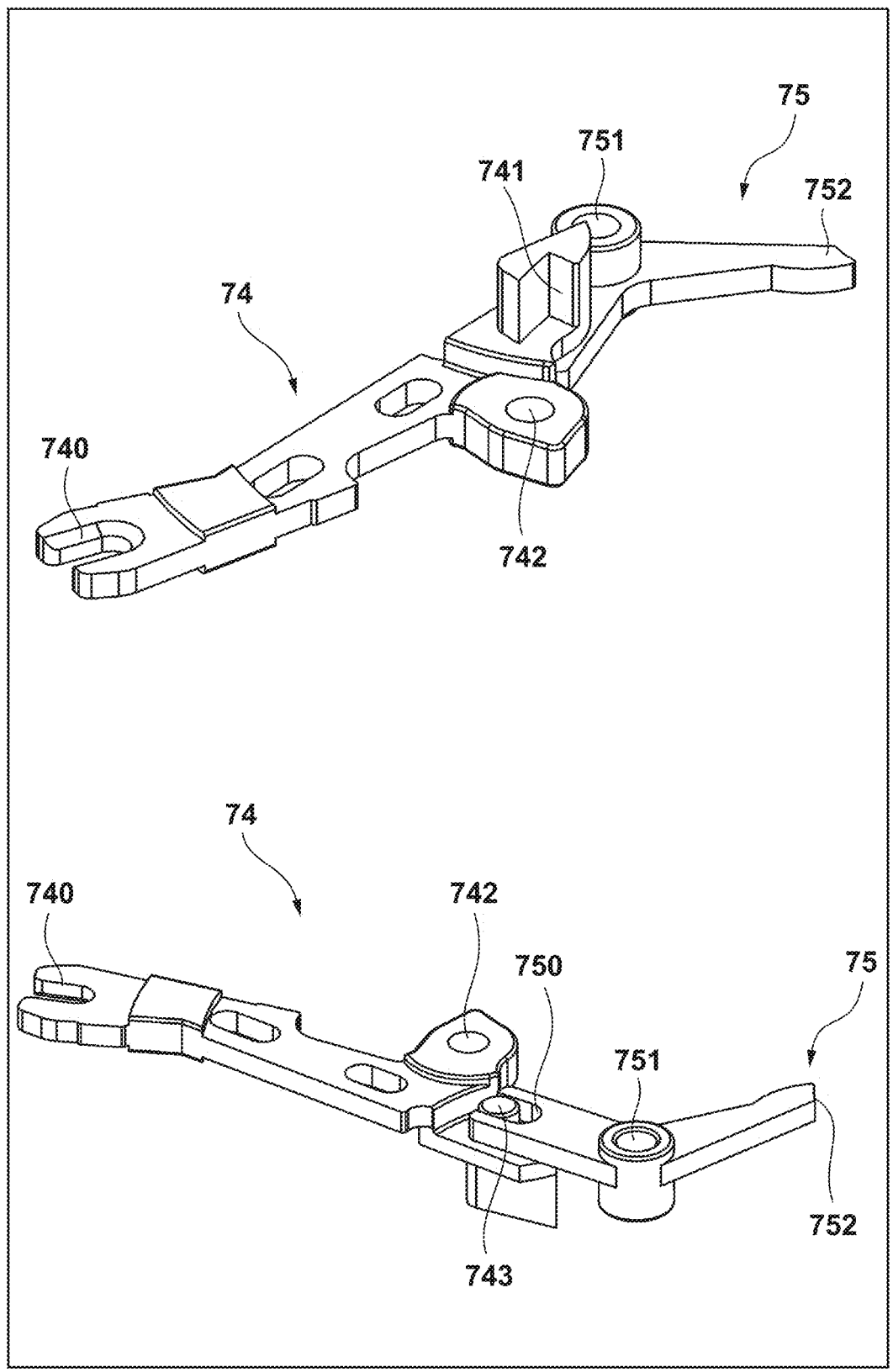
FIG. 15 includes perspective views of a locking lever and a suppression lever viewed in two directions.

The locking mechanism 70 and a bounce suppression mechanism for the group of blades 41 will be described. First, the locking mechanism 70 and the bounce suppression mechanism for the group of blades 41 will be described primarily with reference to FIGS. 14 and 15. FIG. 14 is an exploded perspective view of the locking mechanism 70. FIG. 15 includes perspective views of an engagement lever and a suppression lever viewed in two directions.

The locking mechanism 70 is a mechanism capable of maintaining the group of blades 41 in the open state while maintaining the main body part 610A in the charged position. As described above, in this embodiment, the main body part 610A and the arm part 610B can independently rotate about the shaft 320. When the drive member 61 is moved to the charged position during the charge operation, the locking mechanism 70 locks the arm part 610B. Therefore, while the main body part 610A moves to the charged position, the arm part 610B can remain in the initial position, and the opening 31a can be kept open until immediately before the shutter is released. When the arm part 610B having been locked by the locking mechanism 70 is unlocked, the arm part 610B also rotates to the charged position under the biasing force of the spring 44, and the group of blades 41 is closed.

The locking mechanism 70 includes a base member 71, a cover member 72, an actuator 73, and a locking lever 74. A suppression lever 75 is engaged with the locking lever 74. The base member 71 supports the actuator 73, and the cover member 72 covers the actuator 73. The base member 71 is attached to the base plate 30.

In this embodiment, the actuator 73 is a rotary solenoid actuator, and includes a rotor 730 and an electromagnet 731. The rotor 730 includes a cylindrical permanent magnet 730a and an arm member 730b attached to the permanent magnet 730a. The arm member 730b is provided with a drive pin 730c at one end thereof to form an integral unit. The electromagnet 731 includes a yoke 731a and a coil 731b wound around the yoke 731a. The yoke 731a includes a C-shaped part, into which the rotor 730 is inserted. When the coil 731b is energized, the rotor 730 rotates about an axis in the Z direction. The direction of rotation of the rotor 730 can be changed by changing the direction of energization of the coil 731b.

The locking lever 74 has a shaft hole 742 through which a shaft 323a (see FIG. 6) provided on the base plate 30 is inserted, and is rotatably supported on the shaft 323a. An engagement part 740, which is engaged with the drive pin 730c of the rotor 730, is formed on one end part of the locking lever 74. In this embodiment, the engagement part 740 has a C-shape. A locking part 741 is formed on another end part of the locking lever 74. The locking part 741 has an L-shaped cross section, and is engaged with an engagement part 610f of the arm part 610B of the drive member 61 to lock the arm part 610B. A pin-like link part 743 is formed on a back surface of the locking part 741.

The suppression lever 75 has a shaft hole 751 through which a shaft 323b (see FIG. 6) provided on the base plate 30 is inserted, and is rotatably supported on the shaft 323b. A link part 750, which is engaged with the link part 743 of the locking lever 74, is formed on one end part of the suppression lever 75. In this embodiment, the link part 750 has a C-shape. A locking part 752 is formed on another end part of the suppression lever 75. The locking part 752 is engaged with an engagement part 610h of the arm part 610B of the drive member 61 to suppress bouncing of the arm part 610B, that is, bounce of the group of blades 41.

Operations of the locking mechanism 70 and the suppression lever 75 will be described with reference to FIG. 27. This drawing is a diagram for illustrating an operation of the shutter 2. A state ST31 is a state where the rotor 730 is in a locking position, and a state ST32 is a state where the rotor 730 is in a releasing position. Energization of the coil 731b is stopped when the rotor 730 reaches the locking position or the releasing position.

When the rotor 730 is in the locking position, the locking part 741 can be engaged with the engagement part 610f of the arm part 610B of the drive member 61. In the state ST31, the main body part 610A is in the charged position, the arm part 610B is locked in the initial position by the locking lever 74. Therefore, the group of blades 41 is in the open state.

When the rotor 730 rotates from the locking position to the releasing position, the locking lever 74 rotates counterclockwise about the shaft 323a to disengage the locking part 741 and the engagement part 610f. The arm part 610B rotates to the charged position under the biasing force of the spring 44, and the group of blades 41 is closed.

The suppression lever 75 rotates in the opposite direction to the locking lever 74. If the rotor 730 is in the releasing position, as shown by the state ST32, the locking part 752 can be engaged with the engagement part 610h of the arm part 610B. This engagement prevents the group of blades 41 from bouncing from the closed state toward the open state. More specifically, the group of blades 41 is prevented from bouncing toward the open state after moving from the open state to the closed state under the biasing force of the spring 44. When the rotor 730 rotates from the releasing position to the locking position, the suppression lever 75 rotates counterclockwise about the shaft 323b to disengage the locking part 752 and the engagement part 610h. Then, the group of blades 41 can run from the closed state to the open state under the biasing force of the drive spring 63A.

<5. Charge Mechanism>

Figure 16:
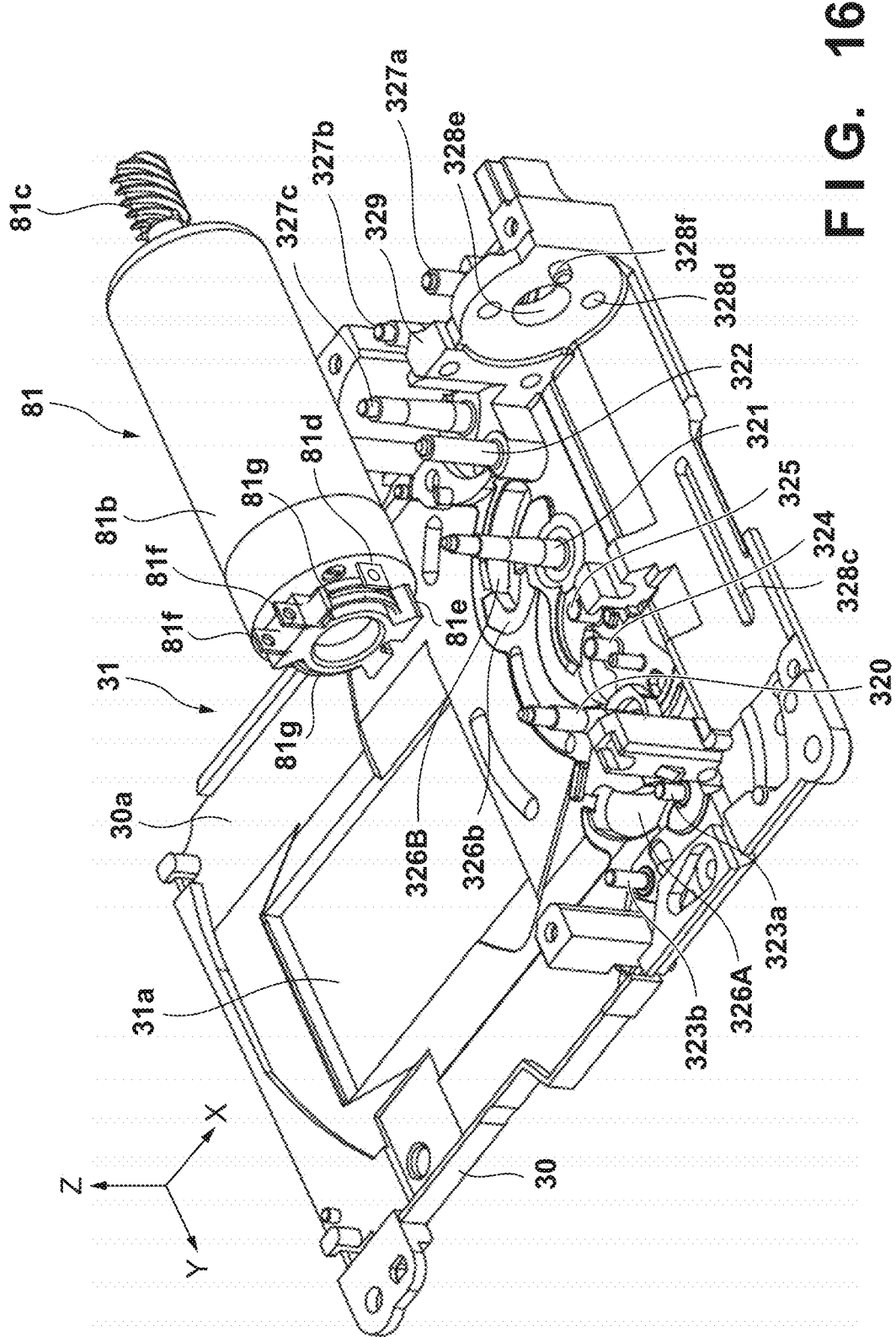
FIG. 16 is a diagram for illustrating a supporting structure for a motor.
Figure 17:
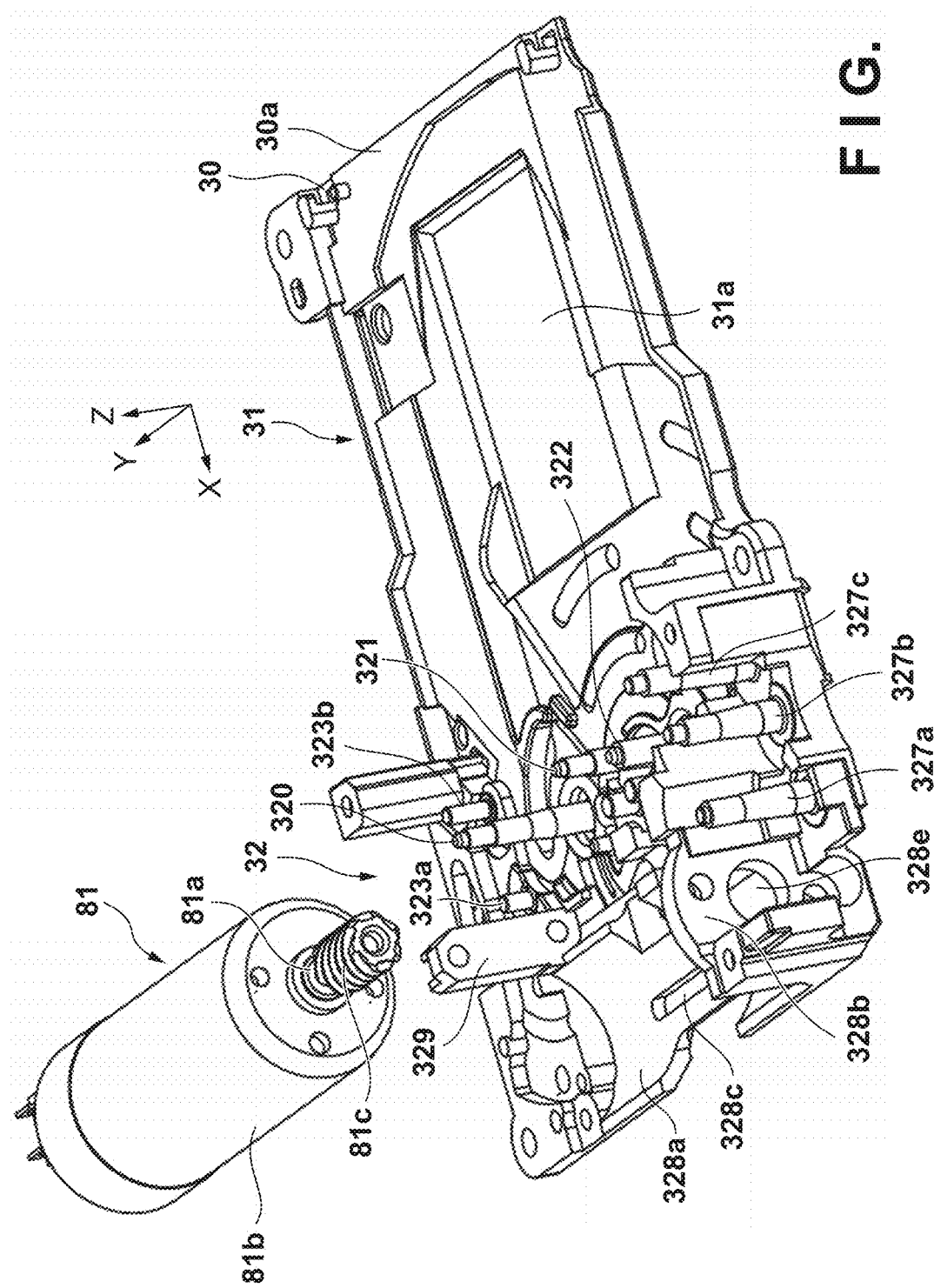
FIG. 17 is a diagram for illustrating the supporting structure for the motor.
Figure 18:
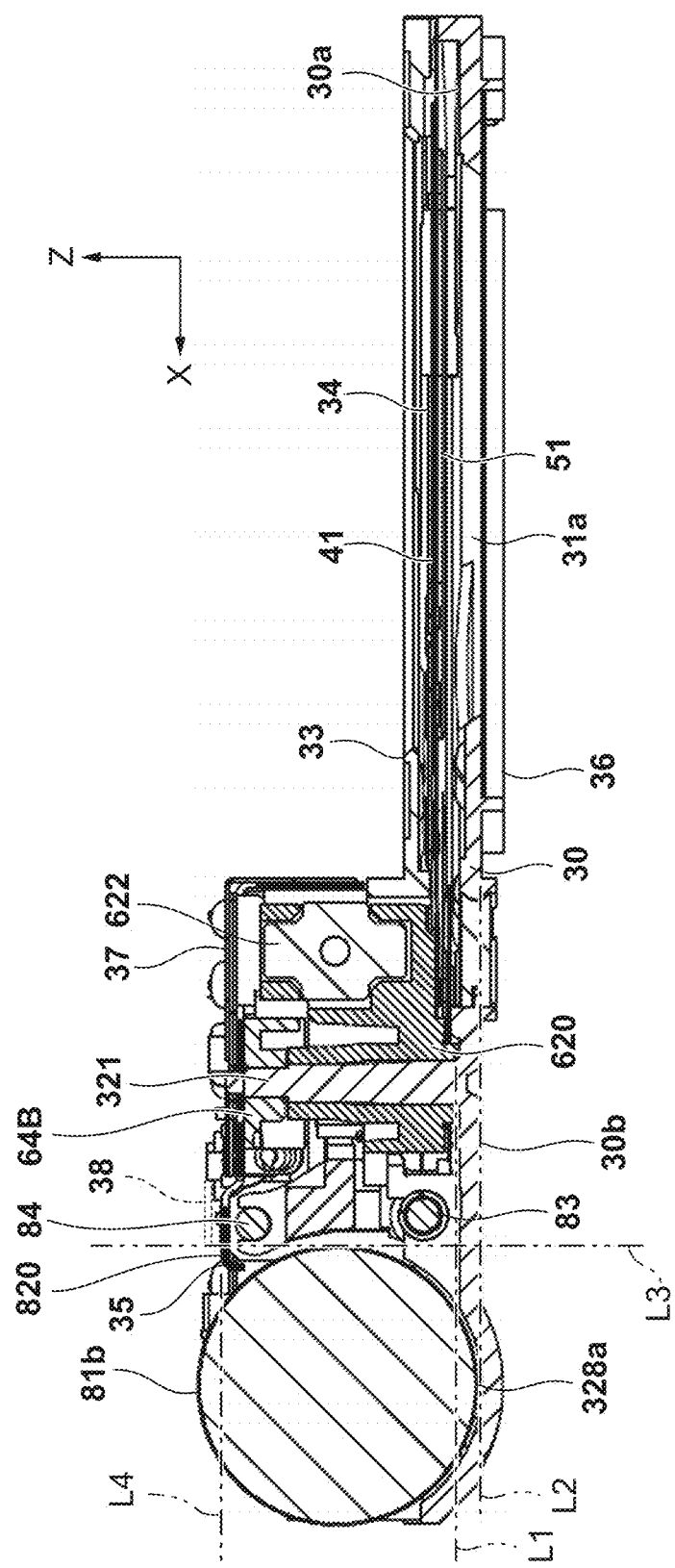
FIG. 18 is a diagram for illustrating the supporting structure for the motor.

The charge mechanism 80 will be described. First, the structure of the base plate 30 that supports the motor 81 will be described primarily with reference to FIGS. 16 to 18. FIGS. 16 to 18 are diagrams for illustrating the motor supporting structure. FIGS. 16 and 17 are exploded perspective views of the motor 81 and the base plate 30, and FIG. 18 is a cross-sectional view taken along the line II-II in FIG. 2.

A machinery supporting section 32 of the base plate 30 includes a motor supporting part 328 that supports the motor 81. The motor supporting part 328 includes a recess part 328a that receives the body part 81b of the motor 81, and an attachment part 328c that fixes the body part 81b. The attachment part 328b is formed at one end of the recess part 328a in the Y direction to protrude in the Z direction. The attachment part 328b has an attachment hole 328d for fixing an end part of the body part 81b of the motor 81, and a hole 328e through which the rotating shaft 81a of the motor 81 is inserted. The attachment part 328b further has a pin-like engagement part 328f that is engaged with a hole formed in an end face of the body part 81b to regulate rotation of the body part 81b.

The motor 81 is disposed on the recess part 328a and fixed to the attachment part 328b. The motor 81 is supported with a part thereof embedded in the base plate 30 in the Z direction below a surface 30a (see the line L1 in FIG. 18) of the opening formation section 31 and the machinery supporting section 32 around the recess part 328a. The motor 81 is embedded to such an extent that the body part 81b and the opening 31a overlap with each other when viewed in the direction of arrangement of the opening 31a and the motor 81 (the X direction). As can be seen from FIG. 18, the opening 31a is located between the line L1 and the line L2 and overlaps with the body part 81b. This arrangement allows the thickness of the shutter 2 in the Z direction to be reduced even when a high power motor having a large size is adopted as the motor 81 and thereby allows downsizing of the shutter 2. If the motor 81 is heavy, the motor 81 might otherwise come off the motor supporting part 328 when the imaging apparatus 10 is accidentally dropped. However, the recess part 328a can serve as a come-off prevention wall and prevent the motor 81 from coming off the motor supporting part 328.

The recess part 328a has a uniform thickness. Whereas the recess part 328a is recessed below the surroundings on the side of the surface 30a of the base plate 30, the recess part 328a protrudes beyond a surface 30b (see the line L2 in FIG. 18), which is opposite to the surface 30a, of the opening formation section 31 and the machinery supporting section 32 around the recess part 328a. Since all parts of the base plate 30 have a generally uniform thickness, an increase in weight of the base plate 30 can be prevented. For example, the cover plate 36 can be provided within the Z directional range of the protrusion of the recess part 328a, so that the wasted space can be reduced.

The recess part 328a extends in the Y direction, and the cross section of the recess part 328a taken along the X direction has an arc shape that conforms to the shape of the body part 81b of the motor 81, which has a cylindrical shape. Since the recess part 328a has the shape of a curved shell, the motor supporting part 328 can be reduced in weight and improved in rigidity. In addition, since the recess part 328a conforms to the outer shape of the body part 81b, a gap that leads to a wasted space can be reduced, and the functionality of the recess part 328a as the come-off prevention wall for the motor 81 can be enhanced. The peripheral surface of the body part 81b may be in contact with or slightly separated from the bottom surface of the recess part 328a. In either case, in this embodiment, a slit 328c that penetrates the bottom wall of the recess part 328a is formed, so that the heat radiation performance of the motor 81 can be improved.

As shown in FIG. 16, the motor 81 is provided with a motor terminal 81d at the other end part in the Y direction. During manufacture of the motors 81, the motor terminals 81d are crimped while adjusting the phase of the motor terminals 81d with respect to the respective motors 81. Therefore, the motor terminals 81d may be fixed at angles that vary in a range of approximately 20 degrees about the output shaft. When the motor 81 is mounted, workability can be improved if the motor 81 is mounted with the terminal of the motor 81 facing in the positive Z direction. To this end, in this embodiment, a motor terminal member 81e that abuts against the motor terminal 81d and makes the terminal face in the positive Z direction is provided.

That is, the motor terminal member 81e is attached at the other end of the motor 81 in such a manner that an electrode part 81g, which is formed on a side surface thereof so as to conform to a curve, is in contact with the motor terminal 81d and a terminal 81f faces in the positive Z direction. The electrode part 81g has a predetermined length and conforms to the body part 81b of the motor 81 in the circumferential direction. Therefore, despite the variations of the motor terminals 81d described above, the electrode part 81g can be brought into contact with the motor terminal 81d with reliability, and the motor terminal member 81e can be easily fixed with the terminal 81f facing in the positive Z direction.

The motor terminal member 81e is positioned by fitting a projection formed on the other end part of the motor 81 into a hole formed at the center of the motor terminal member 81e. In addition, an end part of the motor terminal member 81e in the negative direction of the Z axis has a flat part. The motor terminal member 81e can be attached to the motor 81 at an appropriate angle by making this flat part abut against a positioning flat surface of a fixing jig that is used to fix the motor terminal member 81e to the motor 81.

Although the motor supporting part 328 is integrally provided on the base plate 30 in this embodiment, the motor supporting part 328 and the base plate 30 may be separate members. For example, the motor supporting part 328 and the motor 81 may be provided on the imaging apparatus 10.

Between the opening 31a and the motor 81, machinery relating to the operation of the groups of blades 41 and 51, such as machinery of the drive mechanism 60 and machinery of the charge mechanism 80 excluding the motor 81, are arranged. The machinery relating to the operation of the groups of blades 41 and 51 and the body part 81b are densely arranged in the X direction to reduce the size of the shutter 2 in the X direction. For example, the line L3 in FIGS. 18 and 21, which indicates the position of the end point in the X direction of the body part 81b, overlaps with the charge slider 82, as can be seen from the drawings. In other words, the body part 81b overlaps with the charge slider 82 when viewed in the Z direction. Although a part of the charge slider 82 on the side of a guide shaft 84 overlaps with the body part 81b when viewed in the Z direction, and a part of the charge slider 82 on the side of a guide shaft 83 is located substantially adjacent to the line L3 in this embodiment, the part on the side of the guide shaft 83 may also overlap with the body part 81b when viewed in the Z direction.

The MG base plate 35 serves also as a cover member that covers a gap between the body part 81b and the machinery relating to the operation of the groups of blades 41 and 51. In FIG. 18, an end part of the MG base plate 35 protrudes toward the body part 81b beyond the line L3 and covers the gap between the body part 81b and an upper part of the charge slider 82. As a result, entry of foreign matter into the machinery through the gap can be prevented. As shown by the line L4, the MG base plate 35 is disposed at a lower level (at a smaller distance in the Z direction) than the body part 81b with respect to the base plate 30. Since the MG base plate 35 protrudes toward the outer surface of the body part 81b at a location shifted from the end point of the body part 81b in the X direction indicated by the line L3, the shutter 2 can be reduced in size in the X direction. A space above the MG base plate 35 can be used for arrangement of a flexible substrate 38. That is, various mechanisms, the flexible substrate 38 or the like can be accommodated within the dimension of the body part 81b in the Z direction, and the shutter 2 can be reduced in size in the Z direction. The flexible substrate 38 may include wiring for sensors of the shutter 2 or wiring for coil energization. In particular, if an electrical component such as a capacitor is disposed on a surface of the flexible substrate 38 facing in the positive Z direction, and the cover member 37 described later is arranged to keep clear of the electrical component on the flexible substrate 38, the cover member 37 can be arranged while avoiding an increase of the thickness in the Z direction of the shutter 2.

The cover member 37 provided at the side of the MG base plate 35 closer to the opening 31a is L-shaped. The cover member 37 can prevent entry of foreign matter into the drive mechanism 60 from the X and Z directions.

Figure 19:
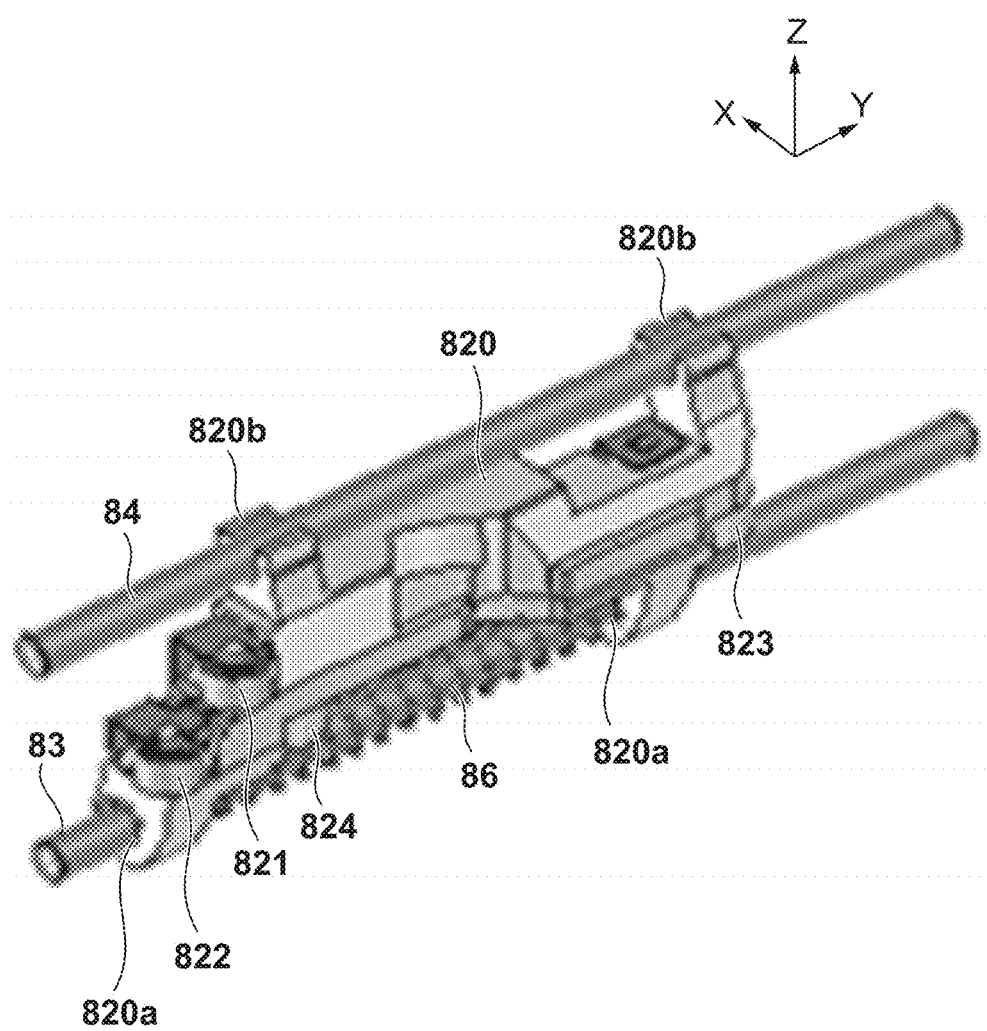
FIG. 19 is a diagram for illustrating a guide mechanism for a charge slider.
Figure 20:
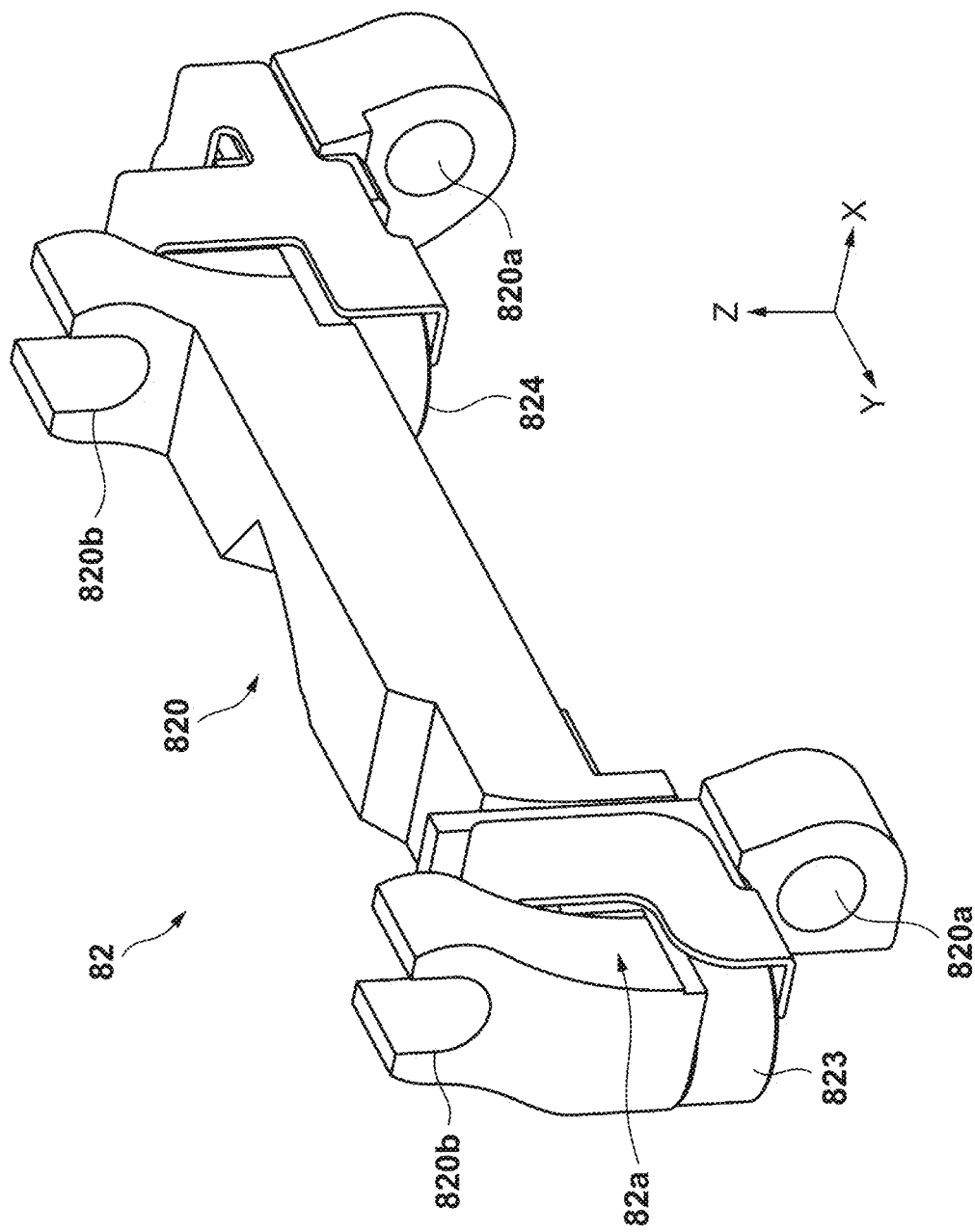
FIG. 20 is a perspective view of the charge slider.
Figure 21:
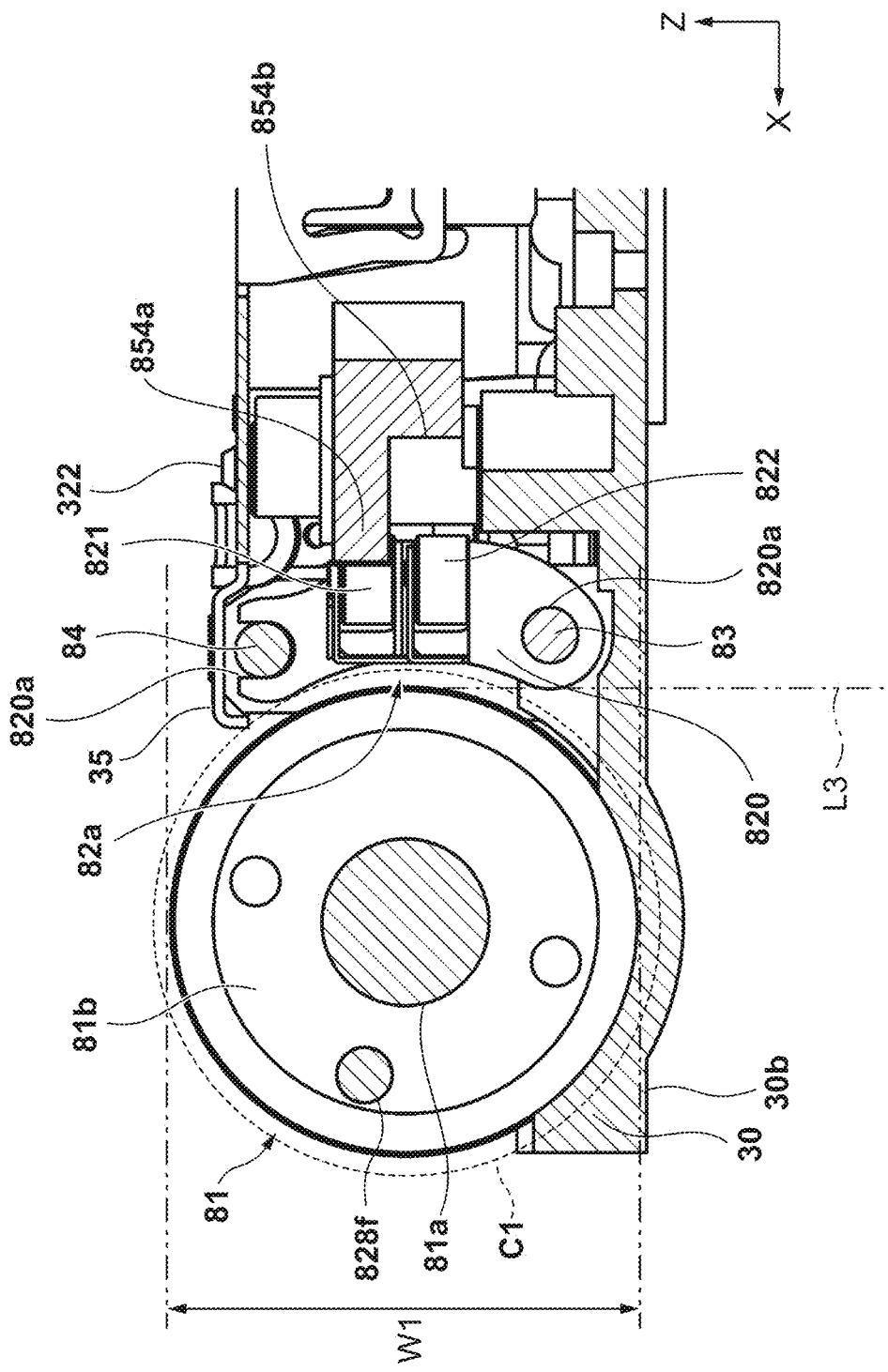
FIG. 21 is a diagram for illustrating a structure of a charge mechanism.
Figure 22:
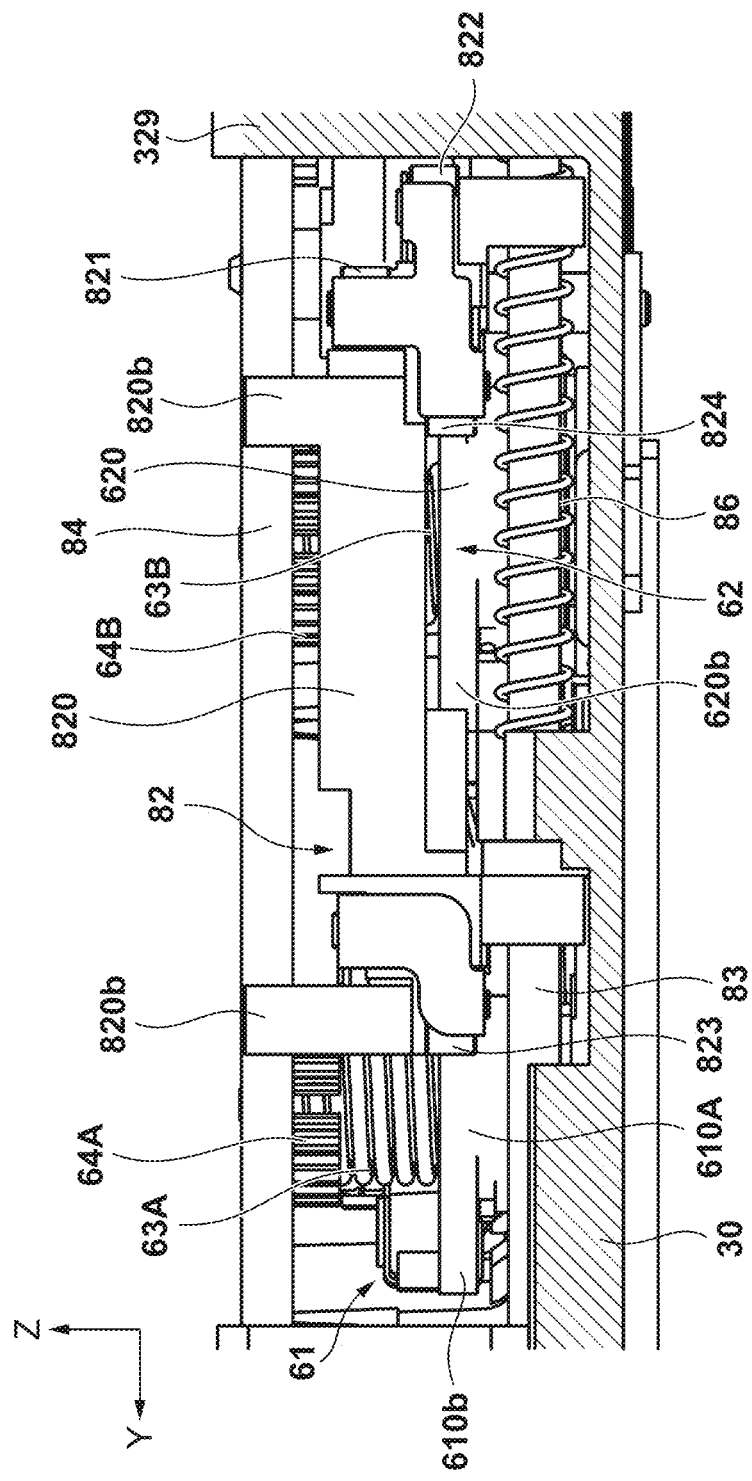
FIG. 22 is a diagram for illustrating the structure of the charge mechanism.
Figure 23:
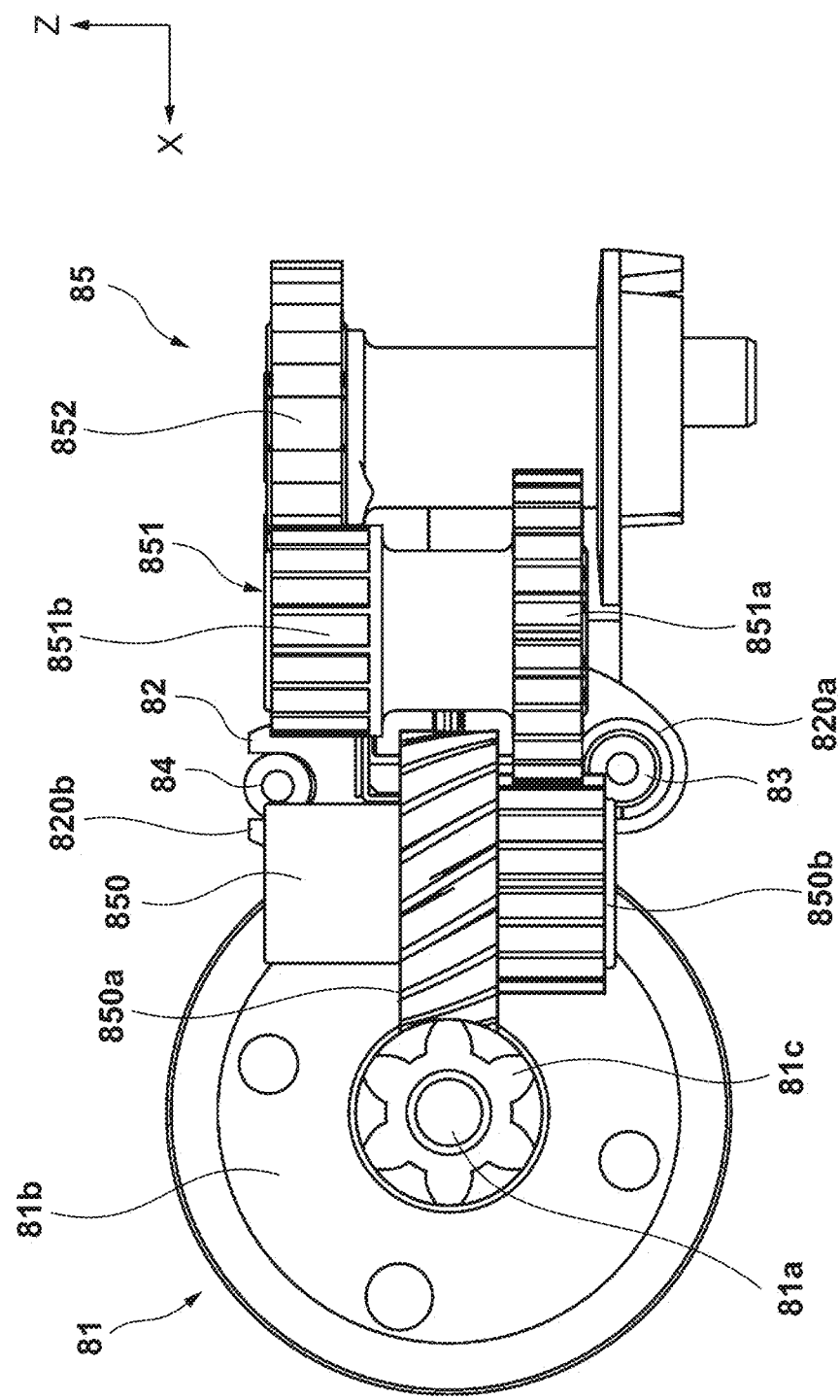
FIG. 23 is a diagram for illustrating a gear train.
Figure 24:
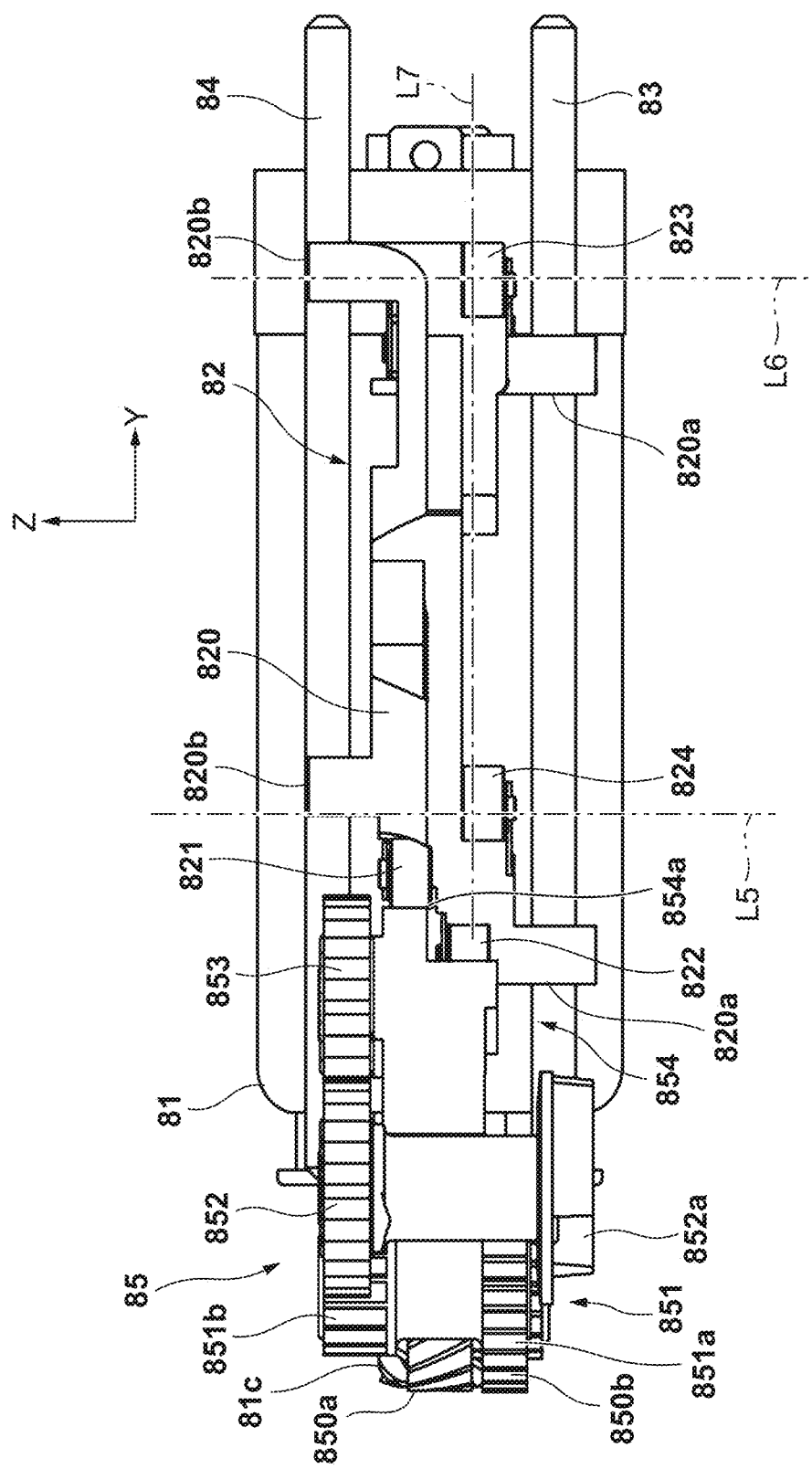
FIG. 24 is a diagram for illustrating the structure of the charge mechanism.

A configuration of the charge mechanism 80 excluding the motor 81 will be described primarily with reference to FIGS. 4 and 19 to 24. FIG. 19 is a diagram for illustrating a guide mechanism for the charge slider, FIG. 20 is a perspective view of the charge slider 82, FIGS. 21, 22 and 24 are diagrams for illustrating a structure of the charge mechanism 80, and FIG. 21 is a cross-sectional view taken along the line III-III in FIG. 3. FIG. 23 is a diagram for illustrating the gear train 85.

The charge mechanism 80 is a mechanism that is driven by the motor 81 and performs the charge operation on the drive springs 63A and 63B of the drive mechanism 60. The charge mechanism 80 includes the charge slider 82 that operates the drive mechanism 60, guide shafts 83 and 84 that guide movement of the charge slider 82, the gear train 85 that transmits the driving force of the motor 81 to the charge slider 82, and a coil spring 86 that biases the charge slider 82 toward the initial position.

The guide shafts 83 and 84 both extend in the Y direction and are spaced apart from each other in the Z direction. The base plate 30 includes a pair of supporting parts 329 that support the guide shafts 83 and 84 at both ends thereof. The supporting part 329 is a columnar member that stands in the Z direction, and has holes into which end parts of the guide shafts 83 and 84 are fitted. The charge slider 82 includes a pair of holes 820a through which the guide shaft 83 passes, and a pair of notches 820b through which the guide shaft 84 passes. The holes 820a are circular holes, and the notches 820b are U-shaped notches. Since the guide shaft 83 passes through the pair of holes 820a, the guide shaft 83 linearly guides the charge slider 82 in the Y direction. Since the guide shaft 84 passes through the pair of notches 820b, the guide shaft 84 prevents oscillation (rotation) of the charge slider 82 about the guide shaft 83. Although the pair of notches 820b may be circular holes as with the holes 820a, the notches are more advantageous from the viewpoint of ease of assembly of the charge slider 82 and size reduction of the parts.

Since the pair of holes 820a are spaced apart from each other in the Y direction, and the pair of notches 820b are spaced apart from each other in the Y direction, the charge slider 82 can be reduced in size and friction during sliding compared with a configuration in which a continuous hole or a continuous notch is adopted. Furthermore, the set of the pair of holes 820a and the guide shaft 83 and the set of the pair of notches 820b and the guide shaft 84 are spaced apart from each other in the Z direction, the shutter 2 can be reduced in size in the X direction compared with a configuration in which those sets are spaced apart from each other in the X direction.

The charge slider 82 includes a main body part 820, engagement parts 821 and 822, and operation parts 823 and 824. The main body part 820 is integrally made of a synthetic resin, for example, and includes parts in which the holes 820a and notches 820b described above are formed. As shown in FIG. 21, the main body part 820 is arranged adjacent to the body part 81b of the motor 81, and has a recess part 82a that is recessed in the X direction to keep clear of the body part 81b. The recess part 82a is formed by the parts in which the holes 820a and the notches 820b are formed being inclined toward the body part 81b. In this embodiment, a central part of the main body part 820 in the Z direction and a central part of the body part 81b in the Z direction are located at substantially the same level with respect to the surface 30a of the base plate 30. In view of this, the central part of the main body part 820 in the Z direction is positioned toward the opening 31a in the X direction, and the opposite end parts (in other words, the parts in which the holes 820a and the notches 820b are formed) of the main body part 820 are positioned toward the motor 81 in the X direction, so that the charge slider 82 is arranged close to the motor 81 while avoiding interference therebetween. As shown in FIG. 21, a side surface of the charge slider 82 close to the motor 81 has a curved profile (an arc-shaped profile) that generally conforms to a virtual circle C1 that is coaxial with the body part 81b. With this arrangement, the shutter 2 can be reduced in size in the X direction. Although the guide shafts 83 and 84 are located closer to the opening 31a than the line L3 in this embodiment, at least any one of the guide shafts 83 and 84 may be partially located closer to the motor 81 than the line L3. In that case, the shutter 2 can be further reduced in size in the X direction.

The charge slider 82 is located within a width (diameter) W1 of the body part 81b of the motor 81 in the Z direction. Thus, the thickness of the shutter 2 in the Z direction can be generally smaller than the diameter of the motor 81, so that the shutter 2 can be reduced in thickness.

The coil spring 86 is provided between the base plate 30 and the main body part 820, and biases the charge slider 82 toward the initial position. The guide shaft 83 passes through the coil spring 86, and serves also as a supporting shaft for the coil spring 86. Since the guide shaft 83 serves both to guide movement of the charge slider 82 and to support the coil spring 86, the number of components can be reduced.

The engagement parts 821 and 822 receive the driving force of the motor 81 via the gear train 85. In this embodiment, the engagement parts 821 and 822 are metal rollers supported by the main body part 820 in such a manner that the rollers can rotate about an axis in the Z direction. The operation parts 823 and 824 are parts that operate the drive mechanism 60. In this embodiment, the operation parts 823 and 824 are metal rollers supported by the main body part 820 in such a manner that the rollers can rotate about an axis in the Z direction. The engagement parts 821 and 822 and the operation parts 823 and 824 are parts that transmit the driving force of the motor 81, and the durability of the machinery can be improved by making these parts of metal.

As shown by the lines L5 and L6 in FIG. 24, the two notches 820b and the operation parts 823 and 824 are disposed at the same Z-directional positions. Therefore, a reaction force exerted by the drive mechanism 60 on the operation parts 823 and 824 are likely to be borne by the guide shaft 84 via the notches 820b, and oscillation of the charge slider 82 about the guide shaft 83 or deformation of the charge slider 82 caused by the stress exerted thereon can be prevented.

The gear train 85 includes gears 850 to 853. The base plate 30 includes shafts 327a to 327c and 322 that extend in the Z direction and rotatably support the gears 850 to 853 (see FIG. 6, for example). The gear 850 includes the worm wheel 850a and a spur gear 850b on the shaft 327a, and the worm wheel 850a and the spur gear 850b rotate integrally. The worm wheel 850a is engaged with the pinion gear 81c attached to the output shaft 81a of the motor 81. This part changes the direction of the axis of rotation of the driving force transmission system from the Y direction to the Z direction, thereby allowing the thickness of the shutter 2 in the Z direction to be reduced while the gears 850 to 853 have larger diameters.

The gear 851 includes spur gears 851a and 851b on the shaft 327b, and the spur gears 851a and 851b rotate integrally. The spur gear 851a is engaged with the spur gear 850b, and the spur gear 851b is engaged with the gear 852. Since the spur gear 851a is arranged on one side of the output shaft 81a in the Z direction (below the output shaft 81a in FIG. 24), and the spur gear 851b is arranged on the other side of the output shaft 81a (above the output shaft 81a in FIG. 24), these gears can be arranged within the dimension of the motor 81 in the Z direction, so that the shutter 2 can be reduced in size (thickness) in the Z direction.

The gear 852 is a spur gear provided on the shaft 327c and is engaged with the gear 853. The gear 853 is a spur gear provided on the shaft 322. A rotating cam member 854 is provided on the shaft 322, and the gear 853 and the rotating cam member 854 rotate integrally. A detection target member 852a is also provided on the shaft 327c. The detection target member 852a rotates integrally with the gear 852. The rotational position of the detection target member 852a is detected by an optical sensor PI3 (see FIG. 2, which shows only the location of the optical sensor PI3, which is arranged under the unit). The rotational position of the rotating cam member 854 can be determined by detecting the rotational position of the detection target member 852a. Alternatively, a sensor that directly detects the rotational position of the rotating cam member 854 may be provided. However, in this embodiment, for reasons of the layout of the machinery, it is difficult to allocate space for a sensor in the vicinity of the rotating cam member 854. Thus, the rotational position of the rotating cam member 854 is detected via the detection target member 852a, which rotates in synchronization with the rotating cam member 854.

Figure 25:
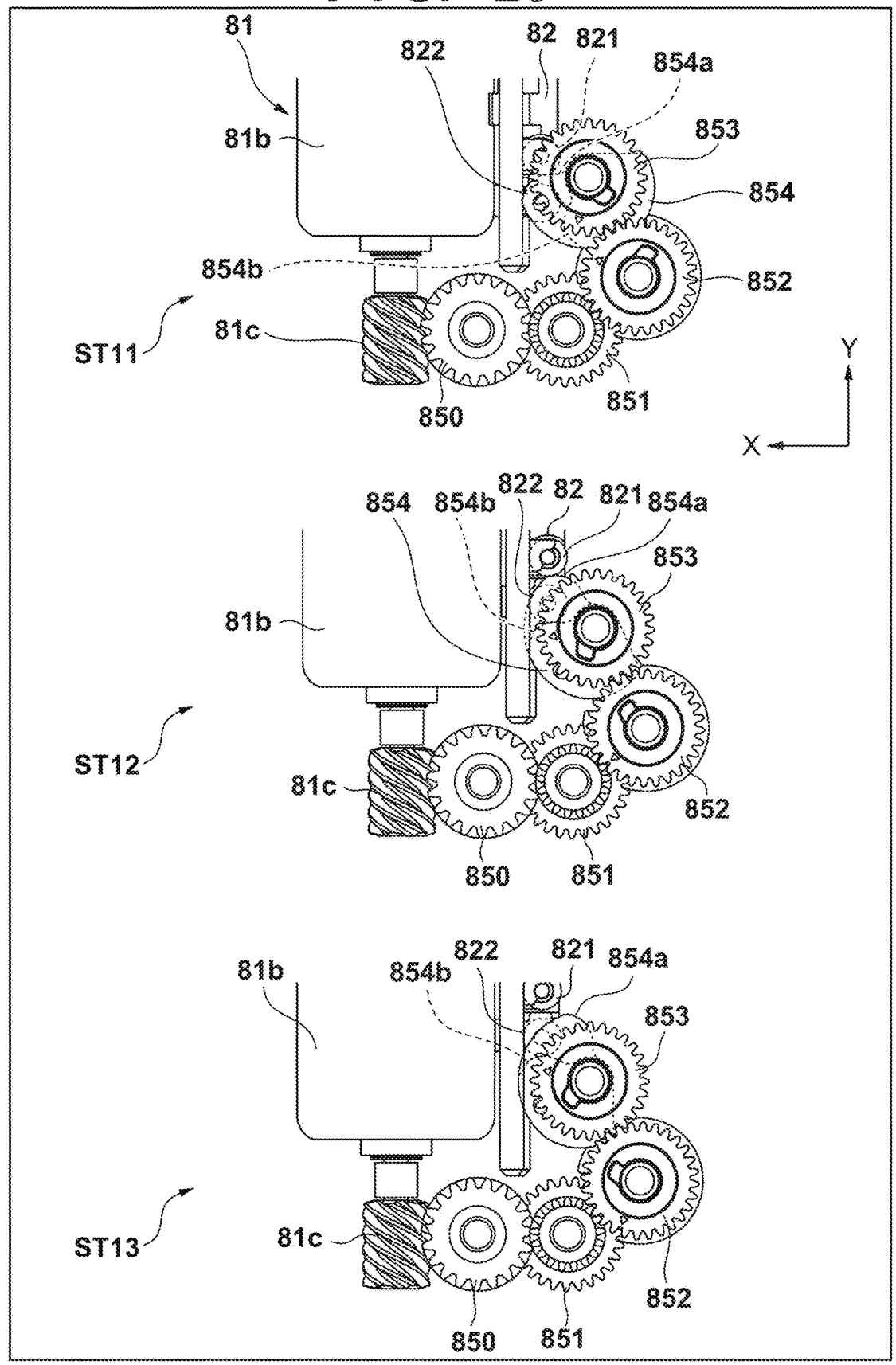
FIG. 25 is a diagram for illustrating an operation of the charge mechanism.

The rotating cam member 854 is a plate cam that inputs the driving force of the motor 81 to the charge slider 82. The rotating cam member 854 includes an abutment part 854a that abuts against the engagement part 821, and an abutment part 854b that abuts against the engagement part 822. The engagement parts 821 and 822 are spaced apart from each other in the Y direction and the Z direction, and the abutment parts 854a and 854b are spaced apart from each other in the circumferential direction of the shaft 322 of the rotating cam member 854 and the Z direction. In this embodiment, the charge slider 82 is moved straight in the Y direction by two-step pressing, in which abutment between the engagement part 821 and the abutment part 854a and abutment between the engagement part 822 and the abutment part 854b occur at different times (different phases of the rotating cam member 854). In this way, the stroke of the charge slider 82 can be increased with a compact arrangement. FIG. 25 is a diagram for illustrating an operation of the charge mechanism 80. More specifically, FIG. 25 shows movement of the charge slider 82 caused by rotation of the rotating cam member 854.

When the driving force of the motor 81 is transmitted to the rotating cam member 854 by the gear train 85, the rotating cam member 854 starts rotating clockwise. A state ST11 is a phase where the abutment part 854a begins abutting against the engagement part 821. In the state ST11, the abutment part 854b has not abutted against the engagement part 822 yet. A state ST12 is a phase where the rotating cam member 854 has further rotated. The abutment part 854a pushes the engagement part 821 in the Y direction to move the charge slider 82 in the Y direction. In addition, the abutment part 854b begins being engaged with the engagement part 822. A state ST13 is a phase where the rotating cam member 854 has further rotated. The abutment between the abutment part 854a and the engagement part 821 is released, but the abutment part 854b pushes the engagement part 822 in the Y direction to continue moving the charge slider 82 in the Y direction. In this way, the stroke of the charge slider 82 can be increased.

Figure 26:
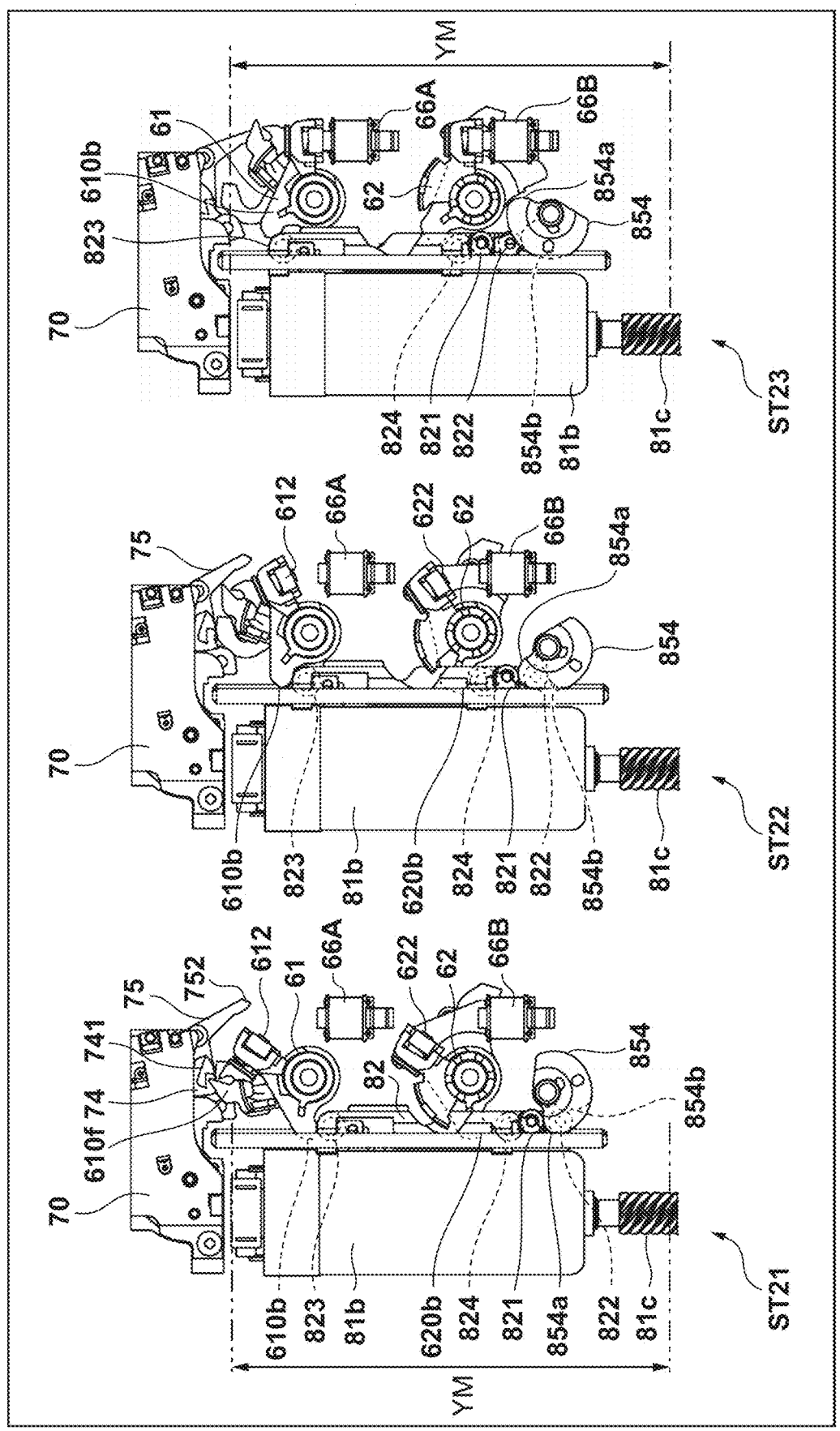
FIG. 26 is a diagram for illustrating the operation of the charge mechanism.

FIG. 26 is a diagram for illustrating an operation of the charge mechanism 80. More specifically, FIG. 26 shows an example of the charge operation of the charge mechanism 80 on the drive mechanism 60. A state ST21 is a phase where the abutment part 854a begins abutting against the engagement part 821. In the state ST21, the abutment part 854b has not abutted against the engagement part 822 yet. The drive members 61 and 62 of the drive mechanism 60 are in the respective initial positions.

A state ST22 is a state where the rotating cam member 854 has rotated. The abutment part 854a pushes the engagement part 821 in the Y direction to move the charge slider 82 in the Y direction. In addition, the abutment part 854b begins being engaged with the engagement part 822. As a result of the charge slider 82 moving, the operation parts 823 and 824 operate the drive mechanism 60. More specifically, the operation parts 823 abut against the engagement part 610b of the drive member 61 to push the engagement part 610b in the Y direction. As a result, the drive member 61 rotates clockwise. The operation part 824 abuts against the engagement part 620b of the drive member 62 to push the engagement part 620b in the Y direction. As a result, the drive member 62 rotates clockwise. In the example shown in FIG. 26, the locking mechanism 70 does not lock the arm part 610B, and the main body part 610A and the arm part 610B of the drive member 61 rotate integrally.

A state ST23 is a state where the rotating cam member 854 has further rotated. The abutment between the abutment part 854a and the engagement part 821 is released, but the abutment part 854b pushes the engagement part 822 in the Y direction to continue moving the charge slider 82 in the Y direction. As a result, the operation parts 823 and 824 make the drive members 61 and 62 rotate, and the drive members 61 and 62 reach the respective charged positions. The drive members 61 and 62 are retained in the charged positions by the retention mechanisms 66A and 66B. As the rotating cam member 854 further rotates, the abutment between the abutment part 854b and the engagement part 822 is also released, and the charge slider 82 returns to the initial position under the biasing force of the coil spring 86. In this embodiment, the range of reciprocation of the charge slider 82 is equal to or less than a total length YM of the motor 81 in the axial direction. Thus, the shutter 2 can be reduced in size in the Y direction.

With reference to FIG. 24, a positional relationship between the abutment parts 854a and 854b and the operation parts 823 and 824 will be described. As shown by the line L7, the operation parts 823 and 824 are arranged at the same Y-directional position as the abutment part 854b. Since the operation parts 823 and 824, which receive a reaction force from the drive mechanism 60, are located on a line (the line L7) along which the abutment part 854b exerts a force to the charge slider 82, the moment about an axis in the X direction produced on the main body part 810 can be reduced, and the durability of the main body part 810 can be improved, or the required strength of the main body part 810 can be reduced. The operation parts 823 and 824 may be located at the same Y-directional position as the abutment part 854a. In that case, however, the load on the rotating cam member 854 and the charge slider 82 increases during the latter half of the charge operation because of winding of the drive springs 63A and 63B. Therefore, it is more advantageous to arrange the operation parts 823 and 824 at the same Y-directional position as the abutment part 854b, which transmits the driving force during the latter half of the charge operation. In addition, with this arrangement, since the engagement parts 821 and 822 are spaced apart from each other in the Y direction and the Z direction, the operation part 824 can be provided in a space formed on the negative side of the engagement part 821 along the Z axis. Therefore, the notch 820b provided above the operation part 824 can be located toward one end of the charge slider 82 in the Y direction, and the twisting force exerted on the charge slider 82 when the drive mechanism 60 is pushed can be reduced.

<6. Example of General Operation>

Figure 28:
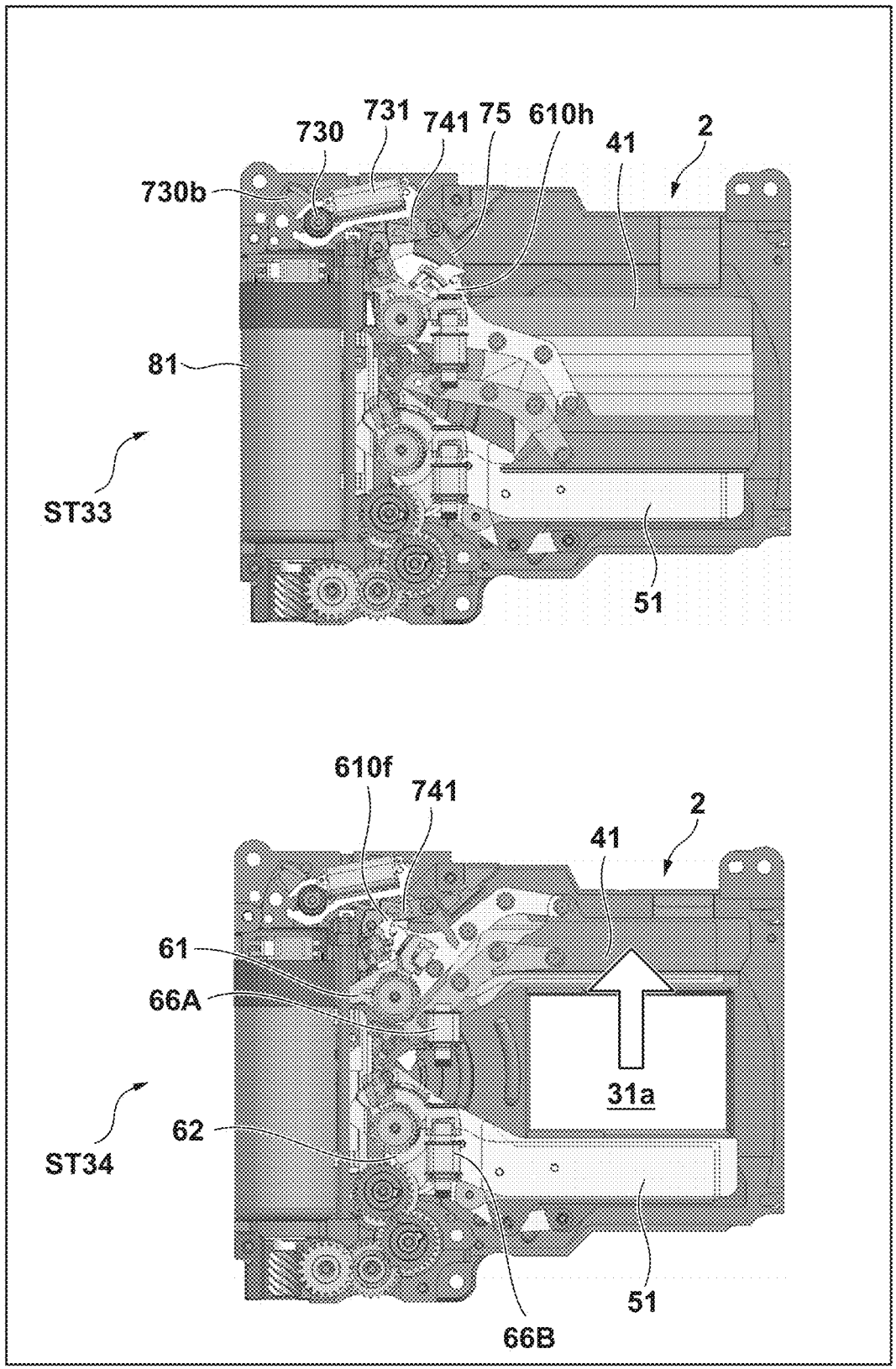
FIG. 28 is a diagram for illustrating the operation of the shutter shown in FIG. 2.
Figure 29:
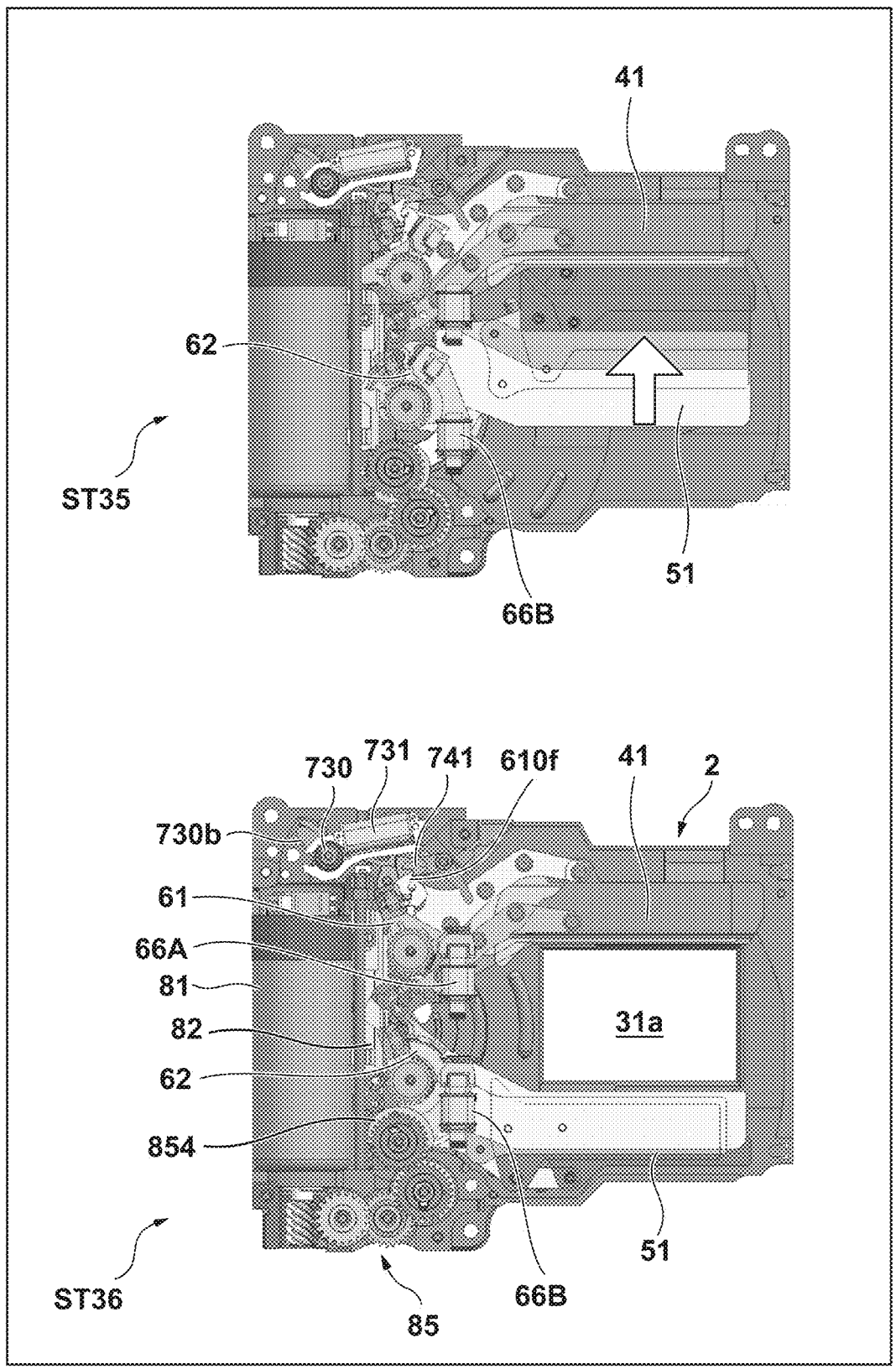
FIG. 29 is a diagram for illustrating the operation of the shutter shown in FIG. 2.

An example of the general operation of the shutter 2 will be described with reference to FIGS. 27 to 29. FIGS. 27 to 29 are diagrams for illustrating an operation of the shutter 2. More specifically, FIGS. 27 to 29 show an example of a single-shot operation of the imaging apparatus 10.

Figure 27:
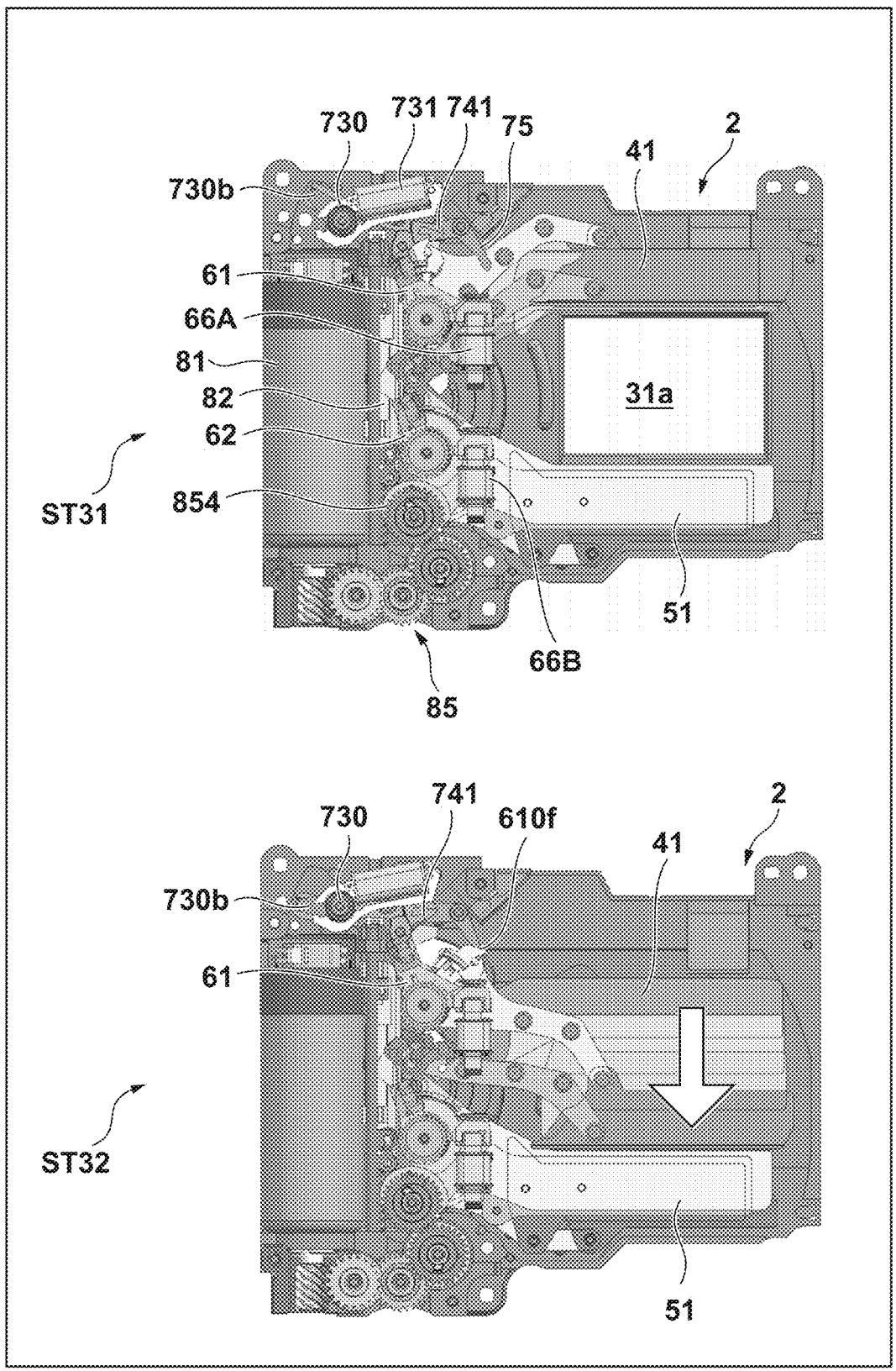
FIG. 27 is a diagram for illustrating an operation of the shutter shown in FIG. 2.

The state ST31 shown in FIG. 27 is a phase where the shutter 2 is in a stand-by state. The stand-by state of the shutter 2 can be selected from among a normally open state and a normally closed state, and in this example, the normally open state is selected. Both the groups of blades 41 and 51 are in the open state, and the opening 31a is open. The rotor 730 of the locking mechanism 70 is in the locking position, and the arm part 610B is locked in the initial position by the locking lever 74. The drive members 61 and 62 are retained in the charged positions.

When a shutter manipulation is detected, the locking mechanism 70 is driven, and the rotor 730 rotates to the releasing position. As a result, the arm 610B and the locking lever 74 are disengaged, and the group of blades 41 temporarily runs into the closed state as shown by the state ST32 under the biasing force of the spring 44. The suppression lever 75 is engaged with the arm part 610B to suppress bouncing of the group of blades 41.

As shown by a state ST33 in FIG. 28, the locking mechanism 70 is then driven to return the rotor 730 to the locking position. In addition, the rotating cam member 854 driven by the motor 81 rotates to release the abutment between the abutment part 854b and the engagement part 822, and the charge slider 82 returns to the initial position under the biasing force of the coil spring 86. The suppression lever 75 has an inclined surface so that the suppression lever 75 is not disengaged from the arm part 610B even when the suppression lever 75 is biased as a result of rotation of the arm part 610B, and therefore, a tip end of the arm part 610B is located in the trajectory of rotation of the suppression lever 75. Therefore, as shown by the state ST33 in FIG. 28, when the rotor 730 is rotated to return to the locking position, the suppression lever 75 pushes the arm part 610B toward the retention mechanism 66A, so that the group of blades 41 temporarily moves to an over-charged position.

As shown by a state ST34, the drive member 61 is released from the retention mechanism 66A and rotates counterclockwise under the biasing force of the drive spring 63A, and the group of blades 41 runs into the open state. The opening 31a is opened, and the imaging device 3 is exposed to light. Since the locking lever 74 is arranged so that the tip end is located in the trajectory of running of the arm part 610B when the locking lever 74 is in the locking position, during counterclockwise rotation of the drive member 61, the engagement part 610f of the arm part 610B moves to the left of the engagement part 741 by pushing up the engagement part 741 of the locking lever 74 and thus is engaged with the engagement part 741 again, so that the group of blades 41 is prevented from bouncing. A part of the locking lever 74 where the engagement part 741 is formed has a curved surface on the side closer to the opening 31a, thereby facilitating push-up by the engagement part 610f.

At a timing that depends on the set shutter speed, the drive member 62 is released from the retention mechanism 66B and rotates counterclockwise under the biasing force of the drive spring 63B, and the group of blades 51 runs into the closed state as shown by a state ST35 in FIG. 29. As a result, the opening 31a is closed, and the imaging device 3 stops being exposed to light.

The charge operation then occurs. The rotating cam member 854 driven by the motor 81 rotates, the charge slider 82 moves, and the drive springs 63A and 63B are charged. At this time, since the arm part 610B and the locking lever 74 are engaged with each other, the groups of blades 41 is maintained in the open state, and a state ST36 is reached. The state ST36 is the same as the state ST31 shown in FIG. 27. In this way, one shutter operation ends.

In the embodiment described above, the shutter 2 may be incorporated in the imaging apparatus in such an orientation that the positive Y direction in FIG. 2 is the vertically upward direction, or the shutter 2 may be incorporated in the imaging apparatus in such an orientation that the negative Y direction in FIG. 2 is the vertically upward direction. If the shutter 2 is incorporated in the imaging apparatus in such an orientation that the negative Y direction is the vertically upward direction, the attracting surfaces of the retention mechanisms 66A and 66B face vertically downward. With this arrangement, dust or other foreign matter can be prevented from adhering to the attracting surfaces of the retention mechanisms 66A and 66B. In this embodiment, in the stand-by state and the off state, the armatures 612 and 622 are controlled to be located to be in intimate contact with the retention mechanisms 66A and 66B, respectively, thereby preventing foreign matter from adhering to the attracting surfaces of the retention mechanisms 66A and 66B.

In the embodiment described above, the charge slider 82 can be configured to drive at least the drive member 61. In this embodiment, the drive member 61 is located far from the rotating shaft 81a of the motor 81, and the shutter 2 can be advantageously reduced in size by arranging the drive member 61 to be driven by the charge slider 82, which moves straight.

Second Embodiment

A second embodiment of the present invention will be described with reference to FIGS. 30 to 33. In the following description, the components denoted by the same reference numerals as those in the first embodiment are the same components as those in the first embodiment, so that redundant descriptions thereof will be omitted, and only differences from the first embodiment will be described.

Figure 30:
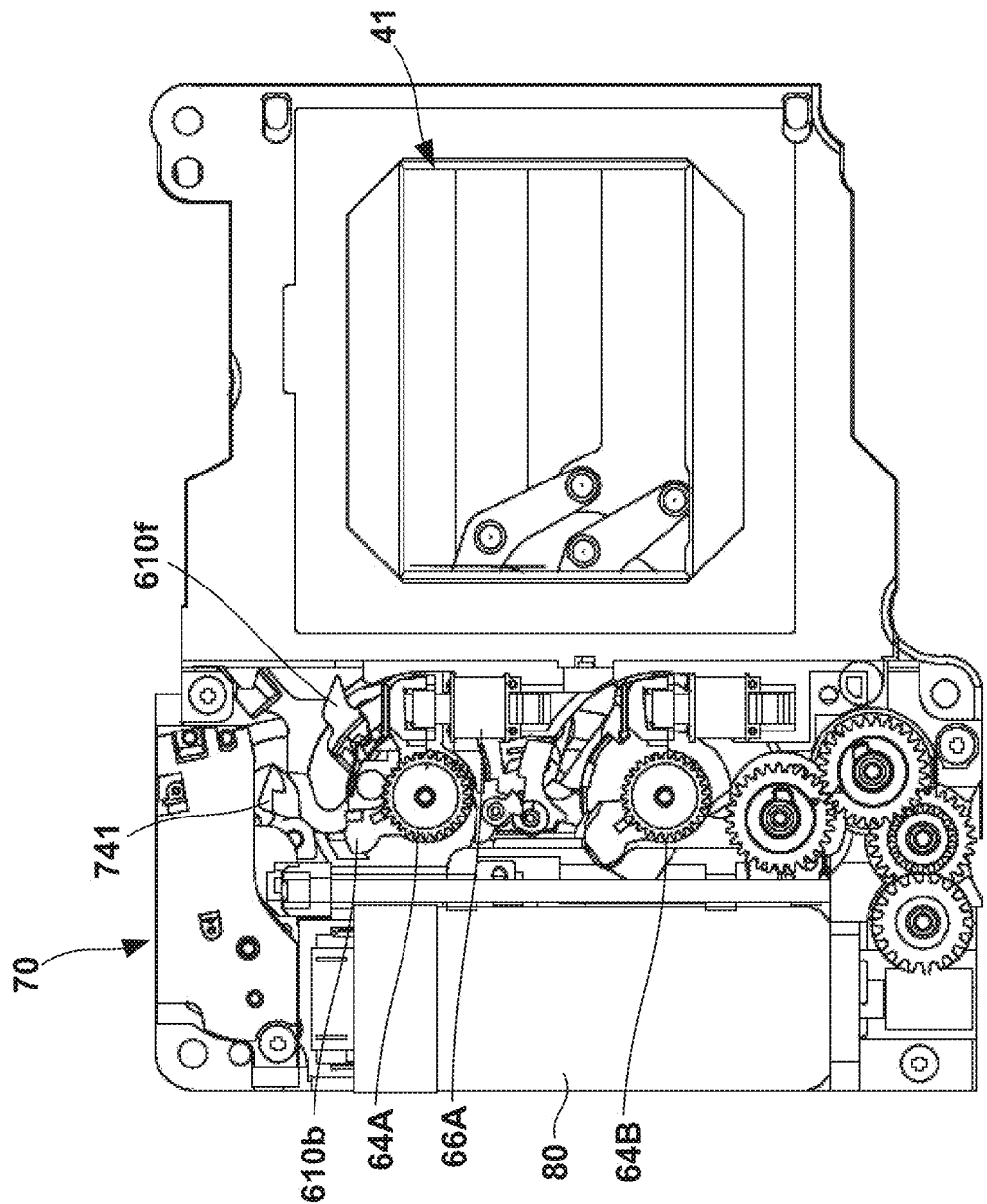
FIG. 30 is a plan view showing internal machinery of a shutter according to an embodiment of the present invention.
Figure 31:
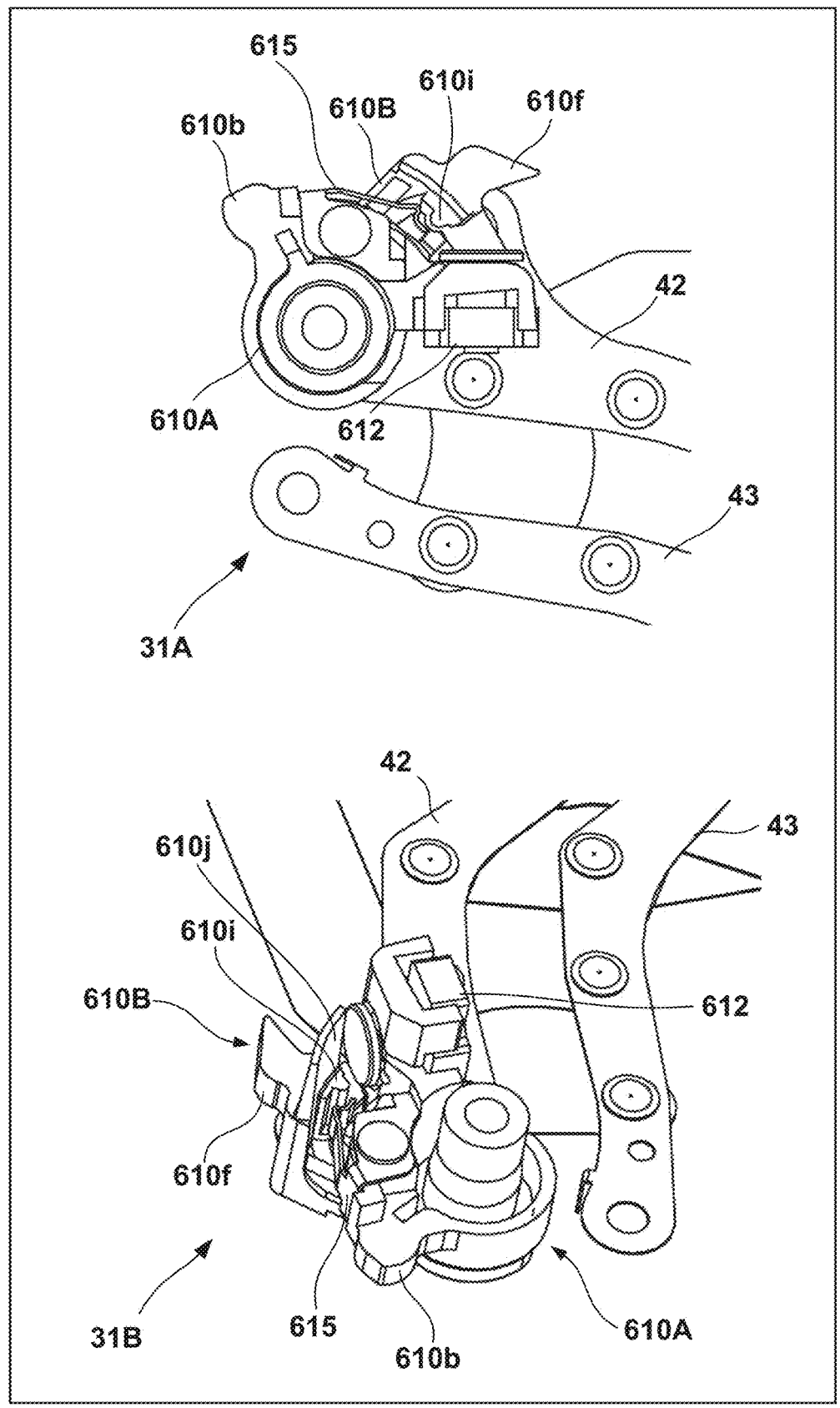
FIG. 31 is a diagram for illustrating essential parts of the example shown in FIG. 30.

This embodiment differs from the first embodiment in structure of the bounce suppression mechanism of the locking mechanism 70. FIG. 30 is a front view of the locking mechanism 70 and the bounce suppression mechanism according to this embodiment. FIG. 31 includes an enlarged view of essential parts of the mechanisms (FIG. 31A) and a perspective view of the essential parts viewed in a difference direction (FIG. 31B).

A suppression member 615 is fixed to the main body part 610A of the drive member 61. The suppression member 615 is a leaf spring-like member made of metal, and is arranged with the thickness direction thereof being perpendicular to the direction of the axis of rotation of the drive member 61 (the Z direction). In this embodiment, an attachment part 615a is formed integrally with the suppression member 615 at the root of the suppression member 615 with the thickness direction thereof being aligned with the direction of the axis of rotation of the drive member 61, and the attachment part 615a is fixed to the main body part 610A by fitting or screws.

In FIG. 31, the drive member 61 is completely charged, that is, in a state where the armature 612 has been attracted by and held on the retention mechanism 66A. When the arm part 610B reaches the completely charged position after being released from the locking mechanism 70, or when the locking mechanism 70 is not activated, and the main body part 610A and the arm part 610B are driven integrally and charged, the group of blades 41 coupled to the main body part 610A and the arm part 610B may bounce when the completely charged position is reached.

The suppression member 615 has a convex shape at the tip end thereof, and the convex shape can be engaged with a protrusion 610i on the arm part 610B. When the charge is completed, the protrusion 610i abuts against the suppression member 615 and can prevent bouncing of the group of blades 41.

To charge the main body part 610A when the arm part 610B is locked by the locking mechanism 70, the suppression member 615, which is leaf spring-like, bends and is disengaged from the protrusion 610i, thereby allowing charging of the main body part 610A. To this end, the suppression member 615 and the convex shape at the tip end thereof are positioned with respect to the protrusion 610i so that there is sufficient space for the convex shape to disengage from the protrusion 610i when the suppression member 615 bends.

On the other hand, when the arm part 610B is not locked by the locking mechanism 70, and the main body part 610A and the arm part 610B are driven integrally and charged, if a relatively quick driving, such as in continuous shooting, is performed, for example, the main body part 610A is quickly charged by the charge slider 82. However, the arm part 610B is essentially biased toward closing the blades only by the biasing force of the spring 44, and the biasing force is smaller than that of the drive spring 63A. Therefore, when the main body part 610A is quickly charged by the charge slider 82, the arm part 610B may lag behind the main body part 610A.

Even if the main body part 610A is quickly charged, if the arm part 610B lags, quick driving may be unable to be achieved because the exposure operation cannot be started until the arm part 610B has moved to the charged position. According to this embodiment, the suppression member 615 fixed to the main body part 610A pushes the protrusion 610i on the arm part 610B in the charge direction, so that the arm part 610B can move integrally with the main body part 610A.

In this embodiment, the suppression member 615 extends along the circumference of the main body part 610A, and the protrusion 610i protrudes from an inner surface 610j of the arm part 610B that faces the main body part 610A as shown in FIG. 31. With this arrangement, the suppression member 615 and the protrusion 610i do not need to be provided outside of the region of movement of the main body part 610A and the arm part 610B, and the shutter 2 can be reduced in size.

Although the suppression member 615 is made of metal in this embodiment, the suppression member 615 may be made of resin or other material as far as the suppression member 615 has the flexibility described above.

Figure 32:
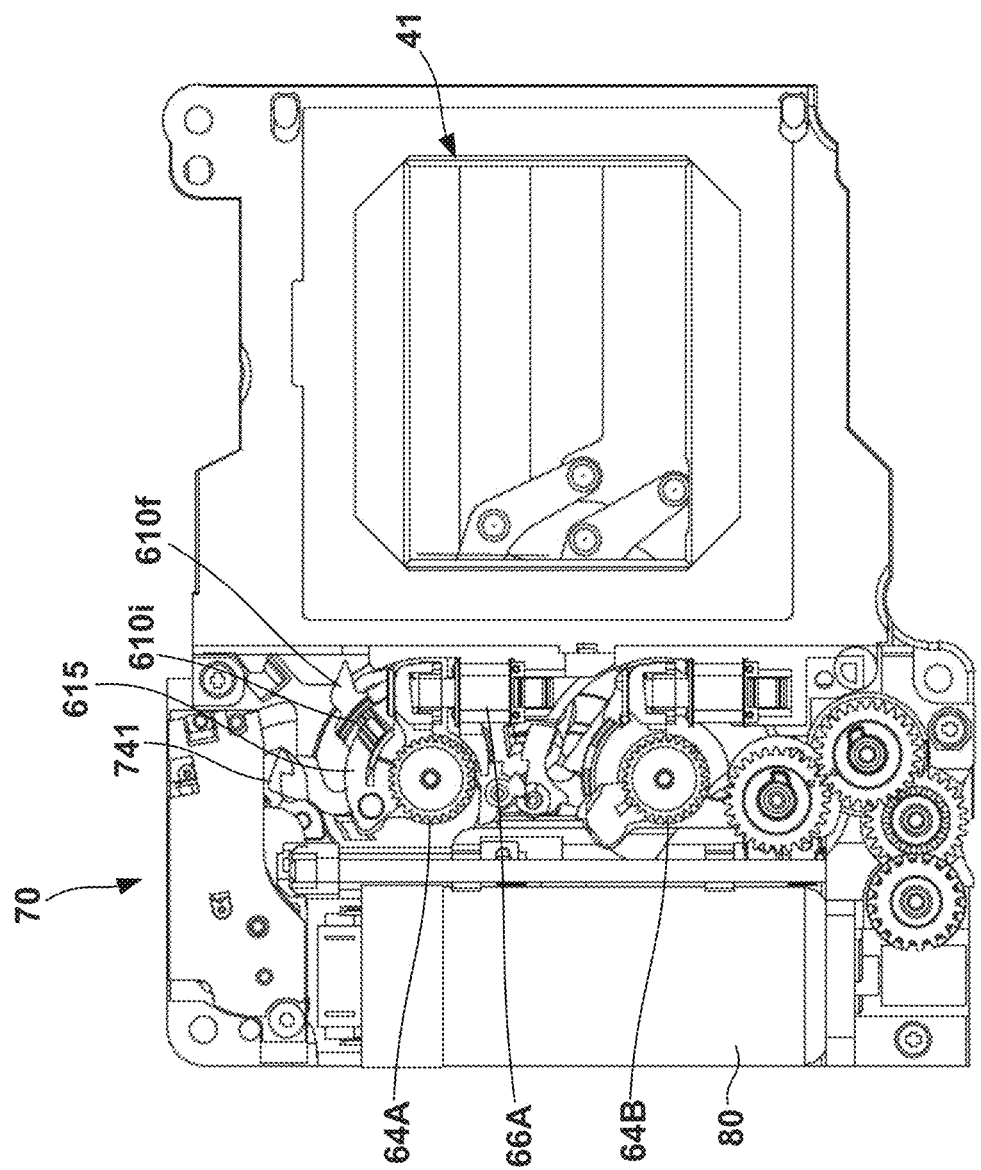
FIG. 32 is a plan view of the internal machinery of the shutter according to the embodiment of the present invention.
Figure 33:
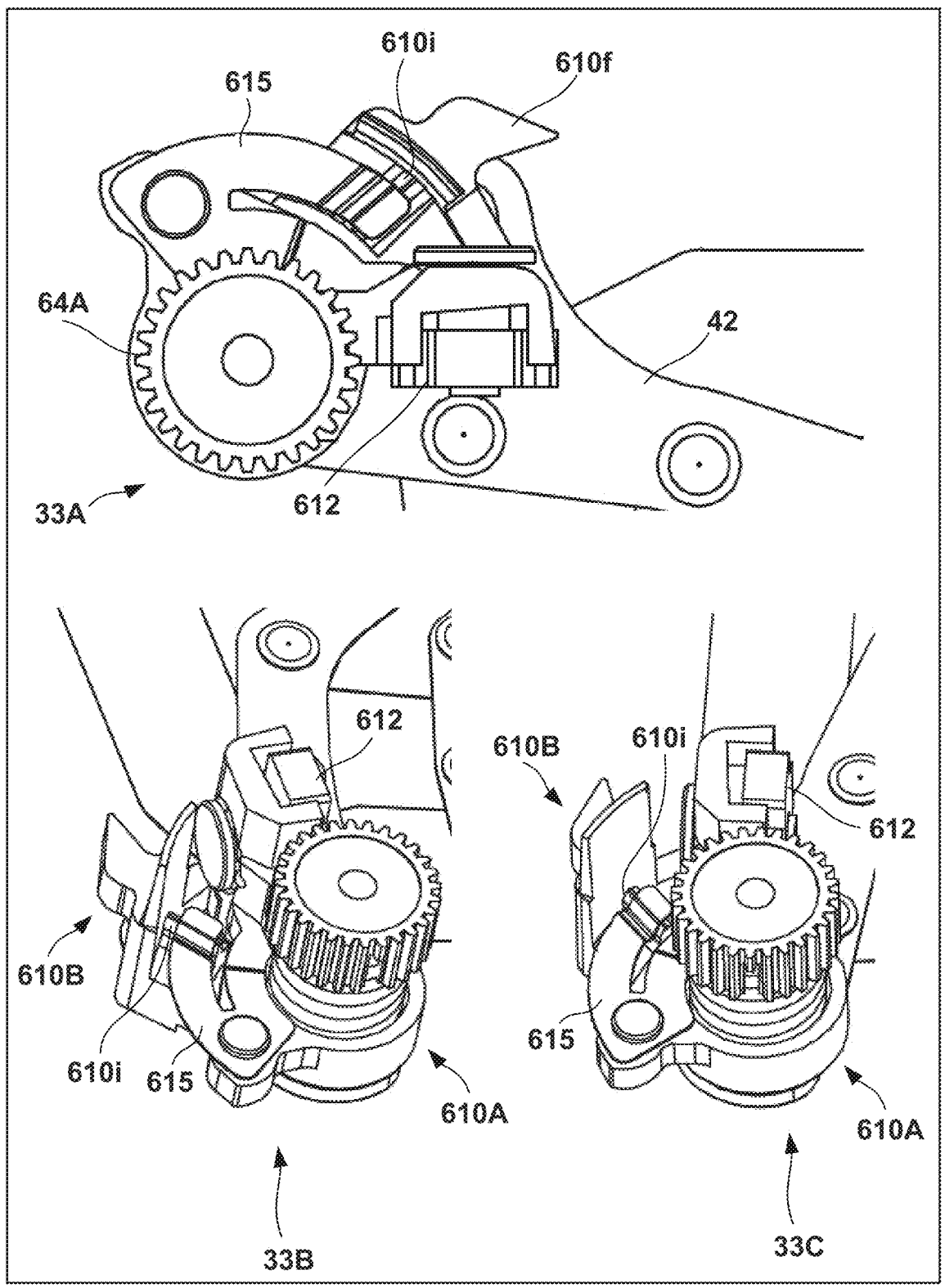
FIG. 33 is a diagram for illustrating essential parts of the example shown in FIG. 32.

FIGS. 32 and 33 show another example of the structure of the bounce suppression mechanism of the locking mechanism 70. In the example shown in FIGS. 30 and 31, the suppression member 615 abuts against the protrusion 610i that protrudes toward the plane in which the group of blades 41 runs, and bends in the direction parallel to the plane in which the group of blades 41 runs. To the contrary, in the example shown in FIGS. 32 and 33, the suppression member 615 bends in the direction of the axis of rotation of the drive member 61 (the Z direction), and the protrusion 610i protrudes in the direction of the axis of rotation of the drive member 61 (the Z direction).

FIG. 32 is a front view of this example structure, and FIG. 33 includes an enlarged view (FIG. 33A) of essential parts of the structure and perspective views (FIGS. 33B and 33C) of the essential parts viewed in different directions.

As shown in FIG. 33, the suppression member 615 on the main body part 610A is a plate-like member made of metal that bends in the direction of the axis of rotation of the drive member 61, and has a convex shape that protrudes toward the arm part 610B at the tip end thereof. The protrusion 610i is provided on the arm part 610B on the side of the main body part 610A in the direction of the axis of rotation of the drive member 61. The protrusion 610i may be provided to protrude in the opposite direction along the axis of rotation of the drive member 61 to the direction shown in FIG. 33, and the suppression member 615 may also be disposed to face the protrusion 610i. That is, whether the suppression member 615 is located above or below the protrusion 610i in the direction of the axis of rotation of the drive member 61, the same effects and advantages can be achieved as far as the suppression member 615 exerts a biasing force to push the protrusion 610i when the suppression member 615 abuts against the protrusion 610i. With this arrangement, as with the example described above, the suppression member 615 and the protrusion 610i do not need to be provided outside of the region of movement of the main body part 610A and the arm part 610B, and the shutter 2 can be reduced in size.

Third Embodiment

A third embodiment of the present invention will be described with reference to FIGS. 34 to 40. Reference numerals denoting the components in the following description are different from those used in the first embodiment described above and are consistent only in the third embodiment. Therefore, for example, a reference numeral used in the description of the first embodiment to denote a certain component may denote a different component in the third embodiment than the component in the first embodiment.

Figure 34:
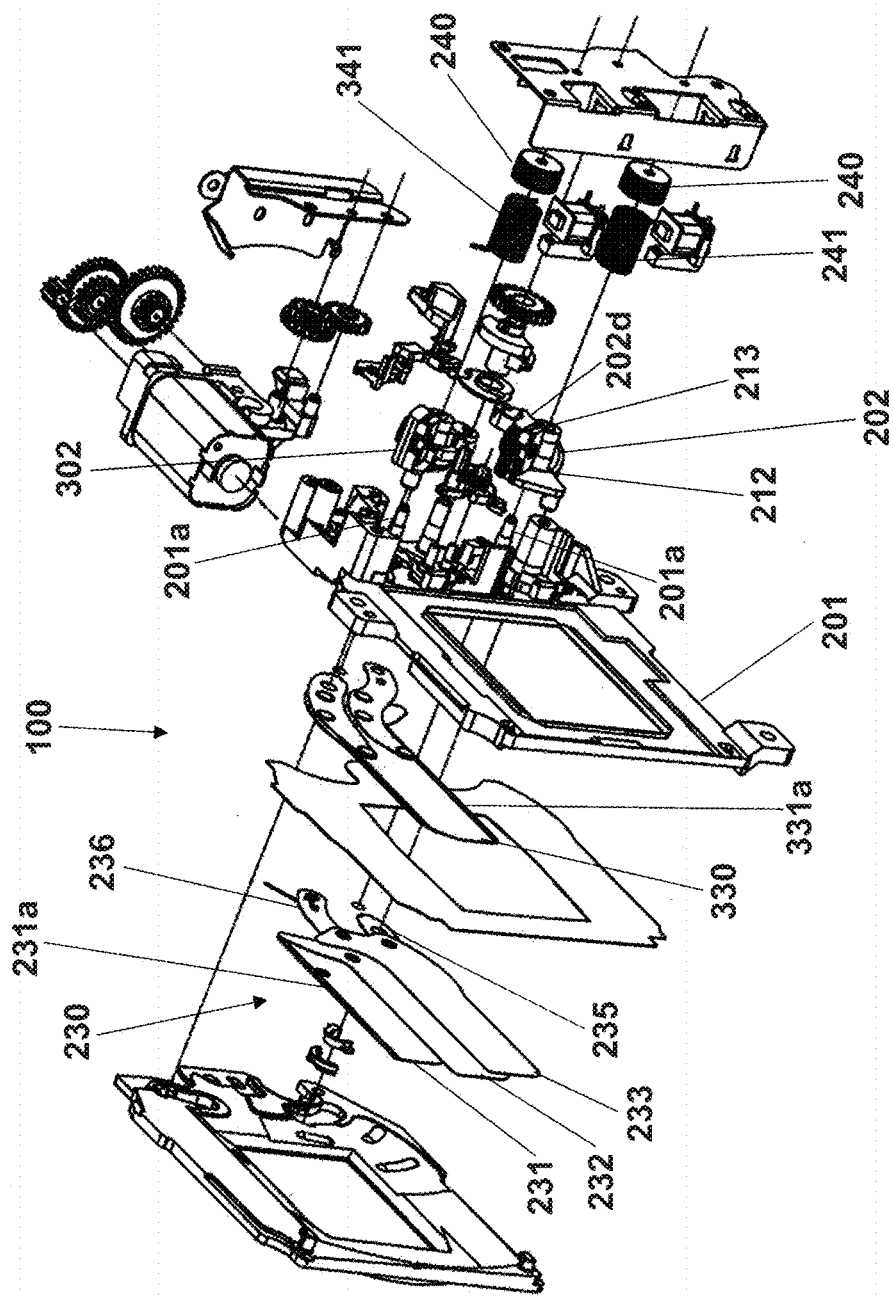
FIG. 34 is an exploded perspective view of a shutter device according to an embodiment of the present invention.

FIG. 34 is an exploded perspective view of a shutter device according to the third embodiment of the present invention. On an extension of an optical axis of an imaging lens that focuses light from a subject to form an image, an imaging device that performs photoelectric conversion of the subject image formed by the imaging lens is provided. A focal plane shutter 100 is provided on the imaging optical path between the imaging lens and the imaging device to adjust the exposure time of the imaging device in cooperation with an operation of an electronic front curtain of the imaging device described later.

An analog image signal output from the imaging device is converted into a digital signal by an AFE. As an example, the imaging device is a CMOS image sensor.

A digital signal processor (DSP) performs various image processing and compression and decompression processing on the digital image signal output from the AFE. The resulting image data is stored in a storage medium. A display unit displays taken images or various menu screens. The display unit may be a liquid crystal display (LCD), for example.

A timing generator (TG) supplies a drive signal to the imaging device. A CPU controls the AFE, the DSP, the TG, and a shutter drive circuit. The image data or the like is temporarily stored in a RAM connected to the DSP.

The shutter drive circuit drives the focal plane shutter under the control of the CPU.

A voltage detection unit that detects the power supply voltage of an imaging apparatus, a temperature detection unit that detects the temperature of the imaging apparatus, and a blade detection unit provided in the focal plane shutter are provided. The blade detection unit is formed by a photo sensor, a cam phase plate and the like described later. A cam phase detection unit is provided in the focal plane shutter. The detection result from each detection unit is input to the CPU and used for various types of control.

A lens control unit outputs lens information, such as focal length, aperture diameter or pupil diameter of the imaging lens or distance between the pupil and the imaging device, to the CPU, and drives a diaphragm, a lens or the like under the control of the CPU.

A shutter base plate 201 is an example of a hollow frame member in which an opening through which light passes is formed. The shutter base plate 201 is fixed to a camera main unit (not shown), and components of a drive mechanism for a rear group of blades 230 described later are attached to the shutter base plate 201.

A blade driving member 202 is pivotally supported on a shaft 201*a* of the shutter base plate 201. The blade driving member 202 is provided with an armature supporting part 202*d*.

A through-hole (not shown) is formed in the armature supporting part 202*d*, and an armature shaft 213, which has a flange larger than an inner diameter of the through-hole and integrally attached to an armature 212, is engaged in the through-hole. The armature shaft 213 extends substantially perpendicularly to an attracting surface of the armature 212.

A compression spring 214 (not shown) is disposed on an outer surface of the armature shaft 213 between the armature 212 and the armature supporting part 202*d*. The compression spring 214 biases the armature 212 and the armature supporting part 202*d* to push the armature 212 and the armature supporting part 202*d* away from each other.

Ratchets 240 are pivotally supported on shafts 201*a* of the shutter base plate 201, and arranged closer to the tip ends of the respective shafts than the blade driving member 202.

A blade driving spring 241 and a light-shielding blade driving spring 341, which are helical torsion springs, are arranged between the blade driving member 202 and a light-shielding blade driving member 302 and the ratchets 240.

The blade driving spring 241 and the light-shielding blade driving spring 341 are hooked on the blade driving member 202 and the light-shielding blade driving member 302, respectively, at one ends thereof, and hooked on the ratchets 240 at the other ends.

The blade driving spring 241 and the light-shielding blade driving spring 341 exert a biasing force to the blade driving member 202 and the light-shielding blade driving member 302, respectively, in a clockwise direction viewed from the tip ends of the shafts in FIG. 34 (viewed from above in FIG. 34).

The group of blades 230 includes a first blade 231, a second blade 232, a third blade 233, a primary arm 235, and a secondary arm 236. A group of light-shielding blades 330 has the same configuration as the group of blades 230 but is arranged in the reverse orientation. The primary arm 235 and the secondary arm 236, which serve as transmission members, receive a driving force of drive members described later and drive the group of blades 230 and the group of light-shielding blades 330.

The first blade 231, the second blade 232, and the third blade 233 are made from a resin sheet (or a metal plate) coated with a black paint and pivotally supported on the primary arm 235 and the secondary arm 236, and form a parallel linkage.

The first blade 231 of the group of blades 230 is an exposure controlling blade. An edge 231*a* of the first blade 231 is a slit forming part that controls exposure, and an end face of the slit forming part that controls exposure is smoothed by performing laser processing to reduce local burrs produced during pressing or the like to a height of 20 μm or less.

The second blade 232 and the third blade 233 move in association with the first blade 231, and serve as cover blades that cover the opening.

The primary arm 235 is supported on a shaft on the side of the third blade, and the secondary arm 236 is supported on a shaft on the side of the first blade 231. An edge 331*a* of the first blade 331 of the group of light-shielding blades 330 is a light-shielding edge forming part, and the secondary arm 336 is supported on a shaft on the side of the first blade 331. In this arrangement, the group of blades 230 and the group of light-shielding blades 330 can move along a principal plane of the shutter base plate 201 and can extend and retract over the opening formed in the shutter base plate 201 to open and close the opening.

Figure 35:
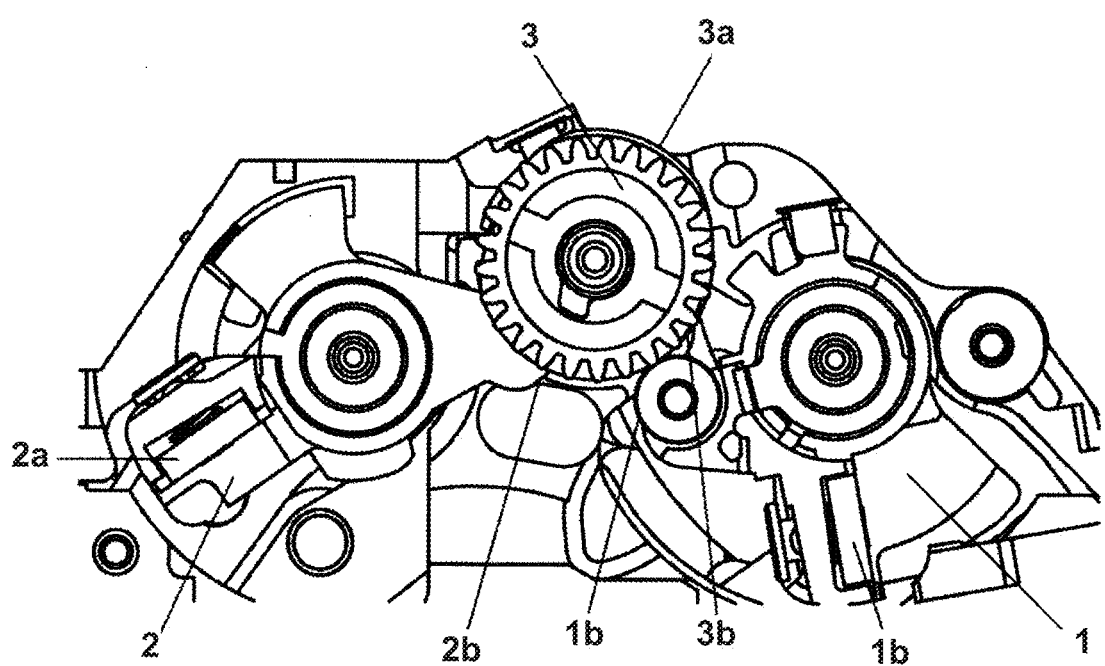
FIG. 35 is a schematic diagram showing a stand-by state of the shutter device shown in FIG. 34.

FIG. 35 is a schematic diagram showing a stand-by state of the shutter device according to this embodiment. To make a drive part easier to see, members that cover the drive part, such as front and rear electromagnets and retention base plates that hold the electromagnets, and a member that holds an optical position detection unit provided instead of a contact part are not shown in the drawing.

The base plate, a partition plate, and a cover plate each have an opening (an aperture) that penetrates the plate. Rear blades are overlaid above the opening, and a rear blade driving member (referred to as a rear lever, hereinafter) 1 associated with the rear blades is located in an end-of-setting position (a stand-by position).

Front blades are overlaid below the opening, and a front blade driving member (referred to as a front lever, hereinafter) 2 associated with front blades is located in an end-of-running position. The front and rear blade driving members have iron pieces 1*a* and 2*a*, respectively, that are attracted by and held on the electromagnets.

A front drive spring (not shown) is wound around a rotating shaft of the front lever 2 and biases the front lever 2 to overlay the front blades. A rear drive spring (not shown) is wound around a rotating shaft of the rear lever 1 and biases the rear lever 1 to extend the rear blades. A setting member 3 includes a cam surface (a front cam) 3*a* for the front lever 2 and a cam surface (a rear cam) 3*b* for the rear lever 1. In the stand-by state, the rear cam 3*b* abuts against a cam follower 1*b* of the rear lever 1 and is mechanically retained, and the front cam 3*a* does not interfere with operation of the front lever 2. The front cam 3*a* and the rear cam 3*b* serve as transmission cams, and transmit a driving force applied to the setting member 3 to the front lever 2 and the rear lever 1 to drive the front lever 2 and the rear lever 1.

Figure 36A:
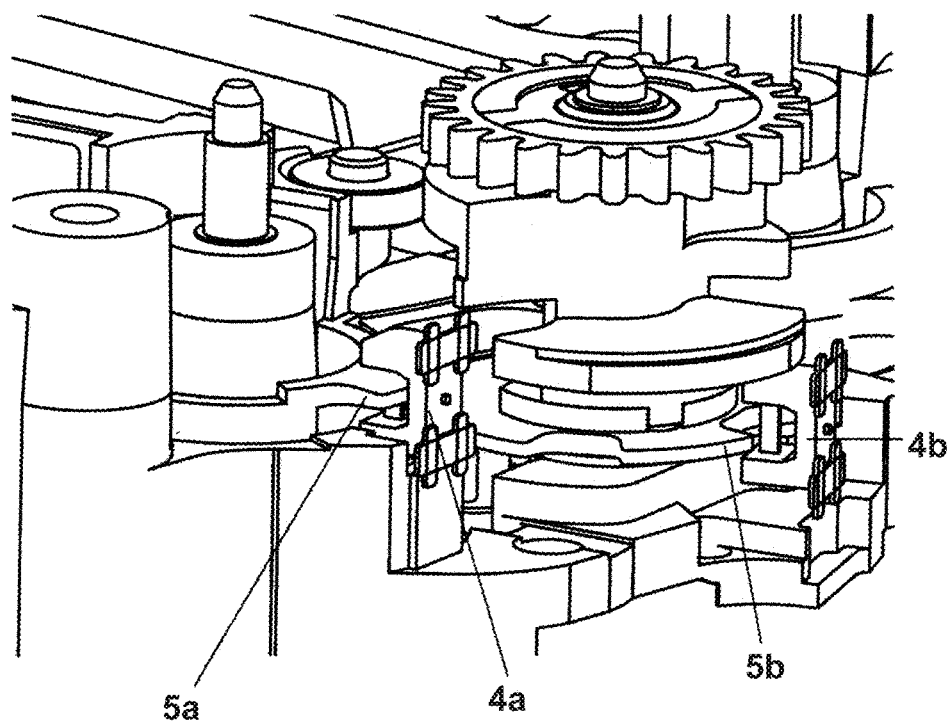
FIG. 36A is a schematic diagram showing an optical detection unit.
Figure 36B:
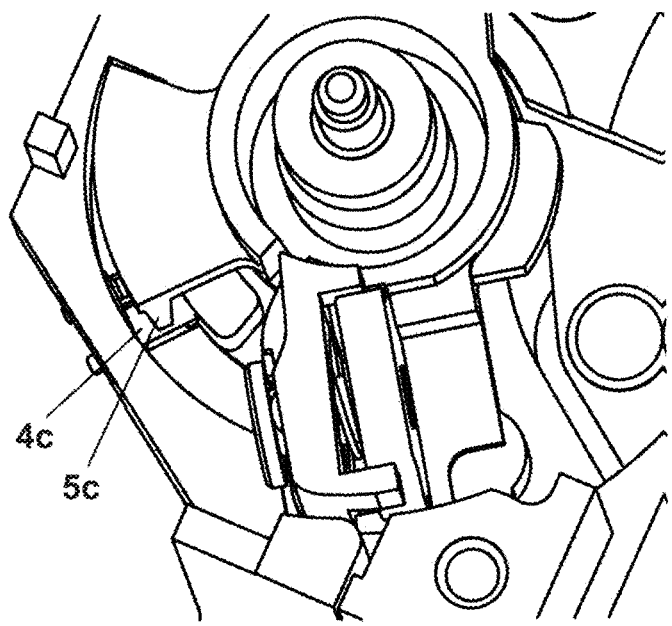
FIG. 36B is a schematic diagram showing the optical detection unit.

FIGS. 36A and 36B show optical detection units that detect the state (position) of the setting member. FIG. 36A is a schematic diagram showing an optical detection unit for the setting member 3 and the rear lever 1, and FIG. 36B is a schematic diagram showing an optical detection unit for the front lever 2. In this embodiment, the optical detection units are photointerrupter devices 4. Since the photointerrupter devices 4 are used, the states (positions) of the members can be detected only by adding or modifying a light-shielding part 5 that block light or allow light to pass.

Figure 37:
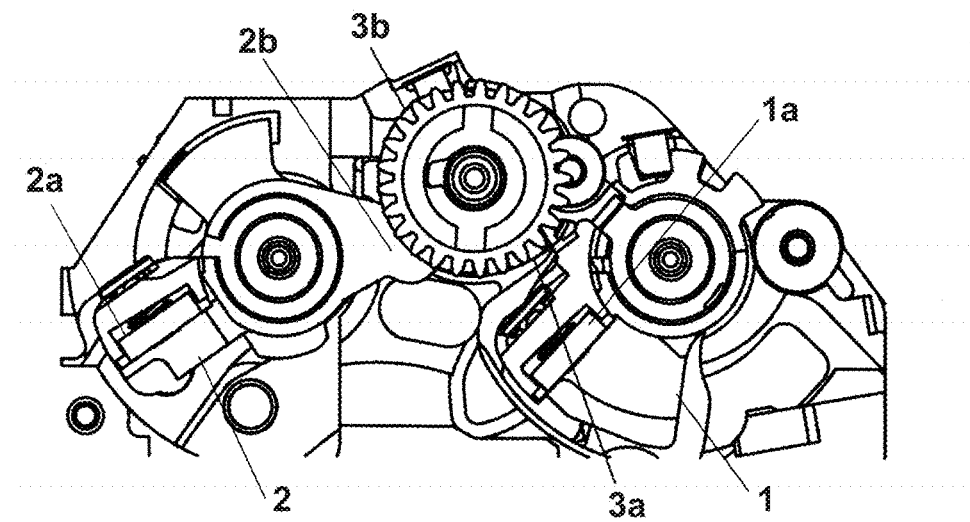
FIG. 37 is a schematic diagram showing an end-of-running state of the shutter device shown in FIG. 34.

FIG. 37 is a schematic diagram showing an end-of-running state of the shutter device in this embodiment. As in FIG. 35, members are not shown in order to make the drive part easier to see. The rear blades have extended to cover the opening, and the rear lever 1 has rotated to the end-of-running position. The front blades remain overlaid as in FIG. 35, and the front lever 2 has not moved. The setting member 3 has rotated to a position where the rear lever 1 is allowed to rotate. That is, abutment between the rear cam 3*b* and the cam follower 1*b* has been released.

Figure 38:
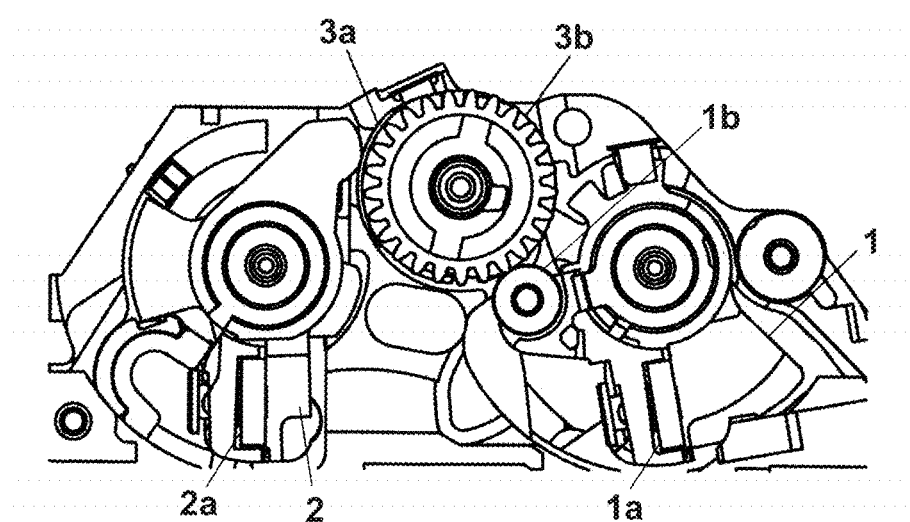
FIG. 38 is a schematic diagram showing an intermediate state of the shutter device shown in FIG. 34 during charging.

FIG. 38 shows one of states during charging of the shutter device in this embodiment. The front blades have extended to completely cover the opening, and the iron piece 2*a* of the front lever 2 is in contact with the electromagnet (not shown) for the front lever. The rear blades have been completely retracted from the opening and overlaid, and the iron piece 1*a* of the rear lever 1 is in contact with the electromagnet (not shown) for the rear lever. The front lever 2 and the rear lever 1 are mechanically supported by the cam surfaces 3*a* and 3*b* of the setting member 3, respectively.

Next, an operation of the shutter will be briefly described. When a signal from a camera is received and the iron piece 1*a* of the rear lever 1 is attracted by and held on the electromagnet for the rear lever in the state shown in FIG. 35, a motor (not shown) rotates, the setting member 3 associated with the motor also rotates, and the rear lever 1 rotates to a pre-running position. The setting member 3 then continues rotating until the setting member 3 reaches a phase where the setting member 3 does not interfere with running of the rear lever 1, and then stops rotating when the motor is stopped.

This stand-by state continues for a predetermined time, and then attraction of the rear lever 1 is released, and the rear lever 1 rotates to the end-of-running position under the biasing force of the rear drive spring and stops. This state is shown in FIG. 37. Then, after a predetermined time, the motor (not shown) starts rotating, and the setting member 3 associated with the motor starts rotating, and the front cam 3*a* abuts against a cam follower 2*b* of the front lever. The front cam 3*a* moves the cam follower 2*b* of the front lever, thereby charging the front lever 2.

The rear lever 1 is charged by the rear cam 3*b* in the same manner. The timings at which the front cam 3*a* and the rear cam 3*b* come into contact with the respective cam followers 2*b* and 1*b*, and the cam surfaces that determine the charge speed after the contact can be arbitrarily set. After the iron piece 2*a* of the front lever 2 comes into contact with the electromagnet for the front lever via the intermediate state shown in FIG. 38, the setting member 3 further continues rotating, and the front lever 2 is overcharged. The same holds true for the rear lever 1.

In this embodiment, after that, the front lever 2 is attracted by and held on the electromagnet for the front lever, and the front cam surface 3*a* is retracted from the cam follower 2*b* of the front lever 2. The setting member 3 then further continues rotating, and when the setting member 3 rotates to a position where the setting member 3 does not interfere with running of the front lever 2, the motor stops, and the setting member 3 also stops rotating. This is the state shown in FIG. 35 again.

As described above, the shutter assumes various states during operation, so that the state of the shutter needs to be grasped on the part of the camera as required. For example, if the setting member 3 is not stopped in the right phase before the rear lever 1 starts running, the rear lever 1 collides with the setting member 3 during running, or if the electromagnet for the rear lever 1 is excited before the iron piece 1*a* of the rear lever 1 abuts against the electromagnet, the iron piece 1*a* rushes into the electromagnet and causes damage to the attracting surface.

With the shutter state, the inclination of the cam surface may be modified so that the iron piece slowly comes into contact with the electromagnet, or the cam surface may be shaped so that the timing at which the cam comes off the cam follower lags. Alternatively, the number of revolutions of the motor may be electrically controlled to change the speed of rotation of the setting member 3 so that the setting member 3 can be more easily stopped at an appropriate position. In that case, the positions of the setting member 3, the front lever 2 and the rear lever 1 can be detected, and the control can be started or stopped based on the positions.

The photointerrupter 4 can detect only whether light is blocked or allowed to pass. Therefore, in principle, the photointerrupter 4 can detect only two states. Even though a single photointerrupter 4 can provide only detection of two positions, if three photointerrupters 4 are used to detect the positions of three components, the setting member 3, the front lever 2, and the rear lever 1, a total of eight states can be detected based on the combination of the states of the three components as shown in FIG. 39.

That is, as shown in FIG. 39, the operational state of the shutter is classified into eight states in each of which each photointerrupter 4 provides a different output.

Furthermore, even with a single component, if a light-shielding part 5 of the component is configured so that the component blocks light when the component is located at a position A, allows light to pass when the component is located at a position B, blocks light when the component is located at a position C and allows light to pass when the component is located at a position D, for example, the photointerrupter can detect four positions. In this case, there are two positions where light is blocked and two positions where light is allowed to pass, so that the number of times the light is blocked and allowed to pass after the initial position can be counted in order to avoid confusion with the positions A and C and confusion with the positions B and D. Alternatively, the sections of the light-shielding part 5 corresponding to the positions A and C and the sections corresponding to the positions B and D may have different lengths so that the duration for which the position A is detected differs from the duration for which the position C is detected and the duration for which the position B is detected differs from the duration for which the position D is detected. In this case, the position of the component can be determined based on the duration for which the preceding position has been detected.

Furthermore, both these measures may be adopted. By combining the count of switchings and the states of several kinds of components, the state of the shutter can be more precisely grasped.

That is, the eight operational states of the shutter shown in FIG. 39 can be detected based on the open number of photointerrupters 4 (the number of switchings) or detected based on the open number of one photointerrupter 4 (the number of switchings).

Furthermore, when the operational states of the shutter shown in FIG. 39 are further classified to detect a larger number of operational states, the operational states can be determined based on the elapsed time after each photointerrupter 4 has detected that a state has transitioned to another state.

That is, counting can be started when the CPU detects a change in output of the photointerrupter 4, and it can be determined that the operational state of the shutter has transitioned to another state when a predetermined count is reached.

As described above, the operational state of the shutter can be grasped by using a device capable of optical detection, such as a photointerrupter, which is smaller than a conventional detection device that uses a microbrush or the like.

It is advantageous that the light-shielding part 5 that blocks light or allows light to pass in the photointerrupter is integrally formed with each component because rattling does not occur. However, a component with the light-shielding part 5 may be more costly than a component without the light-shielding part 5.

Figure 40:
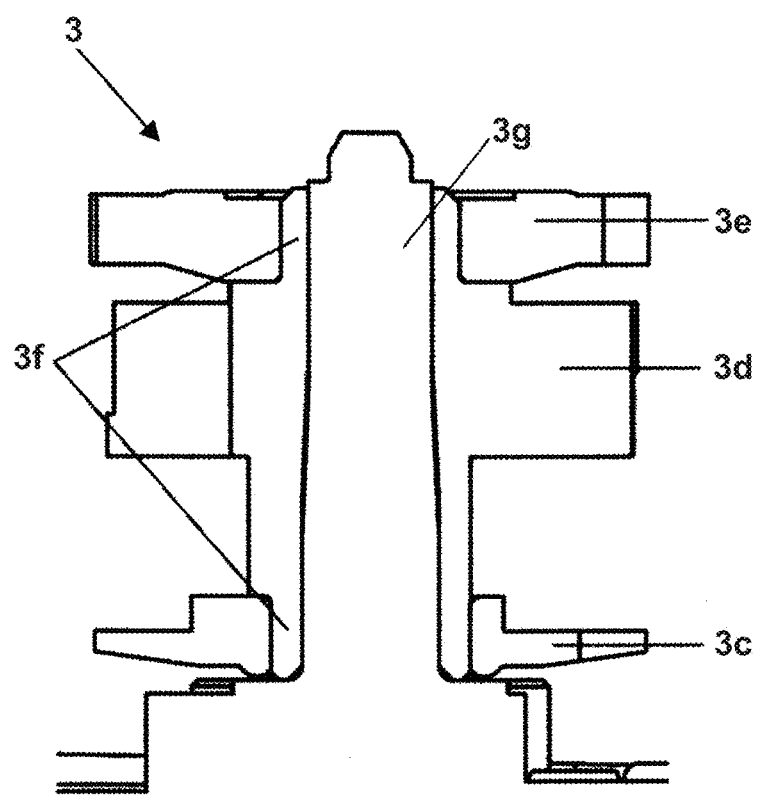
FIG. 40 is a diagram showing a setting member divided into parts.

In this embodiment, as shown in FIG. 40, it is possible to divide the setting member 3 into three parts: a light-shielding part 3*c*, a cam part 3*d* and a gear part 3*e*, to thereby suppress complication of molds and an increase in cost of the molds and the components.

In general, when a component is divided into a plurality of parts, there is a problem that the parts rattle. However, if a single shaft part 3g is prepared, and the other parts are attached to the shaft part 3g as shown in FIG. 40, rattling of the parts in the thrust direction can be alleviated to substantially the same level as an integral component. If the parts are press-fitted onto the shaft part, rattling of the parts in the radial direction can also be alleviated to substantially the same level as an integral component. Although, in this embodiment, the setting member 3 is divided in FIG. 40 as an example, another component whose state needs to be grasped can be similarly divided.

Although a shutter capable of the live view mode by electronic front curtain control has been described in the above embodiment, the present invention is not limited to this embodiment. A shutter is also possible which performs an exposure operation by using the group of front blades and the group of rear blades after a separate mechanism extends the group of front blades from the live view state.

This embodiment can be applied to the first embodiment. For example, this embodiment can be applied to the optical sensors PI1 to PI3.

The shutter structure according to this embodiment can be summarized as follows.

The shutter structure according to this embodiment comprises:

a hollow frame member that has an opening for exposure;

a first blade member and a second blade member that are capable of moving along a principal plane of the hollow frame member to open and close the opening;

a first transmission member that drives the first blade member;

a second transmission member that drives the second blade member;

a first drive member that is biased in one direction and rotates against the biasing force to move the first transmission member to a charged position;

a second drive member that is biased in one direction and rotates against the biasing force to move the second transmission member to a charged position;

first optical detection means that detects a phase of the first drive member;

second optical detection means that detects a phase of the second drive member;

a motor; and a transmission cam that transmits a driving force of the motor to the first drive member and the second drive member, and the shutter structure further has third optical detection means that detects a phase of the transmission cam.

The shutter state is determined based on a combination of detection results of the first optical detection means, the second optical detection means and the third optical detection means.

The first optical detection means is a photointerrupter provided at a position where the photointerrupter faces a light-shielding part provided on the first drive member, the second optical detection means is a photointerrupter provided at a position where the photointerrupter faces a light-shielding part provided on the second drive member, and the third optical detection means is a photointerrupter provided at a position where the photointerrupter faces a light-shielding part provided on the transmission cam.

The imaging apparatus according to this embodiment comprises the shutter structure described above, and the shutter state is determined based on the number of switchings of the detection result of the first optical detection means, the second optical detection means or the third optical detection means.

In the focal plane shutter according to this embodiment, each of the first drive member, the second drive member, and the transmission cam has:

a shaft part; and a light-shielding part for optical detection, and the shaft part and the light-shielding part are separate parts.

The present invention is not limited to the above embodiments and various changes and modifications can be made within the spirit and scope of the present invention. Therefore, to apprise the public of the scope of the present invention, the following claims are made.

What is claimed is:

1. A blade driving device, comprising:
a base plate including an opening through which light passes;
a blade configured to run on a surface of the base plate to open and close the opening;
a drive mechanism including a drive spring and that actuates the blade; and
a charge mechanism configured to perform a charge operation on the drive mechanism against the drive spring,
wherein the charge mechanism includes a slide member configured to linearly reciprocate in a direction parallel to the base plate along a motor between the motor and the drive mechanism, the motor generating a driving force for the charge mechanism, and
wherein the drive mechanism, the slide member, and the motor are arranged in a lateral region of the opening from a side of the opening in this order.

2. A blade driving device, comprising:
a base plate including an opening through which light passes;
a blade configured to run on a surface of the base plate to open and close the opening;
a drive mechanism including a drive spring and that actuates the blade; and
a charge mechanism configured to perform a charge operation on the drive mechanism against the drive spring,
wherein the charge mechanism includes a slide member configured to linearly reciprocate in a direction parallel to the base plate along a motor between the motor and the drive mechanism, the motor generating a driving force for the charge mechanism,
wherein the slide member is supported by at least one guide shaft in such a manner that the slide member is capable of reciprocation, the guide shaft being arranged on a surface of the base plate along a side part of the drive mechanism in parallel with a direction of running of the blade, and
wherein a part of the slide member on one end side of the guide shaft receives the driving force of the motor.

3. The blade driving device according to claim 1, wherein the motor is attached to a supporting part provided on the base plate with an output shaft thereof being in parallel with a direction of running of the blade.

4. The blade driving device according to claim 1, wherein the base plate includes a recess part that houses a body part of the motor.

5. The blade driving device according to claim 2, wherein the charge mechanism includes the guide shaft, and wherein a part of the charge mechanism overlaps with the motor in a light transmission direction in which light passes through the base plate.

6. The blade driving device according to claim 5, wherein the slide member is supported by a pair of the guide shafts, and the guide shafts are arranged in the light transmission direction.

7. The blade driving device according to claim 6, wherein the guide shafts are arranged within a thickness of the motor in the light transmission direction.

8. The blade driving device according to claim 1, further comprising a cover member that covers a gap between a body part of the motor and the charge mechanism in the direction parallel to the base plate.

9. The blade driving device according to claim 8, wherein the cover member is arranged at a position such that a height from the base plate is lower than a top part of the motor, and wherein a flexible substrate is arranged on the cover member.

10. The blade driving device according to claim 4, wherein the base plate includes a protrusion that corresponds to the recess and protrudes in an opposite direction to the motor, and
wherein the body part of the motor and the opening overlap with each other in the direction parallel to the base plate.

11. The blade driving device according to claim 1, wherein a body part of the motor has a cylindrical shape, and
wherein the slide member includes a side part having a radius shape so as to avoid interfering with the body part.

12. An imaging apparatus, comprising the blade driving device according to claim 1.

* * * * *